United States Patent [19]
Takimoto et al.

[11] Patent Number: 5,486,442
[45] Date of Patent: Jan. 23, 1996

[54] ORGANIC POLYMER AND PREPARATION AND USE IN CRYSTAL SPATIAL LIGHT MODULATOR

[75] Inventors: Akio Takimoto; Hirofumi Wakemoto, both of Neyagawa; Eiichiro Tanaka, Kishiwada; Masanori Watanabe, Katano; Junko Asayama, Suita; Hisahito Ogawa, Ikoma; Shigehiro Sato, Osaka; Fumiko Yokotani, Suita, all of Japan

[73] Assignee: Matsushita Electric Industrial Co., Ltd., Osaka, Japan

[21] Appl. No.: 90,638

[22] Filed: Jul. 13, 1993

Related U.S. Application Data

[63] Continuation of Ser. No. 673,759, Mar. 25, 1991, abandoned.

[30] Foreign Application Priority Data

Mar. 23, 1990 [JP] Japan .................. 2-73777
Mar. 23, 1990 [JP] Japan .................. 2-73778
Mar. 23, 1990 [JP] Japan .................. 2-73779
Mar. 25, 1990 [JP] Japan .................. 2-74971
Nov. 29, 1990 [JP] Japan .................. 2-335910

[51] Int. Cl.⁶ ............................................. G03G 5/00
[52] U.S. Cl. .................. 430/78; 430/14; 430/325; 359/67; 359/71; 359/72; 522/148; 522/164
[58] Field of Search ............... 430/78, 220, 325; 359/67, 71, 72; 522/148, 164, 904, 905

[56] References Cited

U.S. PATENT DOCUMENTS 4,698,295 10/1987 Pfeifer et al. .................... 430/270
5,384,649 1/1995 Takimoto et al. .................. 359/67

FOREIGN PATENT DOCUMENTS 0240249 10/1987 European Pat. Off. .
0283636 9/1988 European Pat. Off. .
0375165 6/1990 European Pat. Off. .

OTHER PUBLICATIONS

Patent Abstracts Of Japan, vol. 13, No. 93 (P–838)(3441) Mar. 6, 1989.
Patent Abstracts Of Japan, vol. 8, No. 257 (P–316)(1694) Nov. 24, 1984.
World Patents Index, Week 8726, Derwent Publications, AN 87–181570.
World Patents Index, Week 8818, Derwent Publications, AN 88–123712.

*Primary Examiner*—S. Rosasco
*Attorney, Agent, or Firm*—Wenderoth, Lind & Ponack

[57] ABSTRACT

An alternating copolymer comprising a repeating unit of the formula:

$$-Z-(X-Y)_n- \qquad (I)$$

wherein n is at least 2, X is O, S, Se or Te, and Y and Z are independently an aromatic or substituted aromatic group, and at least one other repeating unit, which is useful as a photosensitive material used in a spatial light modulator.

5 Claims, 47 Drawing Sheets a. 1st STEP
b. 2nd STEP
c. 3rd STEP

ORGANIC POLYMER AND PREPARATION AND USE IN CRYSTAL SPATIAL LIGHT MODULATOR

This application is a continuation of now abandoned application Ser. No. 07/673,759, filed Mar. 25, 1991 now abandoned.

BACKGROUND OF THE INVENTION

1. Field of the Invention

The present invention relates to an organic polymer which is easily crystallized, a process for preparing the same and a photoconductive material and a spatial light modulator comprising the same.

2. Description of the Related Art

Recently, organic materials having photoconductivity are vigorously developed and studied as photoconductive materials which are used in an electrophotographic printer or an optical printer.

Among the photoconductive materials, polyvinyl carbazole (hereinafter referred to as "PVK") is well studied. PVK has a high carrier transporting ability of holes, for example, a hole mobility of up to $10^{-5}$ cm$^2$/Vs at room temperature. The carriers in a film are supposed to hop on the carbazole rings which are helically bonded to a polymer backbone and move along the backbone.

A polymer layer consisting of PVK alone has no light absorption band in the whole visible light region. However, addition of an equimolar amount of electron-accepting trinitrofluorenone to PVK makes it possible to exchange carrier charges with the carbazole rings to form a carrier moving complex, whereby a sensitive region is expanded over the whole visible light region.

Now, there is mainly used a function-separated type photoconductor comprising a laminated carrier-generating layer which generates carriers through absorption of light and a carrier-transporting layer which effectively transports the carriers. As a carrier generating material, an inorganic material such as Se, As$_2$Se$_3$ and the like; a deposited layer of an organic material such as phthalocyanine compounds; or a coated layer comprising a binder and a squalium salt dispersed therein is used. As the carrier-transporting material, various organic materials such as a composition comprising a binder and a triphenylamine derivative dispersed therein are developed in addition to PVK.

As a material having a high carrier transporting ability, there has been proposed polyparaphenylene sulfide (hereinafter referred to as "PPS") (see U.S. Pat. No. 4,886,719). Although PPS is an excellent insulating material having good heat resistance, its carrier transporting ability can be considerably increased by heat treatment in oxygen gas (see the preprint for the 35th Lecture Meeting of the Association Relating Applied Physics Society, 31p-A-11). This may be because the oxygen molecules trapped in the film weakly bond the PPS molecules and penetrate into an amorphous region so as to bond the molecules in the crystal region. Then, it is assumed that, in such PPS, a direction of carrier transportation is perpendicular to the molecular chain and PPS has high carrier mobility in the crystal region.

It is possible to greatly increase orientation and crystallinity of oligomer phenylene sulfide having an oligomerization degree of 5 to 7 (hereinafter referred to as "OPS") by vapor deposition. It is found that photoconductivity of the deposited OPS film is increased by enlargement of the crystal region and a direction of carrier transportation is perpendicular to a major axis of the molecule (see the preprint for the 41st Lecture Meeting of the Applied Physics Society, 5p-ZH-15). Therefore, it would be possible to transport the carriers which are generated by light absorbance in a light absorbing band for the above functional group along the OPS backbones, if a film having good orientation and crystallinity were produced from OPS molecules in which a carrier-generating functional group is incorporated (see Japanese Patent Kokai Publication No. 120747/1990).

Similar to PVK, PPS and OPS have limited absorption regions in a short wavelength range of not longer than 400 nm. According to the above proposals, it is possible to increase sensitivity in the visible light region by constructing a function-separated type photoconductor through lamination of the carrier-generating layer and a carrier-transporting layer made of the above material.

However, PPS and OPS have a problem that a carrier injection efficiency is unsatisfactory.

In case of PVK, it has been tried to introduce a sensitizable functional group directly to a side chain instead of the carbazole group. However, since it is difficult to achieve high crystallinity of a product, the sensitivity cannot be increased.

Among liquid crystal spatial light modulators, a modulator comprising a photoconductive layer which comprises amorphous silicon or CdS and a nematic liquid crystal in laminated state is proposed as an optically addressable spatial light modulator.

In the spatial light modulator comprising a combination of the photoconductive layer and the liquid crystal, an orientation state of the liquid crystal is controlled by light irradiation through the photoconductive layer. When an inorganic photosensitive material such as the amorphous silicon or CdS is used in the photoconductive layer, a ratio of a light receiving area of the photoconductive layer to a liquid crystal pixel area and a film thickness are designed so that the layer performs a switching function. That is, they are designed so that a dielectric constant of the liquid crystal $\epsilon_{LC}$ and a dielectric constant of the photoconductive layer $\epsilon_{pH}$ satisfy the following relationship:

$$\epsilon_{LC} S_{LC}/d_{LC} << \epsilon_{PH} S_{PH}/d_{PH}$$

wherein $S_{LC}$ is an area of the liquid crystal, $d_{LC}$ is a depth of the liquid crystal, $S_{PH}$ is is an area of the photoconductive layer and $d_{PH}$ is a depth of the photoconductive layer.

For example, in case of a photoconducting layer comprising amorphous silicon having $\epsilon_{PH}$ of about 11, when $\epsilon_{LC}$ is about 3 and $d_{LC}$ and $d_{PH}$ are assumed to be about 5 μm and about 1 μm, respectively, $S_{LC}$: $S_{PH}$ is about 1:0.1. Therefore, disadvantageously, incident light is not effectively used.

Since there is an oriented film which is an insulating film between the photoconductive layer and the liquid crystal layer, charge storage on an interface is a problem.

SUMMARY OF THE INVENTION

One object of the present invention is to provide a novel organic polymer which is useful as a photoconducting material to be used in an electrophotographic printer or an optical printer.

Another object of the present invention is to provide a process for preparing a photoconductive organic polymer.

A further object of the present invention is to provide a process for preparing a thin film of a photoconductive organic polymer.

A yet another object of the present invention is to provide a photoconductive material comprising an organic polymer and an organic material.

A yet further object of the present invention is to provide a liquid crystal spatial light modulator.

DETAILED DESCRIPTION OF THE INVENTION

Figure 1:
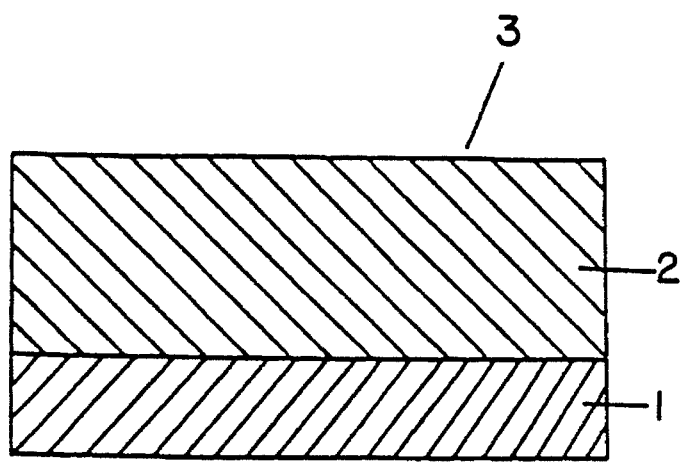
FIGS. 1 and 2 are cross sections of two examples of the photosensitive film according to the present invention.

According to a first aspect of the present invention, there is provided an alternating copolymer comprising a repeating unit of the formula:

$$-Z-(X-y)_n- \quad (I)$$

wherein n is at least 2, X is O, S, Se or Te, and Y and Z are independently an aromatic or substituted aromatic group, and at least one other repeating unit.

When the organic polymer has a functional group which generates photocarriers and is in a crystalline state, it is useful as a photoconductive material. A crystallinity is such that there is at least one scattering peak in an Xray diffraction pattern.

When the organic polymer of the present invention is used in the function-separated photoconductor, its electric conductivity is preferably at least $10^{-12}$/ohm.cm. When it is used as a unitary type photoconductor, its electric conductivity is preferably from $10^{-12}$/ohm.cm to $10^{-8}$/ohm.cm.

Characteristics of the alternating copolymer of the present invention will be explained in connection with its use as a photoconductive material.

1. The photoconductive material according to the present invention has high carrier mobility so that the carriers can easily move between the polymer chains. The high carrier mobility is due to high crystallinity of the copolymer and easiness of carrier transfer between the polymer chains. The organic polymer comprising the repeating units (I) tends to have a rigidly extended form in a backbone chain direction in parts having the repeating units (I), and therefore its crystallinity is significantly increased. A mechanism of the carrier transport in such organic polymer is assumed to be hopping conduction between the aromatic groups of the adjacent molecules. Therefore, the carrier transporting direction is not necessarily in the direction of backbones. Rather, the carriers are mainly transferred between the polymer chains. This is because a spreading direction of a π electron orbital is perpendicular to the polymer chain and overlapping of the orbitals is large.

2. In the photoconductive material according to the present invention, the incorporated carrier-generating functional group does not work as a carrier trap.

The carriers generated by the functional group having high carrier generating ability are transferred directly to an adjacent polymer molecule, rather than the generated carriers moving in the polymer molecule towards the chain end and then being transferred to the adjacent polymer molecule. This is because the carrier transfer direction is perpendicular to the polymer chain as described above. This solves the carrier trap problem, which arises in PVK since the functional groups are always present in a carrier traveling route. However, if a content of the functional groups is increased to increase the number of generated carriers, the carrier trap occurs. The content of the functional groups can be controlled by adjusting a polymerization degree n in the formula (I).

Examples of the carrier-generating materials having a high quantum efficiency are condensed polycyclic hydrocarbons (e.g. anthracene, naphthalene, pyrene, perylene, naphthacene, benzoanthracene, benzophenanthrene, crysene, triphenylene, phenanthrene, etc.), condensed polycyclic quinones (e.g. anthraquinone, dibenzopyrenequinone, anthoanthrone, isoviolanthrone, pyranthrone, etc.), and dyes (e.g. metal-free phthalocyanine, metal phthalocyanines containing a metal such as copper, lead, nickel, aluminum and the like, indigo, thioindigo, etc.). They have lightabsorbing carrier-generating regions in the visible light region or its neighbor regions. The copolymers have a light absorption region which shifts to a longer wavelength region due to enlargement of overlapping of the electron orbitals with the adjacent molecule as the crystallinity increases. These copolymers include those having an amide bond, an imide bond, an ester bond, an ether bond or a thioether bond. A distance between the adjacent molecule chains of the condensed type polymer is usually from 4 to 6 Å which is close to the distance between the carbazole rings in PVK.

3. The photoconductive material according to the present-invention has high crystallinity and high carrier transporting ability.

The crystallinity depends on the polymerization degree and the most suitable crystallinity can be determined as follows:

As the polymerization degree increases, stiffness of the molecule increases and a crystallized region expands, so that the carrier transfer between the molecules is facilitated and a carrier trap density is decreased. When the polymerization degree is decreased, the content of the functional groups is increased relatively and the quantum efficiency for carrier generation is increased. The crystallinity and the carrier mobility are related to each other closely. Increase of the crystallinity increases the carrier mobility. When the crystallization proceeds and packing of the atoms is increased, a distance between the adjacent atoms determines easiness of carrier moving in a bulk.

Since the crystallinity of the organic polymer of the present invention can be easily increased, heat treatment has better effects on the organic polymer of the present invention than on other crystalline polymers when the photoconductive material is produced. That is, crystallization proceeds in a part including a structure where the moieties X and Y are directly bonded, and such part acts as a nuclei for crystallization and increases the crystallinity of the whole polymer significantly. To increase a crystal thickness effectively, it is most preferable to heat the polymer at a temperature around a melting point of the polymer. The melting point increases as the crystallinity increases. Therefore, the polymer can be crystallized effectively by raising a treating temperature preferably in a temperature range between a glass transition temperature and the melting temperature in accordance with a shift of the melting point to a higher temperature.

4. In the photoconductive material according to the present invention, the incorporated carrier-generating groups interact with the adjacent molecule to form an absorption band having a low energy, whereby a wavelength region of light to be absorbed is broadened.

In the photoconductive material according to the present invention, the crystallinity and the optical absorbance characteristic relate to each other closely. As the crystallinity increases, the overlap of the electron orbitals in the adjacent molecules of the polymer increases. In such case, an optical absorbance band shifts towards a lower energy side. Therefore, an optical band gap decreases and in turn the photoconductivity increases. On the other hand, the decrease of the optical band gap increases a concentration of thermal carriers in the film, and then decreases volume resistivity. In view of application of the polymer as an electrophotographic photoconductor, since an electric resistance which satisfies charge characteristics is required, the optical band gap has a lower limit. As already explained, the overlap of the electron orbitals in the adjacent molecules of the polymer of the present invention increases as the crystallinity of the polymer increases. In such case, a dark electric conductivity is increased by increase of the carrier concentration and increase of the carrier mobility. Therefore, the photoconductivity is increased by the increase of the dark electric conductivity. By the above reason, the photoconductivity has an upper limit, when the polymer is used in the electrophotographic photoconductor.

Additional explanation will be made in relation to a case where the photoconductive material according to the present invention is used in the function-separated type photoconductor.

When a material for the function-separated type photoconductor is designed, a carrier injection efficiency between the carrier-generating layer and the carrier-transporting layer is the most important factor. The carrier-transporting layer is formed from a polymer layer or an organic material dispersed layer which achieves high mobility. In general, the carrier-transporting layer has no light absorbing band in the visible light wavelength region. On the other hand, the carrier-generating layer absorbs the visible light and generates the carriers. Therefore, the carriers generated in the carrier-generating layer should be injected in the carrier-transporting layer which has a band gap wider than a band gap in the carrier-generating layer. To inject the carriers by jumping over an energy barrier at the interface, an external electric field should be present at the interface effectively. Since an inorganic carrier-generating material has a comparatively high dielectric constant, it is difficult to apply the electric field at the interface effectively. Though the conventional organic carrier-generating material comprising a dispersed organic dye has a high electric conductivity, it is difficult to apply the electric field at the interface. On the contrary, the photoconductive material according to the present invention has a small specific dielectric constant and a high electric conductivity. Therefore, when the photoconductive material according to the present invention is used in the carrier-generating layer, it is easy to apply the electric field at the interface and then to inject the carrier in the carrier-transporting layer. Accordingly, by the use of the photoconductive material according to the present invention in the carrier-generating layer, it is possible to use more effectively use the conventional carrier-transporting material which has a high carrier transporting ability but in which the carriers are not effectively injected so that a residual potential becomes high.

Now, the alternating copolymer of the present invention will be explained in detail.

The copolymer of the present invention comprises the repeating units of the formula:

—Z—(X–Y)$_n$—

In the formula (I), n is a number of at least 2 and X is O, S, Se or Te. Y and Z are independently an aromatic or substituted aromatic group, and their examples include condensed polycyclic hydrocarbons and their substituted derivatives (e.g. benzene, anthracene, naphthalene, pyrene, perylene, naphthacene, benzoanthracene, benzophenanthrene, crysene, triphenylene, phenanthrene, etc.), condensed polycyclic quinones (e.g. anthraquinone, dibenzopyrenequinone, anthoanthrone, isoviolanthrone, pyranthrone, etc.), and metal-free phthalocyanine, metal phthalocyanines containing a metal such as copper, lead, nickel, aluminum and the like, indigo, thioindigo and their derivatives.

Examples of the organic polymer are polyimide, polyamide imide, polyamide, polyether imide, polyether amide, polyester, polyester imide, polyester amide and the like. Since all of them except polyester have good heat resistance, they are suitable as the photoconductive material.

The alternating copolymer of the present invention has a weight (or number) average molecular weight of from $10^2$ to $10^5$, preferably from $10^3$ to $5 \times 10^4$.

The organic molecule of the formula (I) may constitute a backbone or a side chain of the organic polymer.

Among the following examples, A1 to A12 are copolymers in which the organic polymer is polyimide. In A1 to A6, an acid component of polyimide is pyromellitic acid. In the formula (I), X is S, and Y and Z are both benzene rings in A1; X is Se, and Y and Z are both benzene rings in A2; X is S, and Y and Z are both naphthalene rings in A3; X is S, and Y and Z are both anthracene rings in A4; X is S, and Y and Z are both perylene rings in A5; and X is S, and Y and Z are both 2,5-dichlorobenzene rings.

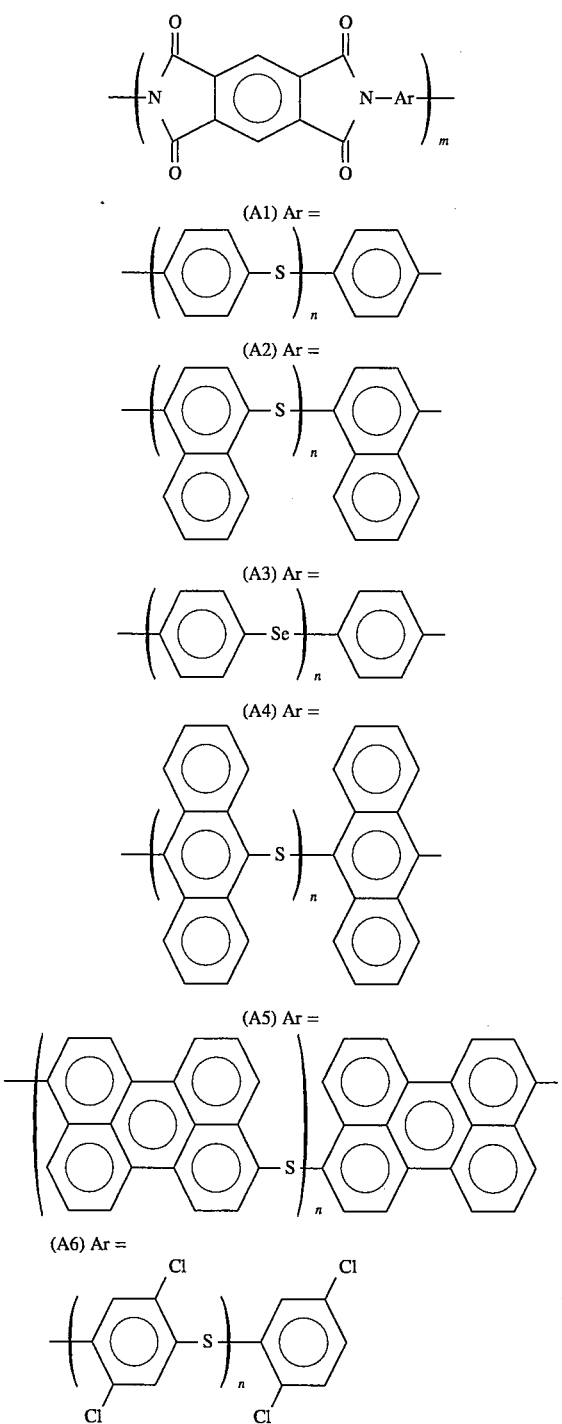

The examples A7 to A 12 are similar to A1 but n is fixed at 2, and as an acid component of polyamide, is used 3,3',4,4'-benzophenonetetracarboxylic dianhydride in A7; 3,3,',4,4'-biphenyltetracarboxylic dianhydride in A8; 1,1',5,5'-biphenyltetracarboxylic dianhydride in A9; naphthalene-1,4,5,8-tetracarboxylic dianhydride in A10; naphthalene-2,3,6,7-tetracarboxylic dianhydride in A11; or perylene-3,4,9,10-tetracarboxylic dianhydride in A12.

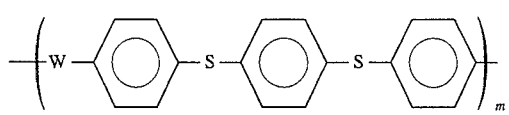
(A7) W =

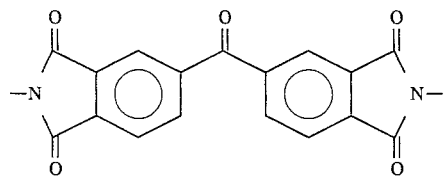
(A8) W =

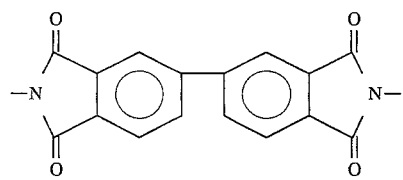
(A9) W =

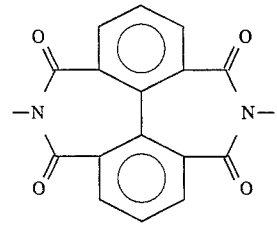
(A10) W =

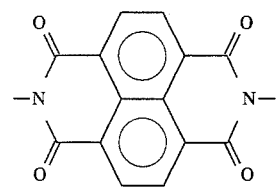
(A11) W =

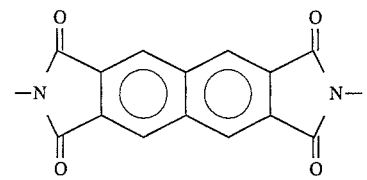
(A12) W =

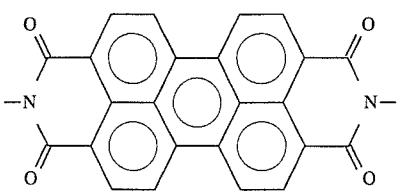

The above polyimide may be prepared by any of conventional polymerization methods. For example, a tetracarboxylic dianhydride as an acid component and a diamine compound which is represented by the formula (I) having amine groups at both ends are reacted in an organic polar solvent (e.g., N,N'-dimethylacetamide, 1-methyl-2-pyrrolidinone, N,N-dimethylformamide, m-cresol, etc.).

In the reaction, a polyamide acid is formed through ring opening addition polymerization and then polyimide is formed through dehydration ring closure. The ring closing may be carried out by reprecipitation, chemical ring closure or thermal ring closure in a solvent.

A copolymer of the formula B:

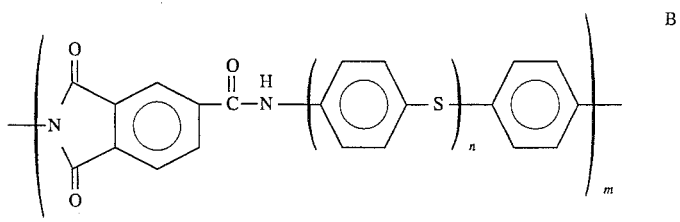

represents an example in which the organic polymer is polyamide imide. The formula B comprises the units of the formula (I) in which X is S, and Y and Z are both benzene rings. In addition, all combinations of X, Y and Z which are explained in the above A are possible in the formula B.

The copolymer B may be prepared by any of conventional polymerization methods, such as an acid chloride method in which a diamine of the formula (I) having amine groups at both ends and pyromellitic anhydride monochloride are reacted, an isocyanate method in which diisocyanate which is a derivative from an diamine and trimellitic anhydride (TMA) are reacted, or a direct polymerization method in which the diamine and TMA are directly copolymerized. In addition, an imide-dicarboxylic acid method, a blocked isocyanate method, a dephenolization method or a deacetic acid method may be used.

A copolymer of the formula C:

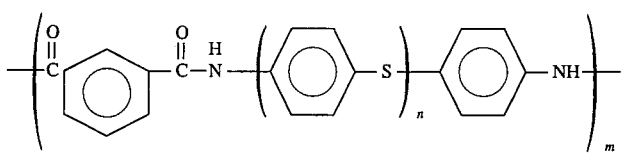

C represents an example in which an organic polymer is polyamide. As in the formula B, X is S, and Y and Z are both benzene rings in the formula (I). The copolymer C may be prepared by low temperature solution polymerization of a diamine and isophthalic dichloride, interfacial polycondensation or low temperature solution polymerization of an diamine and terephthalic dichloride.

The alternating copolymer of the present invention can be crystallized by heating it at a temperature lower than its melting point. A heating atmosphere may be any gas such as oxygen, nitrogen, argon, etc. Heating may be carried out under reduced pressure. A heating time depends on a crystallization rate at the heating temperature. When the organic polymer component is polyimide, polyamide imide, polyamide, polyether imide, polyether amide, polyester, polyester imide or polyester amide, the heating time is usually from 0.25 to 30 hours.

In the above polymerization and crystallization methods, sometimes it is difficult to control the crystallinity, orientation or photoconductivity of the copolymer. However, when a polyamic acid is prepared from a diamine and a carboxylic acid in a specific molar ratio, the prepared copolymer has high crystallinity and then good photoconductivity.

According to a second aspect of the present invention, there is provided a process for preparing a polyimide comprising reacting a diamine of the formula:

$$NH_2-(Y_{i-xi})_n-Y_iNH_2$$

wherein n is a number of at least 2, i is a positive integer not larger than n, y is an aromatic or substituted aromatic group, and X is O, S, Se, Te or the divalent group —CH=CH—, and a tetracarboxylic dianhydride of the formula:

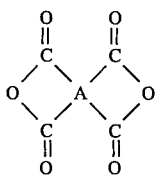

(IV)

wherein A is a tetravalent hydrocarbon group in a molar ratio of the diamine to the dianhydride of 1:(1+m) wherein m is a positive number, preferably less than 1 (one) to obtain a polyamic acid and then polymerizing said polyamic acid to obtain polyimide.

Examples of the diamine (III) are
$NH_2-(Ph-S)_n-Ph-NH_2$ (SDA—n)
$NH_2-(Ph-O)_n-Ph-NH_2$ (ODA-n)
$NH_2-(Ph-Se)_n-Ph-NH_2$ (SeDA—n)
$NH_2-(Ph-CH=CH)_n-Ph-NH_2$ (BDA-n)
$NH_2-Ph-S-X-S-Ph-NH_2$
in which Ph is a p-phenylene group and X is a polycyclic aromatic ring such as naphthalene, anthracene, pyrene, perylene, etc.

Examples of the tetracarboxylic dianhydride (IV) are
(1) pyromellitic dianhydride (PMDA),
(2) benzophenonetetracarboxylic dianhydride (BPDA),
(3) 3,3',4,4'-biphenyltetracarboxylic dianhydride (BIDA 1),
(4) 1,1',5,5'-biphenyltetracarboxylic dianhydride (BIDA 2), naphthalene-1,4,5,8-tetracarboxylic dianhydride (NADA 1),
(6) naphthalene-2,3,6,7-tetracarboxylic dianhydride (NADA 2),
perylene-3,4,9,10-tetracarboxylic dianhydride (PEDA).

The photoconductivity of the alternating copolymer of the present invention is greatly increased by changing its structure from amorphous to crystalline. For crystallization process, the presence of crystal nuclei is essential. When the polymer includes the oligomer which has a rigid molecular structure comprising the aromatic ring, it is easily crystallized. Alternatively, the carboxylic acid part can act as a crystal nucleus. This part has a planar structure and tends to interact with the carboxylic acid parts of other molecules. That is, the polymer may form a stuck structure in which the planar structures are laminated with plane to plane. Then, it may be possible to suppose a growth mechanism in which such parts act as crystal nuclei and the polymer molecules are aligned with each other so that a crystal region expands.

Alternatively, it may be possible to provide another model that a crystal nucleus is formed only from a carboxylic acid group which is present at a chain end of the polymer. In this model, the carboxylic acid anhydride group at the chain end is hydrolyzed to form the carboxylic acid group. Such chain end carboxylic acid group forms a hydrogen bond with a carboxylic acid group which is present at the chain end of other molecule to form a dimer, whereby the polymer chains are aligned.

According to the second aspect of the present invention, in order to introduce the crystal nuclei, a proportion of the carboxylic acid is increased in the preparation of the polyamic acid.

Further, it is possible to introduce the carboxylic acid group at the chain end by adding the carboxylic acid to a solution of polyamic acid so as to change the diamine ends to the carboxylic acid ends.

However, when the molar ratio of the diamine to the carboxylic acid is far larger than 1:1, for example 1:2, it is difficult to form a polymer chain. Therefore, this ratio is preferably less than 1 (one).

In the crystallization process, it is important that polymer molecules are packed to permit sliding with each other. The preparation of the alternating copolymer of the present invention requires both imide ring formation through dehydration condensation and crystallization in which the polymer chains are aligned. Thermal condensation effects both simultaneously. However, thermal motion of the molecules is suppressed in the first step (condensation step). Therefore, the first step is carried out by applying a solution of the polyamic acid on a substrate and then immersing it in a solution containing acetic anhydride. In this step, after dehydration condensation, hydrolyzed acetic acid is present in the molecules and the molecules are separated apart. When the thermal crystallization is carried out in such molecular state, the molecules easily slide and crystallize.

In the above polymerization method, it is difficult to control a distribution of chain length of the polyimide. When the copolymer is prepared by vapor deposition of the monomers, it is possible to control the distribution of the chain length (or molecular weight).

According to a third aspect of the present invention, there is provided a process for preparing an organic polymer comprising evaporating a raw material comprising a diamine of the formula (III) and optionally a tetracarboxylic dianhydride (IV) and polymerizing it on a substrate.

For the vapor deposition, a vapor deposition by a resistant heating method, an ion cluster method, a high vacuum molecular beam epitaxy (MBE) method and the like may be used.

Preferably, different raw materials are evaporated from respective independent cells and the number and speed of the molecules which reach the substrate are adjusted.

A heating condition of the substrate depends on a kind of the polymer to be polymerized. Preferably, the heating condition is so adjusted that unreacted monomers, namely the diamine or the carboxylic acid, are not present in the formed polymer film. In case of the combination of the diamine (III) and the dianhydride (IV), the substrate temperature is from 0° to 400° C.

A surface of the substrate may be coated with an organic material in order to control the orientation of the polymer chains. In a first embodiment, the substrate surface is coated with a polyimide film or a polyimide film which has been subjected to rubbing treatment. In a second embodiment, the substrate surface is coated with an aminosilane compound such as γ-aminopropyltriethoxysilane.

After growth of the polymer film, the film may be heated to improve the crystallinity and/or orientation. The post-heating temperature is around the melting point of the polymer. In case of the polyimide prepared from the combination of the diamine (III) and the dianhydride (IV), the post-heating temperature is from 200° to 400° C.

A film growth rate is preferably from 0.1 to 50 Å/sec. A good quality film can be obtained by decreasing the growth rate as the length or size of the diamine units increases. Therefore, a film growth rate of 0.1 to 5 Å/sec. is more preferred.

When a photosensitive film for a copying machine or a printer is produced by using the above vapor deposition method of the present invention, the substrate is in the form of a cylinder or a film.

Figure 2:
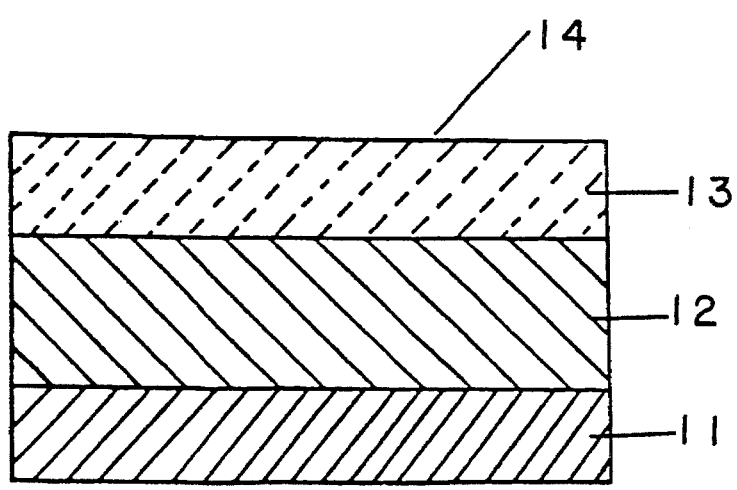

A cross section of an example of the photosensitive film according to the present invention is shown in FIG. 1 or FIG. 2. In case of the electric insulating substrate, surfaces of supports 1 and 11 are coated with a metal. The photosensitive film has a photoconductive layer 2 formed according to the present invention as shown in FIG. 1 or a photoconductive layer 12 formed according to the present invention and other layer 13 (e.g. an insulating layer or a carrier-transporting layer) as shown in FIG. 2. The order of the layers 12 and 13 may be reversed. Further, two or more photoconductive layers may be laminated on the substrate according to the present invention.

Figure 3:
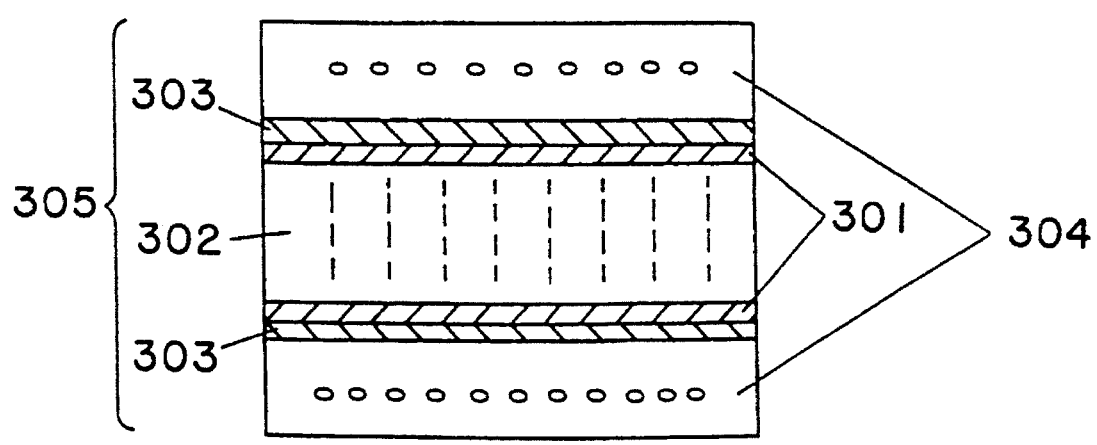
FIG. 3 is a cross section of an example of a liquid crystal display.
Figure 4:
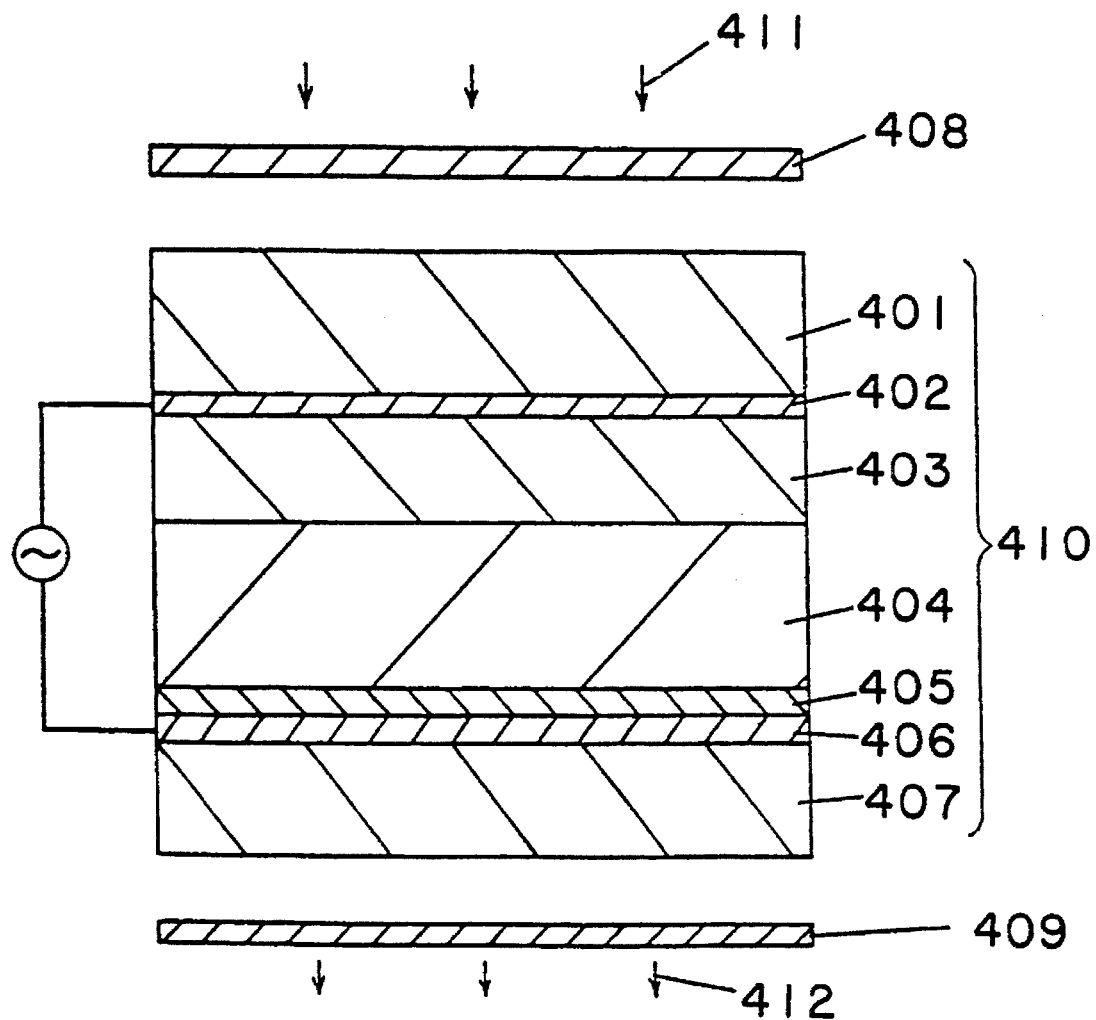
FIG. 4 is a cross section of an example of a liquid crystal spatial light modulator.

As an example for producing a liquid crystal orientation film which is used in a liquid crystal display or a liquid crystal spatial light modulator, FIGS. 3 and 4 show cross sections of the respective liquid crystal elements.

A liquid crystal panel 305 of FIG. 3 comprises orientation films 301, a liquid crystal layer 302, transparent electrodes 303 and glass substrates 304. A thickness of the orientation film 301 is from 300 Å to 10 Åm. When the photoconductive film according to the present invention is used as the orientation film 301, the polymer film is rubbed after film growth. As the orientation film, preferably the photosensitive film has a dark electric conductivity of at least $10^{-12}$/ohm.cm in order to decrease the spatial charge in the film.

When the orientation film has high photoconductivity, it can be used in a liquid crystal spatial light modulator 410 of FIG. 4, which comprises transparent substrates 401, 407, transparent electrodes 402, 406, a photoconductive orientation film 403, a liquid crystal 404, an orientation film 405, a polarizer 408 and an analyzer 409. By the use of the photoconductive orientation film 403, outgoing light 412 is modulated from incoming light 411.

In the present invention, the thickness of the photoconductive layer is, in general, from 1 to 50 μm, preferably from 5 to 30 μm.

When the photosensitive film is used as an electrographic sensitive material which should have good printing resistance, the organic copolymer preferably has a Vickers hardness of at least 10, preferably at least 30. Then, polyamide, polyamide imide, polyamide and polyether imide are preferred.

The film having better crystallinity has higher photocarrier generation efficiency and better carrier transporting ability. When the crystallinity is evaluated from an X-ray diffraction pattern, the copolymer has a specific diffraction peak at a position corresponding to a spacing between the adjacent polymer chains of 3 to 10 Å. When the crystallinity is further evaluated by a half-width of the diffraction peak, the half-width is not larger than 5 degrees, more preferably not larger than 2 degrees. In this case, a crystal thickness d expressed by the following Sherer's formula is at least 10 Å, preferably at least 25 Å:

$$d=0.9\times\gamma/\Delta\theta\cos\theta$$

in which d is a crystal thickness, γ is a wavelength of X-ray, Δθ is a half-width of the diffraction peak, and θ is a diffraction angle of the peak.

The crystallinity is at least 10%, preferably at least 30%, when it is evaluated by a ratio of the peak area attributed to the crystal region to the entire peak area in the X-ray diffraction pattern and also by density measurement.

When the polymer is polyimide or polyamide imide, an imidation ratio is at least 50%, preferably at least 80% in case of polyimide, or at least 60%, preferably at least 85% in case of polyamide imide. The imidation ratio is defined by an absorption coefficient ratio of an absorption coefficient at absorption wave numbers of about 1725 $cm^{-1}$ and about 1720 $cm^1$ for stretching vibration of imide ring carbonyl group to that at an absorption wave number of about 1500 $cm^{-1}$ for vibration of the benzene ring.

When an optical band gap is defined from a wavelength at which the optical absorption coefficient is $10^3$/cm, it is from 1.5 to 3.5 eV, preferably from 1.5 to 2.5 eV. With the increase of the carrier mobility, the dark electric conductivity increases. As the photoconductive material, the dark electric conductivity is preferably at least $10^{12}$/ohm.cm.

When the organic copolymer of the present invention is used for carrier generation and transportation, the dark electric conductivity is preferably at least $10^{-12}$/ohm.cm and not larger than $10^{-8}$/ohm.cm.

The characteristic: ημτ quantum efficiency, μ: carrier mobility, τ: carrier life) is at least $10^{-9}$ $cm^2/V$, preferably at least $10^{-8}$ $cm^2/V$.

Examples of the charge acceptor to be added are $I_2$, $Br_2$, $Cl_2$, ICl, IBr, $(NO_2)BF_4$, $(NO_2)PF_6$, $(NO_2)SbF_6$, $HClO_4$, $H_{2SO_4}$, $HNO_3$, $HSO_4^-$, $AgClO_4$, $Fe(ClO_4)$, $BF_3$, $FeCl_3$, $FeBr_3$, $AlCl_3$, $InCl_3$, $InI_3$, $ZrCl_4$, $HfCl_4$, $TeCl_4$, $TeBr_4$, $TeI_4$, $SnCl_4$, $SnI_4$, $SeCl_4$, $TiCl_4$, $TiI_4$, $FeCl_4^-$, $AlCl_4^-$, $AsF_5$, $SbF_5$, $NbCl_5$, $NbF_5$, $TaCl_5$, $TaI_5$, $MoCl_5$, $ReF_6$, $IrCl_6$, $InF_6$, $UF_6$, $OsF_6$, $XeF_6$, $TeF_6$, $SF_6$, $SeF_6$, $WF_6$, $WC16$, $ReF_7$, etc. Examples of the organic charge acceptor are TCNQ, TCNE, DDQ, etc.

In the photosensitive film of FIG. 1, it is possible to provide a barrier layer between the substrate and the photoconductive layer to prevent the carriers which are to be injected from the substrate to the photoconductive layer. Examples of the barrier material are metal oxides (e.g.

$Al_2O_3$, BaO, $BaO_2$, BeO, $Bi_2O_3$, CaO, $CeO_2$, $Ce_2O_3$, $La_2O_3$, $Dy_2O_3$, $Lu_2O_3$, $Cr_2O_3$, CuO, $Cu_2O$, FeO, PbO, MgO, SrO, $Ta_2O_3$, $ThO_2$, $ZrO_2$, $HfO_2$, $TiO_2$, TiO, $SiO_2$, $GeO_2$, SiO, GeO, etc.), metal nitrides (e.g. TiN, AlN, SnN, NbN, TaN, GaN, etc.), metal carbides (e.g. WC, SnC, TiC, etc.), insulating materials (e.g. SiC, SiN, GeC, GeN, BC, BN, etc.), and heat resistant organic polymers (e.g. polyimide, polyamide imide, polyacrylonitrile, etc.).

On a free surface 3 or of FIG. 1 or 2, a surface coating layer may be provided. Examples of the surface coating material are $Si_xO_{1-x}$, $Si_xC_{1-x}$, $Si_xN_{1-x}$, $Ge_xO_{1-x}$, $Ge_xC_{1-x}$, $Ge_xN_{1-x}$, $B_xNi_{1-x}$, $B_xC_{1-x}$, $Al_xN_{1-x}$ in which x is larger than 0 (zero) and smaller than 1 (one) and carbon. They may contain hydrogen or halogen.

When plural photoconductive layers are present and one containing no photoconductive material of the present invention comprises an organic semiconductive material, it comprises (i) phthalocyanine pigments such as metal-free phthalocyanine (Pc) Met-Pc (in which Met is a metal such as Cu, Ni, Co, TiO, Mg or $Si(OH)_2$), AlClPcCl, TiOClPcCl, InClPcCl, InClPc, InBrPcBr, etc.; (ii) azo dyes such as monoazo dyes and diazo dyes; (iii) penillene base pigments such as penillenic anhydride and penillenic imide; (iv) indigo dyes; (v) quinacridone pigments; (vi) polycyclic quinones such as anthraquinones and pyrenequinones; (vi) cyanine dyes; (vii) xanthene dyes; (viii) charge transfer complexes such as PVK/trinitrofluorenone; (ix) eutectic complex formed from pyrilium salt dye and polycarbonate resin; and (x) azulenium salt compounds. As inorganic materials, chalcogenide materials such as Se, SeAs, $As_2Se_3$ and CdS, or amorphous materials comprising at least one of silicon, germanium and carbon and a modifier which decreases a localized level density (e.g. hydrogen or halogen elements) are exemplified.

When the copolymer of the present invention is used as the photoconductive material, the addition of other organic material having a decomposition temperature higher than a crystallization temperature of the copolymer will increase the sensitivity of the photoconductive material.

Then, according to a fourth aspect of the present invention there is provided a photoconductive material comprising the alternating copolymer of the present invention and at least one other organic material which has a decomposition temperature higher than a heating temperature for crystallizing the copolymer and is dispersed in the copolymer.

When the additive material is added to the polymerization system before starting the polymerization, it is homogeneously dispersed in the obtained copolymer matrix.

Examples of the organic material used as the additive are phthalocyanine pigments, perylene pigments, etc. Among them the phthalocyanine pigments are preferred since they have an absorption band in a longer wavelength region and high carrier generating ability. In addition, the phthalocyanine pigment has a high decomposition temperature higher than 400° C. The phthalocyanine compound includes not only metal-free phthalocyanine (Pc) but also metal-containing phthalocyanine compound such as Met-Pc (in which Met is a metal such as Cu, Ni, Co, TiO, Mg or Si(OH)2), AlClPcCl, TiOClPcCl, InClPcCl, InClPc, InBrPcBr, etc.

The amount of the additive organic material is from 0.01 to 20% by weight based on the copolymer weight.

To prepare such photoconductive material, the copolymer and the diamine (III) and the additive organic material are dissolved in an organic solvent (e.g., N,N'-dimethylacetamide, 1-methyl-2-pyrrolidinone, N,N-dimethylformamide, m-cresol, etc.) and then the carboxylic dianhydride (IV) is added to the solution to effect condensation to obtain the polymer or oligomer in which the additive organic material is dispersed. Preferably, the obtained polymer is post-heated to increase the crystallinity.

In the polymer matrix, the additive organic material forms a charge-transfer complex. The formed charge-transfer complex has two functions. First, a new light absorption region is generated between the absorption bands which are inherent to the organic copolymer and the additive organic material. Second, through the new absorption region, the charge generated in the dispersed organic material by the light absorption is effectively transferred to the copolymer matrix. By the above functions, the photoconductive material has a wider sensitive region including IR wavelength region.

The photoconductive material may be used in the same manner as above to produce the photosensitive film of FIG. 1.

As described above in connection with FIG. 4, the photoconductive material according to the present invention is useful as a component of the liquid crystal spatial light modulator to be used in an optical arithmetic unit or a projection display.

In one embodiment, a liquid crystal spatial light modulator comprises a liquid crystal layer, a pair of photoconductive layers which sandwich the liquid crystal layer and a pair of conductive electrodes which sandwich the photoconductive layers, and the photoconductive layers are made of the polymer comprising the repeating units of the formula:
$$-(X_i-Y_i)_n-$$
wherein $X_i$, $Y_i$, n and i are the same as defined in the formula (III). In a preferred embodiment, one of the photoconductive layers is made of the polymer comprising the repeating units of the formula:

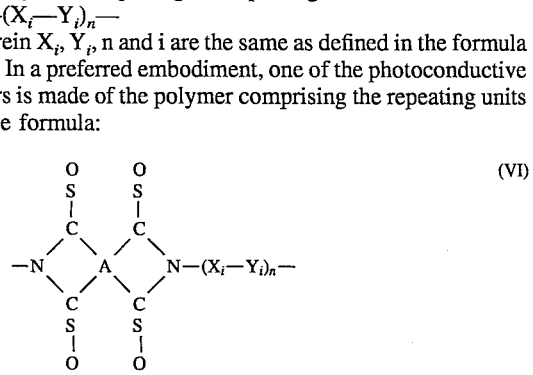

(VI)

wherein $X_i$, $Y_i$, A, n and i are the same as defined above.

In another preferred embodiment, a first layer of the polymer (VI) is formed on the electrode on one substrate and then a second layer of the polymer (VI) is formed. Thereafter, the modulator element is heated at a temperature not higher than the melting point of the polymer (VI).

The present invention will be illustrated by following Examples.

EXAMPLE 1

As a copolymer comprising the units of the formula (I), a polyimide was used and its photoconductivity was evaluated in terms of electrophotographic sensitivity.

To prepare the polyimide, pyromellitic anhydride (hereinafter referred to as "PMDA-Ar") or 3,3',4,4'-benzophenonetetracarboxylic dianhydride (hereinafter referred to as "BPDA-Ar") was used as a carboxylic anhydride component, and p-phenylenesulfide diamine (PSDA) having a different polymerization degree (n=1, 2, 3, 4, 5 or 6) was used as a diamine component.

PSDA was prepared as follows:

(1) Polymerization degree of 2

To dimethylformamide (DMF) (40 cc), p-dibromobenzene (3.54 g, 0.015 mol), p-aminothiophenol (4.5 g, 0.036 mol) and potassium carbonate (4.9 g, 0.036 mol) were added, and a mixture was refluxed at about 150° C. for 6 hours.

A resulting solution was poured in pure water (180 cc) to precipitate a white solid. The white solid was dissolved in ethanol and recrystallized to obtain a needleshape colorless crystal.

(2) Polymerization degrees of 3 and 4

Diphenyl sulfide and 1,4-bis(phenylthio)benzene were brominated. Diphenyl sulfide (29.4 g, 0.1 mol) and N-bromosuccinic imide (35.6 g, 0.2 mol) were added to DMF (100 cc). After stirring for about 5 hours, a white crystal was formed in DMF. The crystal was recovered from DMF by filtration and washed with pure water thoroughly. 1,4-bis(phenylthio)benzene was brominated in the same manner.

The washed crystal was used in the next step without recrystallization.

The brominated compound and thiophenylamine were copolymerized in the same manner as in (1). Namely, a mixture of dibromophenyl sulfide (5.18 g, 0.015 mol), p-aminothiophenol (4.5 g, 0.036 mol) and potassium carbonate (4.9 g, 0.036 mol) in DMF was refluxed at about 150° C. for about 6 hours. Then, in the same manner as above, the product was recrystallized to obtain a crystal diamine having a polymerization degree of 3.

1,4-Bis(p-bromophenylthio)benzene was obtained in the same manner.

(3) Polymerization degrees of 5 and 6

A chloride of the diamine having the polymerization degrees of 3 and 4 was polymerized with thiophenylamine to obtain a produce having a polymerization degree of 5 and 6.

A chloride of the diamine having the polymerization degrees of 3 and 4 was prepared by reacting dibromophenyl sulfide or 1,4-bis(p-bromophenylthio)benzene with 4-chlorothiophenol.

To a bromide of each compound (0.015 mol), 4-chlorothiophenol (0.036 mol) and potassium carbonate (0.036 mol) were added and refluxed at about 150° C. for about 6 hours. A formed precipitate was dissolved in DMF and recrystallized.

Separately, thiophenylamine (2.5 g, 20 mmol) was gradually added to a mixture of N-methylpyrrolidone (50 cc) and sodium hydride (0.6 g) to obtain a sodium salt of thiophenylamine. Hydrogen generation was vigorous during addition and stopped at the end of reaction. To this solution, the chloride of the diamine having the polymerization degree of 3 (4.8 g, 10 mmol) was poured and heated at a temperature of 160° to 180° C. for 8 hours with stirring. Then, a resulting solution was poured in pure water (450 cc) to precipitate a product, which was recrystallized from DMF to obtain a diamine having a polymerization degree of 5. A diamine having a polymerization degree of 6 was prepared in a similar way.

Before the formation of a polyimide film, a polyamic acid precursor was synthesized. The carboxylic anhydride (10 mmol) and the diamine (10 mmol) were added to dimethylacetamide (hereinafter referred to as "DMAc") (30 cc) and stirred for 1 hour. From this polyamic acid, a film of 8 to 20 μm in thickness was coated on a metal (aluminum) plate by dipping.. After drying the film at 120° C. for 30 minutes to remove DMAc, the film was imidized at a temperature higher than 200° C. Such heating also promoted crystallization of the polymer in the film.

In general, a crystallizable polymer is crystallized by heating in a temperature range from a crystallization temperature (glass transition temperature) to a melting point. Heating at a temperature slightly lower than the melting point increases a thickness of the polymer single crystal. On the other hand, since the melting point of the polymer rises as the thickness of the crystal increase, to increase the thickness of the crystal, a heating temperature is preferably shifted to a higher side.

A relationship between the heating temperature and photoconductivity will be explained by making reference to a case where PMDA-Ar or BPDA-Ar is used as a carboxylic anhydride.

The photoconductivity is expressed in terms of a half-value exposure ($E_{1/2}$ (lux.sec.)) which is used in the evaluation of electrophotographic photoconductors. The half-value exposure is measured by a charge exposure tester (manufactured by Kawaguchi Denki Kabushikikaisha) at an initial charge voltage of 600 V and expressed as an exposure value of a white halogen light required for decreasing a surface electric potential to a half. Thermal treatment of each polyimide was done by quenching a sample after keeping it at a specific temperature for 1 to 4 hours.

Table 1 shows melting points of the polyimides and Table 2 shows their $E_{1/2}$ (lux.sec.) after keeping them at a suitable temperature around the respective melting point for 4 hours.

TABLE 1

| Polymerization | Melting point (°C.) | |
|---|---|---|
| degree (n) | PMDA-Ar | BPDA-Ar |
| 1 | — | — |
| 2 | 400 | 310 |
| 3 | 250 | 270 |
| 4 | 250 | 250 |
| 5 | 230 | 220 |
| 6 | 200 | 200 |

TABLE 2

| Polymerization | Half-value exposure ($E_{1/2}$ (lux · sec.)) | |
|---|---|---|
| degree (n) | PMDA-Ar | BPDA-Ar |
| 1 | 1500 | 2000 |
| 2 | 11 | 4 |
| 3 | 36 | 18 |
| 4 | 7 | 6 |
| 5 | 15 | 12 |
| 6 | 5 | 5 |

Figure 5:
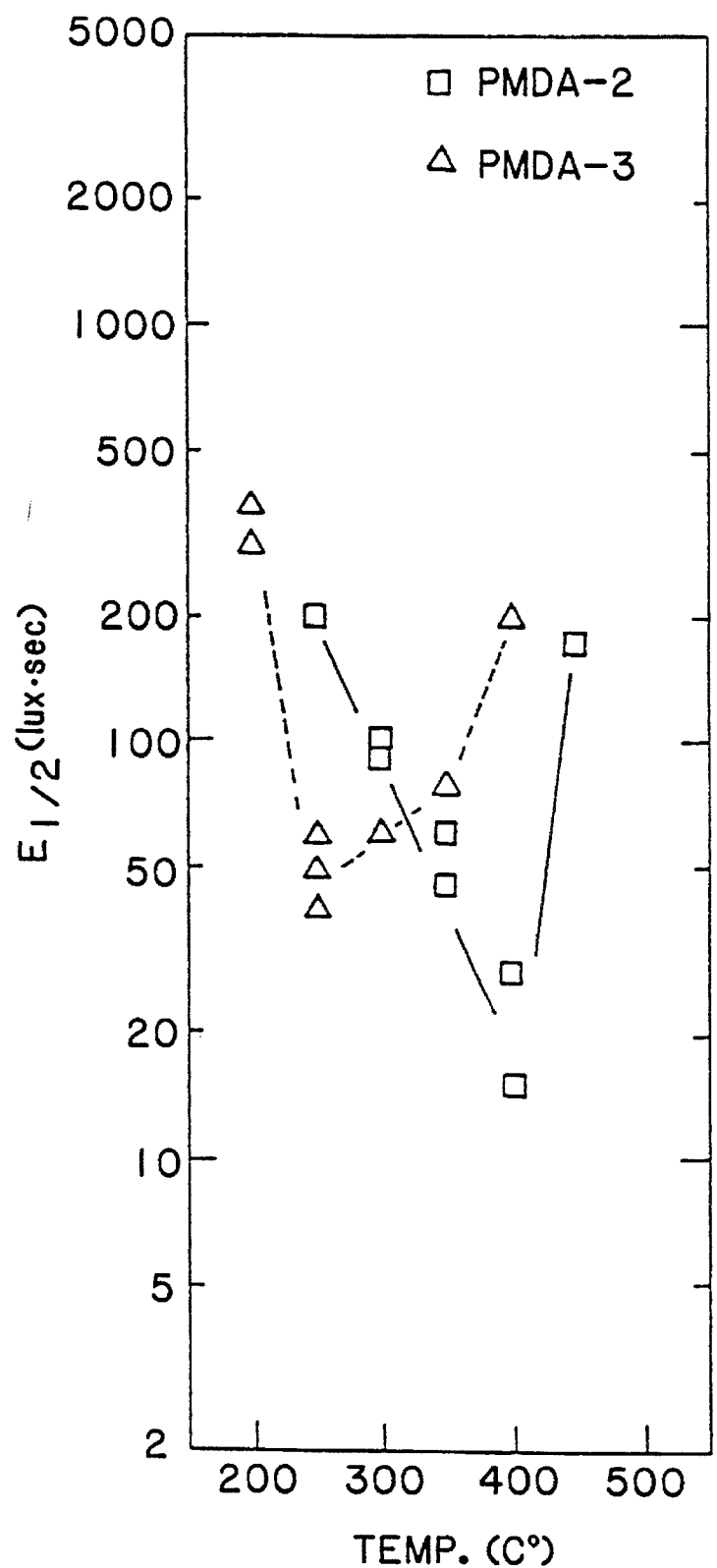
FIGS. 5 and 6 show relationships between $E_{1/2}$ and the treating temperature in Example 1.
Figure 6:
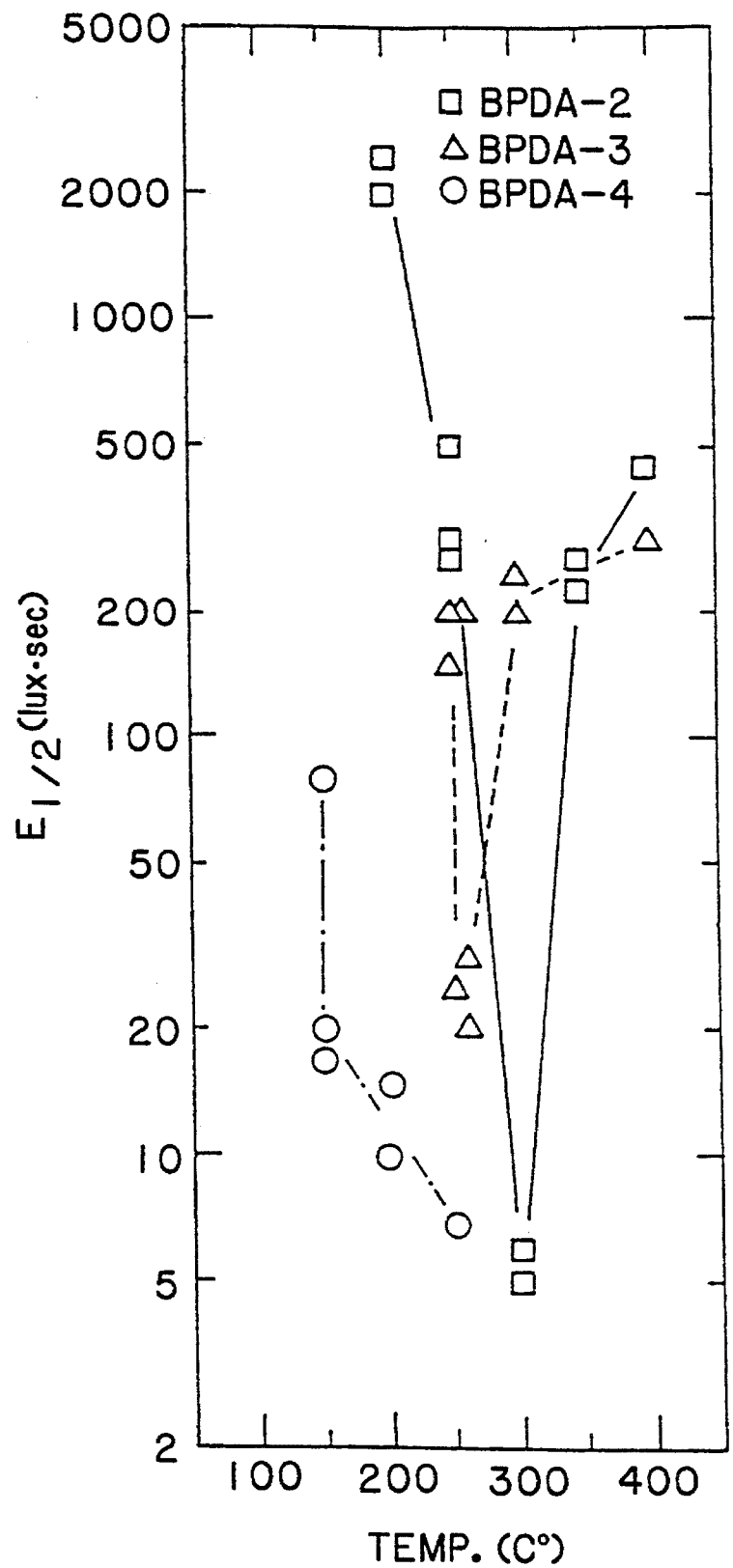

As examples of the sensitivity change, FIG. 5 shows the results for the polyimide comprising PMDA and having the polymerization degree of 2 or 3 (PMDA-2 or PMDA-3 in FIG. 5) and FIG. 6 shows the results for the polyimide comprising BPDA and having the polymerization degree of 2, 3 or 4 (BPDA-2, BPDA-3 or BPDA-4 in FIG. 5). The sensitivity Was greatly improved by the thermal treatment around the respective melting point.

With other polyimide films, the sensitivity is greatly improved by the thermal treatment around the melting point of the polyimide. However, if the polyimide film is quenched from a temperature higher than the melting point to room temperature, the sensitivity of the polyimide film is deteriorated.

Figure 7:
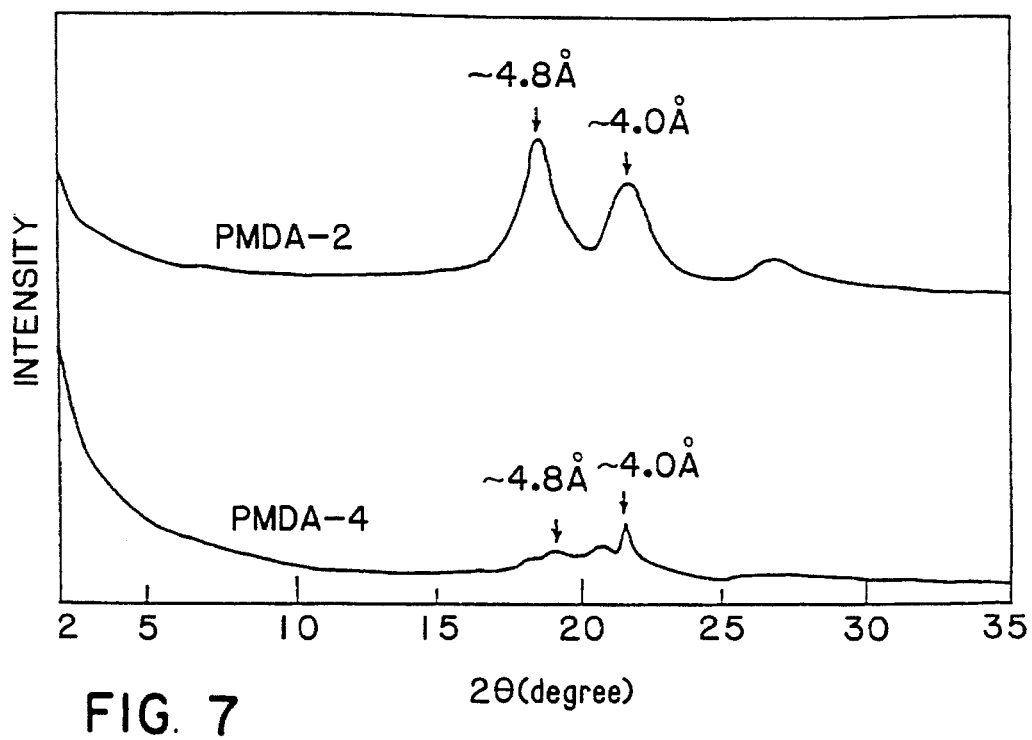
FIGS. 7 and 8 are X-ray diffraction patterns of PMDA (n=2 and 4) and BPDA (n=2 and 4) in Example 1.
Figure 8:
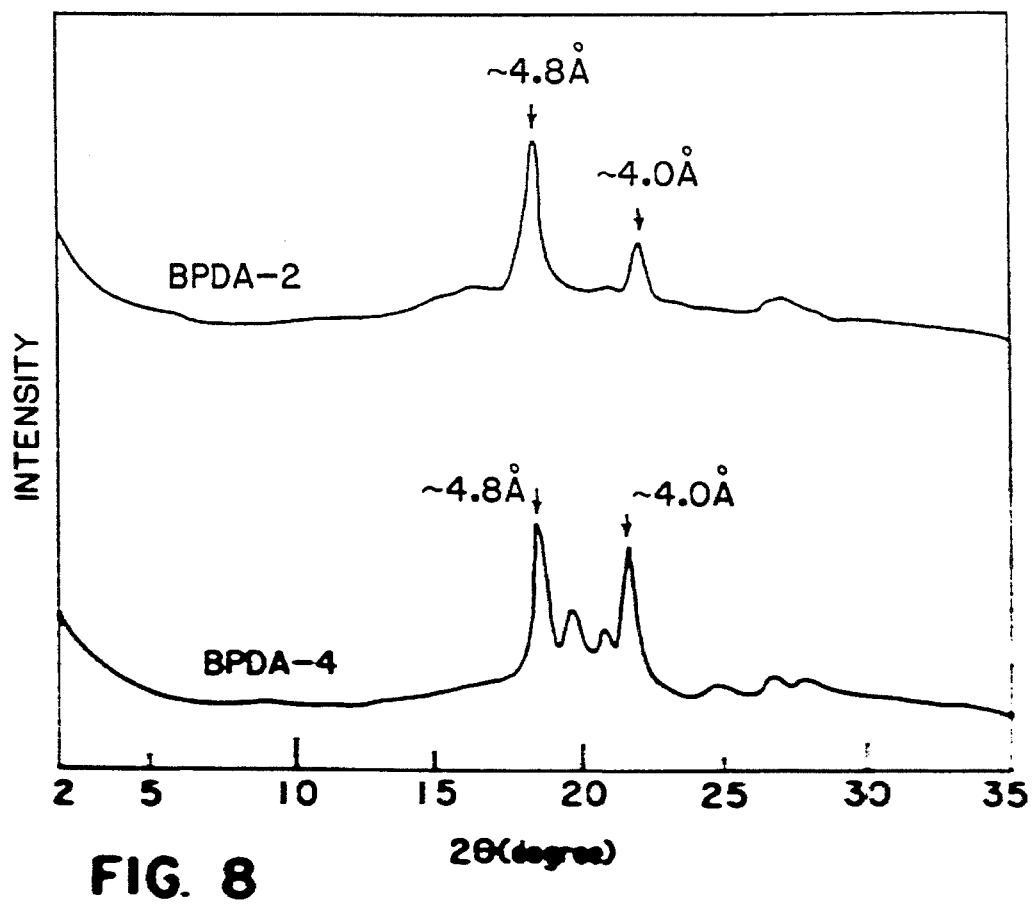

By the thermal treatment around the melting point, crystallinity of the polyimide film is improved. Such improvement of the crystallinity will be explained by making reference to the X-ray diffraction patterns of PMDA (n=2 and 4) and BPDA (n=2 and 4) shown in FIGS. 7 and 8, respectively.

There are peaks at 2θ corresponding to spacings of about 4.0 Å (2θ=about 22°) and about 4.8 Å (2θ=about 18.6°), and half value widths of the diffraction peaks are 4 to 0.3 degree which indicate that the crystallinity is good. Because of improved crystallinity, the sensitivity is increased. Half value widths of the peaks for each polyimide film are shown in Tables 3 and 4.

TABLE 3

| Polymerization degree (n) | Half value width (degrees), 4.8 Å | |
|---|---|---|
| | PMDA-Ar | BPDA-Ar |
| 1 | — | — |
| 2 | 2.0 | 0.6 |
| 3 | — | 1.7 |
| 4 | 0.7 | 0.6 |
| 5 | 1.0 | 0.5 |
| 6 | 0.8 | 0.3 |

TABLE 4

| Polymerization degree (n) | Half value width (degrees), 4.8 Å | |
|---|---|---|
| | PMDA-Ar | BPDA-Ar |
| 1 | — | — |
| 2 | 1.5 | 0.6 |
| 3 | — | 1.5 |
| 4 | 1.0 | 0.7 |
| 5 | 0.4 | 0.6 |
| 6 | 1.0 | 0.5 |

When the change of the crystallinity which is expressed as a ratio of the peak area attributed to the crystal region to the whole peak area is observed in connection with the thermal treatment temperature, in both the PMDA and BPDA cases, the polymers are amorphous in a low sensitivity range of $E_{1/2}$ of not smaller than 50 lux.sec. The crystallinities of the polyimides after thermal treatment are shown in Table 5.

TABLE 5

| Polymerization degree (n) | Crystallinity (%) | |
|---|---|---|
| | PMDA-Ar | BPDA-Ar |
| 1 | — | — |
| 2 | 8.0 | 15 |
| 3 | 4.0 | 7.0 |
| 4 | 25 | 35 |
| 5 | 10 | 20 |
| 6 | 38 | 53 |

Figure 9:
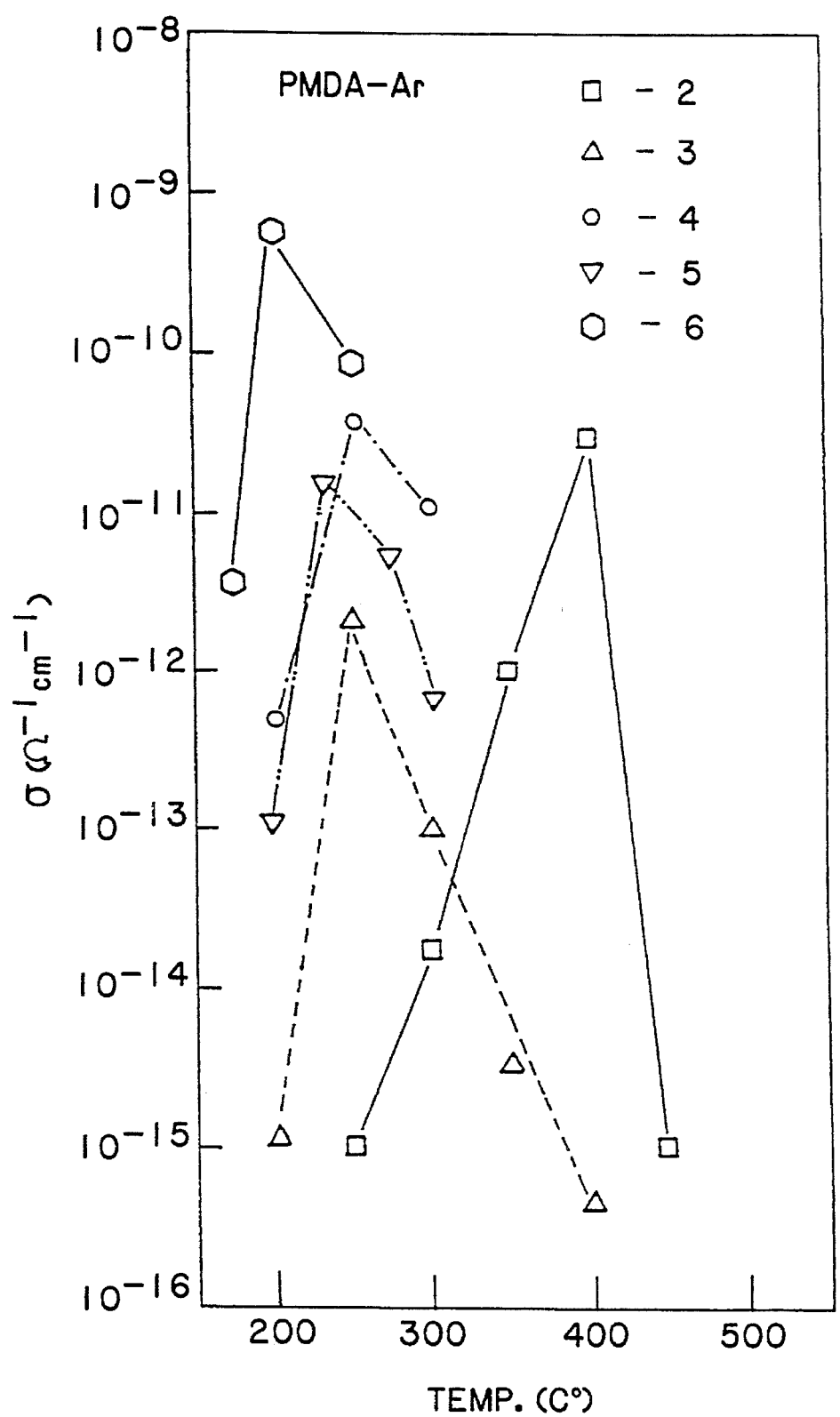
FIGS. 9 and 10 show the changes of the dark electric conductivity of PMDA-Ar and BPDA-Ar, respectively after the thermal treatment at various temperature.
Figure 10:
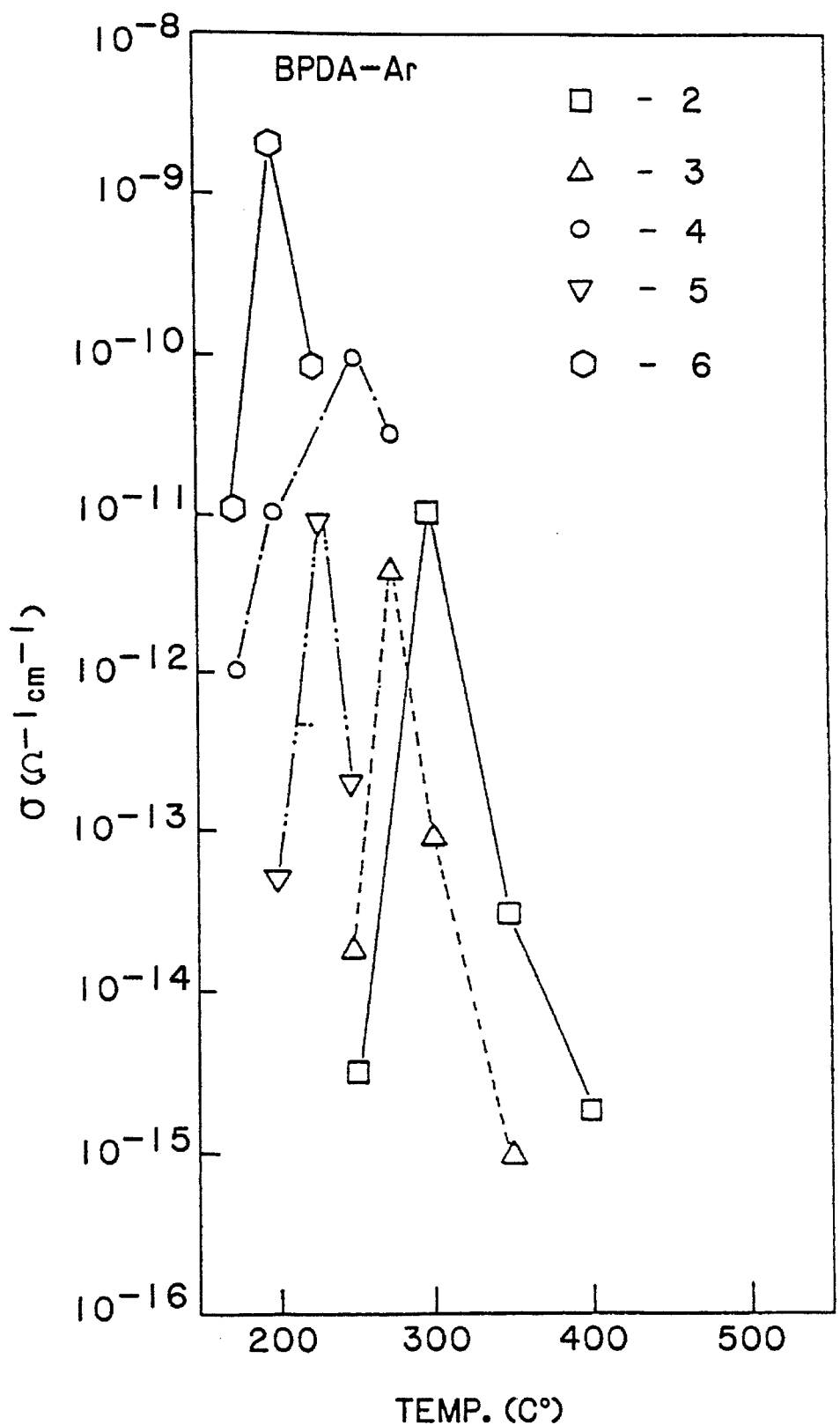

With the increase of the crystallinity, the dark electric conductivity and the optical band gap of each polyimide film were decreased. FIGS. 9 and 10 show the changes of the dark electric conductivity of PMDA-Ar and BPDA-Ar, respectively after the thermal treatment at various temperature. In each polyamide film, the sensitivity greatly changed at $10^{-12}$/ohm.cm. or larger.

Figure 11:
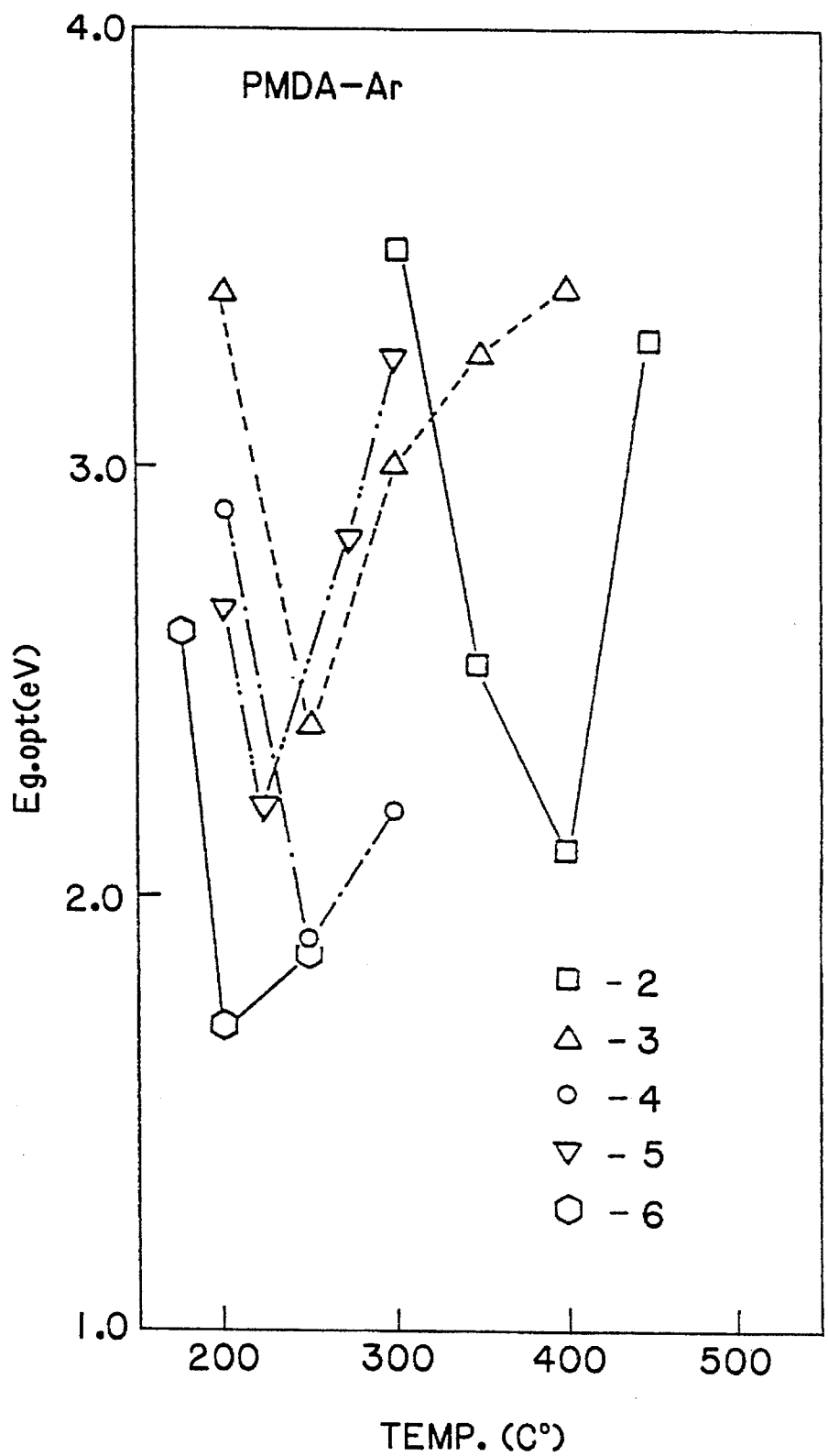
FIGS. 11 and 12 show the changes of the band gap of the copolymer comprising PMDA-Ar and the copolymer comprising BPDA-Ar, respectively.
Figure 12:
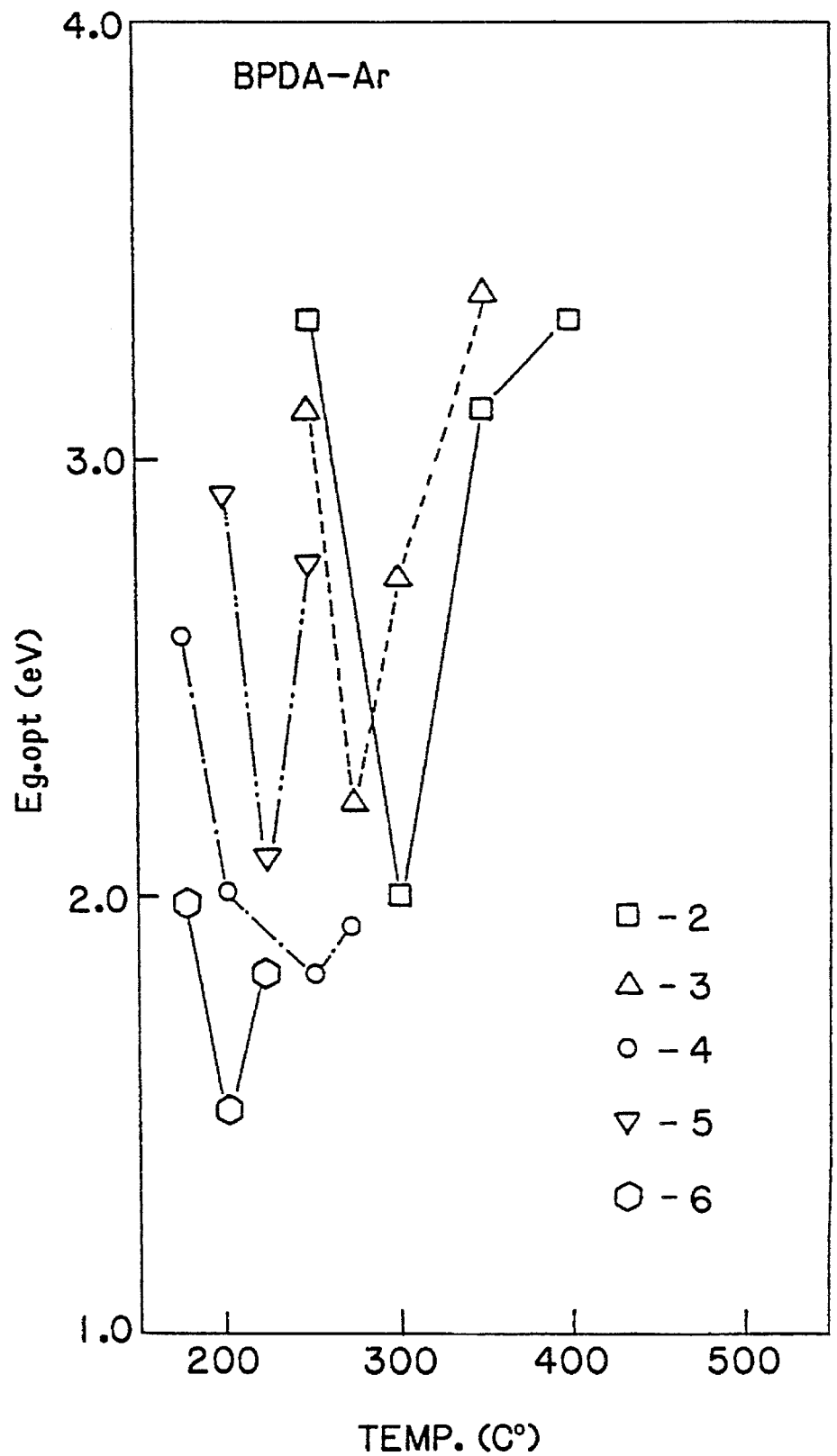
Figure 13:
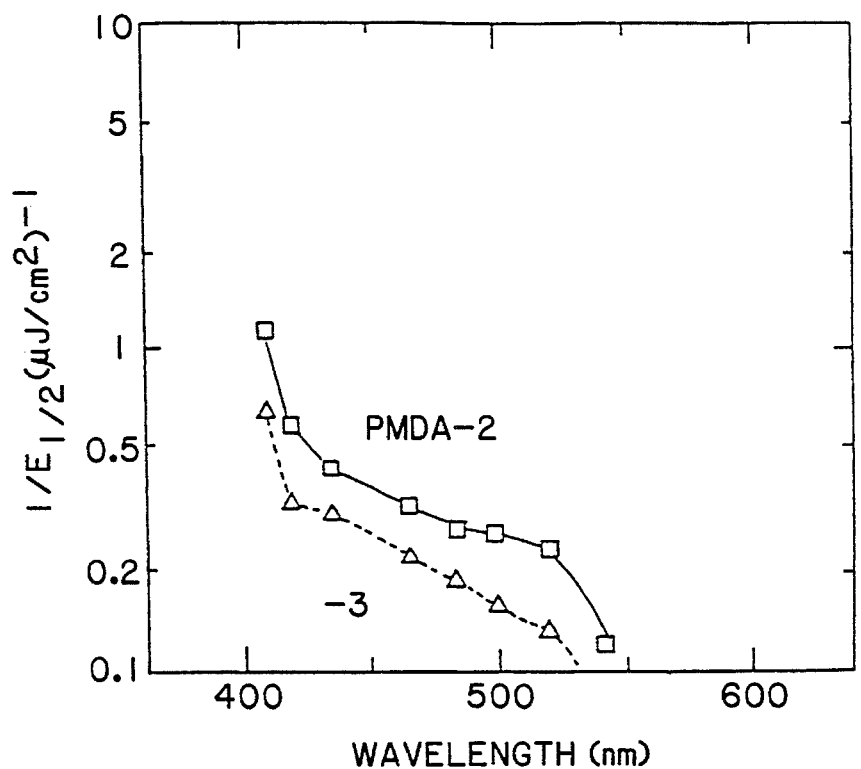
FIGS. 13 and 14 show sensitivities of the copolymer comprising PMDA and the copolymer comprising BPDA, respectively.
Figure 14:
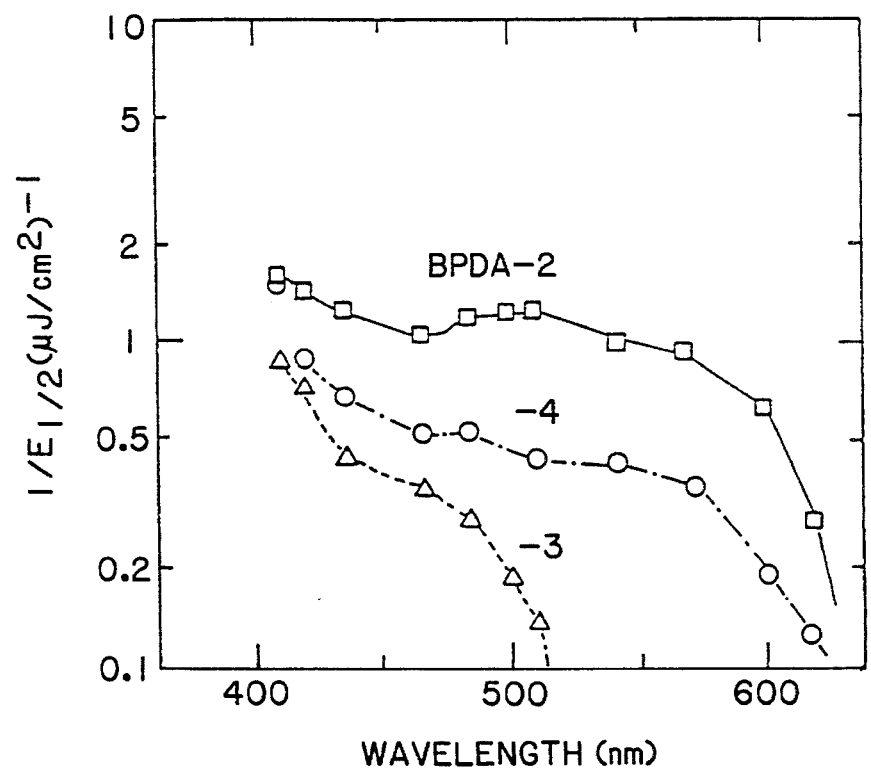

FIGS. 11 and 12 show the changes of the band gap of the copolymer comprising PMDA-Ar (n=2 to 6) and the copolymer comprising BPDA-Ar (n=2 to 6), respectively. As understood from FIGS. 11 and 12, the band gap decreased with the crystallization. In both of PMDA and BPDA, when the number of phenyl groups is an odd number (namely n is an even number), the band gap tends to be 1.6 to 2.5 eV, while when the number of phenyl groups is an even number (namely n is an odd number), the band gap tends to be 2.2 to 3.5 eV. In view of the sensitivity to the exposure with the white light, the odd number type diamine has better sensitivity in terms of the half-value exposure. FIGS. 13 and 14 show sensitivities of the copolymer comprising PMDA (n=2 and 3) and the copolymer comprising BPDA (n=2), respectively in terms of an inverse of the half-value exposure ($1/E_{1/2}$ ($\mu J/cm^2$)). In case of BPDA-2, good sensitivity of lower than 1.0 $\mu J/cm^2$ was kept in the wavelength region up to 560 nm.

EXAMPLE 2

In this Example, relationships of the thermal treating methods with a degree of crystallinity and a photoconductivity are studied. The used crystalline polymer was BPDA-2 which was used in Example 1.

A solution of a polyamic acid solution was prepared in the same method as in Example 1, coated on a substrate and then dried. By thermal treatment of the produced film at a temperature around the melting point of this polymer, the photoconductivity was greatly increased. Such temperature is an optimum temperature for crystallization.

Figure 15:
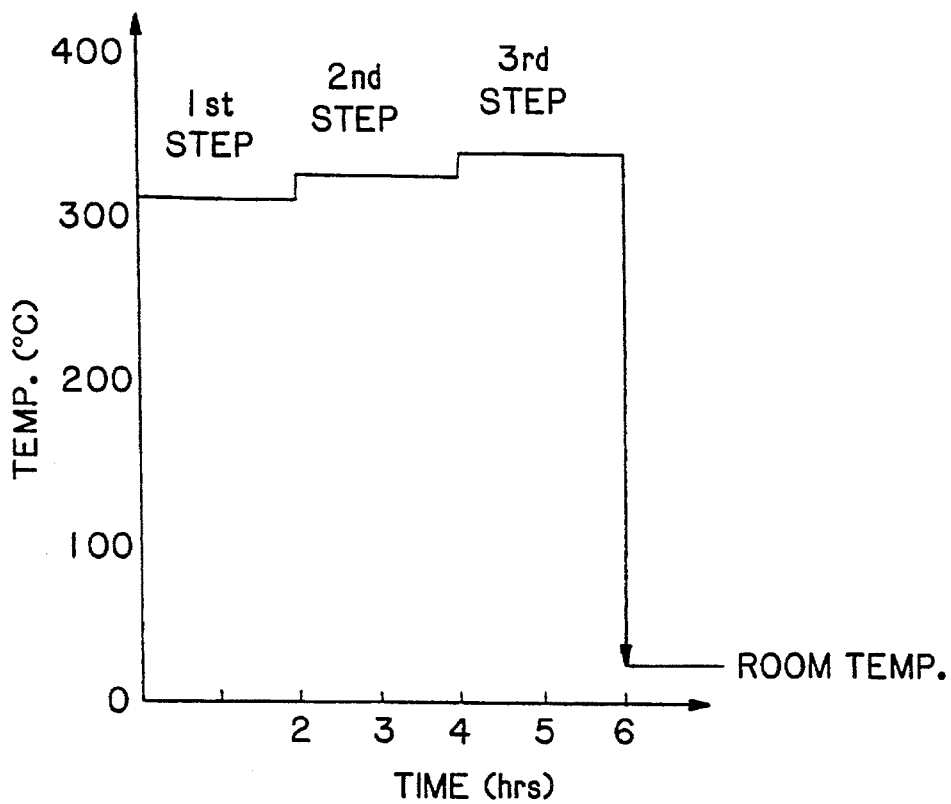
FIG. 15 shows the three step treatment conditions.
Figure 16:
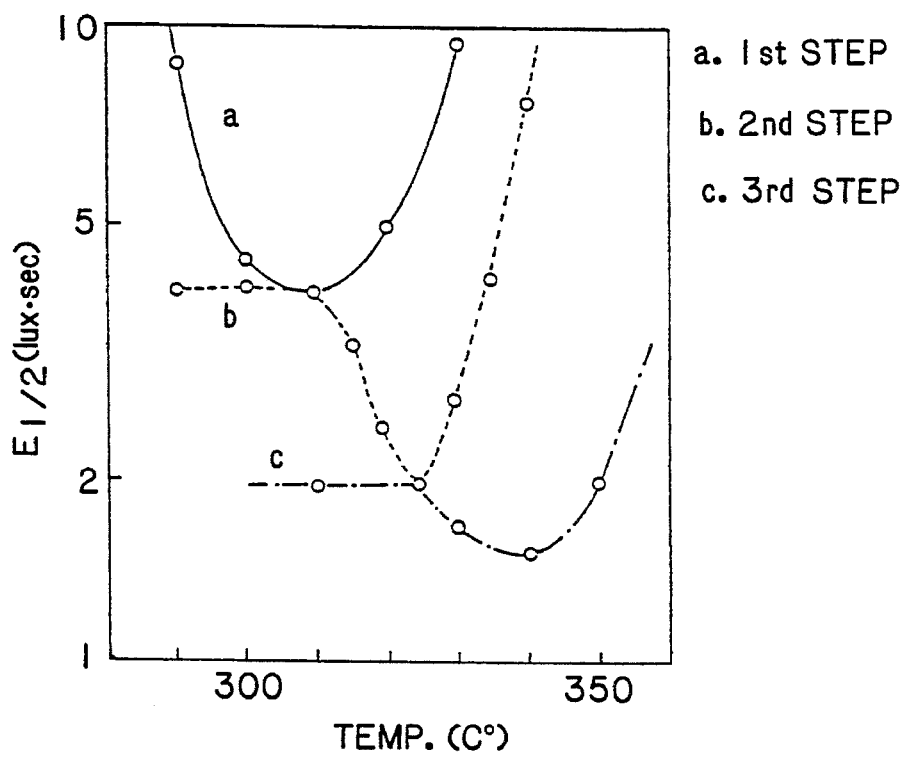
FIG. 16 shows the change of sensitivity by the three step treatment.

In this Example, thermal treating steps at various temperatures were carried out. In each step, the treating temperature was raised in accordance with the increase of the melting point in connection with the progress of crystallization. FIG. 15 shows the treatment of three steps in which three different temperatures were used. In this case, the melting point in the step 1 was 310° C., and it was increased to 325° C. in the second step and 340° C. in the third step. Thereafter, the melting point was saturated, namely did not increase. In each step, the treating time was 2 hours. The change of sensitivity is shown in FIG. 16. After each thermal treating step, the half-value exposure was measured as in Example 1. The sensitivity increased from 4.0 lux.sec. after the first step to 2.0 lux.sec. and 1.5 lux.sec. after the second and third steps, respectively.

The crystallinity also improved since the halfvalue width of the peak corresponding to about 4.8 Å spacing in the X-ray diffraction pattern decreased from 0.5 degree after the first step to 0.35 and 0.3 degree after the second and third steps, respectively. The crystal thickness after the third step was about 250 Å.

Then, effects of slow cooling in the cooling step to room temperature were studied.

Figure 17:
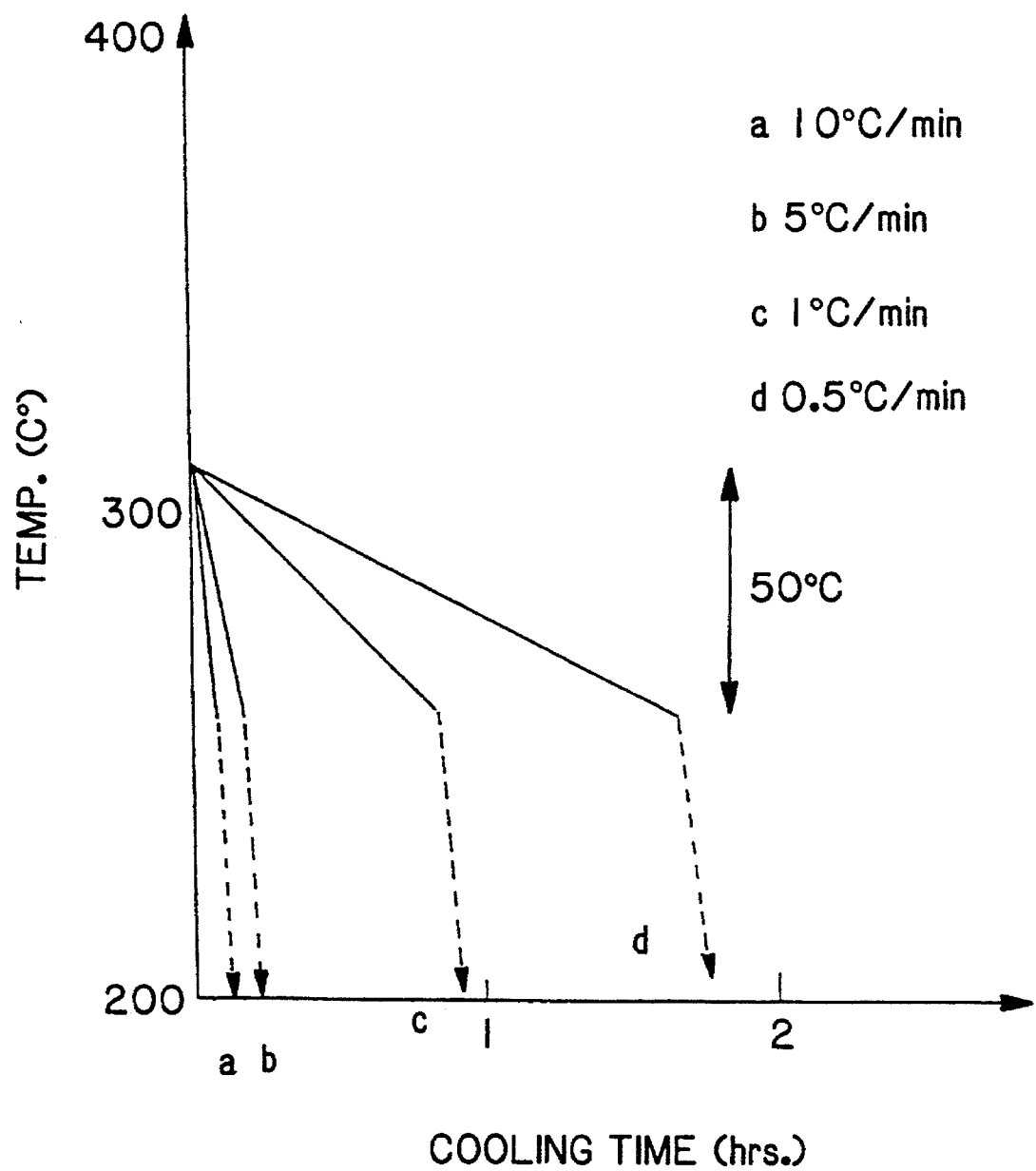
FIG. 17 shows the cooling conditions after heating treatment, FIG. 18 show the spectral sensitivity curve in Example 4.

In each step, since the optimum treating temperature is around the melting point of the polyimide, the polyimide film was slowly cooled to a certain temperature lower than the melting point and then quenched to room temperature. After each of three steps, the film was slowly cooled as shown in FIG. 17. A cooling temperature range was set at degrees, and a cooling rate was 10° C./min., 5° C./min., 1° C./min. or 0.5° C./min.

The changes of sensitivity (lux.sec.) against the cooling rate are shown in Table 6.

TABLE 6

| Cooling rate (°C./min.) | 10 | 5 | 1 | 0.5 |
|---|---|---|---|---|
| First step | 4.0 | 3.7 | 3.5 | 3.5 |
| Second step | 2.0 | 1.8 | 1.7 | 1.7 |

TABLE 6-continued

| Cooling rate (°C./min.) | 10 | 5 | 1 | 0.5 |
|---|---|---|---|---|
| Third step | 1.5 | 1.3 | 1.2 | 1.2 |

When the cooling rate was 1° C./min. or less in each step, the sensitivity decreased from 4 to 3.5 lux.sec. after the first step, from 2 to 1.7 lux.sec. after the second step, and from 1.5 to 1.2 lux.sec. after the third step.

The effects of heating and cooling manners in the thermal treatment are studied in combination.

The polyimide film was heated from 310° C. to 340° C. at a constant heating rate and then cooled from 340° C. to 290° C. at a cooling rate of 1° C./min. followed by quenching to room temperature. When the heating rate was 0.5, 0.25 or 0.1° C./min. the sensitivity was 10, 1.2 or 1.2 lux.sec., respectively. These results mean that the heating rate not larger than 0.25° C./min. is preferred.

At the heating rate of 0.5° C./min., the temperature rise was faster than the increase of the melting point due to progress of crystallization, so that the thermal treatment was carried out at a temperature higher than the melting point during the heating step.

EXAMPLE 3

In the same manner as in Example 1 but using, as a carboxylic anhydride, 3,3',4,4'-biphenyltetracarboxylic dianhydride (hereinafter referred to as "BiP 1"), 1,1',5,5'-biphenyltetracarboxylic dianhydride (hereinafter referred to as "BiP 2"), naphthalene-1,4,5,8-tetracarboxylic dianhydride (hereinafter referred to as "NDA 1"), naphthalene-2,3,6,7tetracarboxylic dianhydride (hereinafter referred to as "NDA 2") or perylene-3,4,9,10-tetracarboxylic dianhydride (hereinafter referred to as "PEDA"), four kinds of diamine films (n=1 to 4) were prepared and their photoconductivity was measured. In comparison with the polyimides of Example 1, the polyimides of this Example had a group rich in a condensed polycyclic system, so that the increase of sensitivity in a longer wavelength range was expected.

After preparing the polyamic acid in the same manner as in Example 1, it was coated on the substrate and dried to obtain a film of 10 to 20 μm in thickness. With the polymerization degree of 1 (one), no crystalline polymer was obtained in all combinations. With all of other combinations, the polyimide films were crystallized by thermal treatment around the melting point. Tables 7 and 8 show the melting points and the sensitivity ($E_{1/2}$ (lux.sec.)) of the polyimides, respectively.

TABLE 7

| Polymerization degree (n) | 2 | 3 | 4 |
|---|---|---|---|
| BiP 1-Ar | 400 | 350 | 350 |
| BiP 2-Ar | 370 | 350 | 330 |
| NDA 1-Ar | 430 | 400 | 400 |
| NDA 2-Ar | 400 | 350 | 350 |
| PEDA-Ar | 400 | 400 | 370 |

TABLE 8

| Polymerization degree (n) | 2 | 3 | 4 |
|---|---|---|---|
| BiP 1-Ar | 55 | 70 | 35 |
| BiP 2-Ar | 3 | 12 | 6 |
| NDA 1-Ar | 5 | 25 | 8 |
| NDA 2-Ar | 3 | 8 | 4 |
| PEDA-Ar | 2 | 7 | 3 |

EXAMPLE 4

In the diamine having the large polymerization degree used in Example 1, a condensed polycyclic group was incorporated, and a polyimide consisting of this diamine derivative and PMDA was synthesized and its photoconductivity was evaluated. The incorporated group was anthracene or perylene. The polyimide containing the incorporated anthracene group had the structure of A4, and that containing the incorporated perylene group had the structure of A5.

The synthesis of the diamine derivative containing the incorporated anthracene group is explained.

(i) Incorporation of anthracene

In NMP (40 cc), aminothiophenol (4.5 g, 0.036 mol) and sodium hydride (1.1 g) were added. Hydrogen was vigorously generated. After the generation of hydrogen stopped, 9,10-dichloroanthracene (3.7 g, 0.015 mol) was added to the mixture and stirred at 110° to 120° C. for about 3 hours. A resulting solution was poured in pure water (350 cc) to obtain a yellow precipitate. After filtration, the precipitate was recrystallized from a mixed solvent of 1,2-dichloroethane and ethanol to obtain a needle-shape yellow crystal of a diamine. This diamine had a polymerization degree of 3 (9,10-bis(p-thiophenylamine)anthracene) (hereinafter referred to as "ANDA 1").

An diamine having a polymerization degree of 5 will be explained.

In the same manner as in the synthesis of ANDA 1 but using p-chlorothiophenol in place of aminothiophenol, 9,10-bis(p-chlorothiophenyl)anthracene was synthesized. Then, by the same reaction procedures as above but using this dichloride in place of 9,10-dichloroanthracene, a desired product having a polymerization degree of 5 (hereinafter referred to as "ANDA 2") was prepared.

(ii) Incorporation of perylene

The procedures were substantially the same as in the case of incorporation of anthracene.

A diamine derivative comprising perylene having a polymerization degree of 3 or 5 (hereinafter referred to as "PEDA 1" or "PEDA 2") was synthesized using 3,9-dichloroperylene or 3,9-bis(p-chlorothiophenyl)perylene, respectively.

From the above four diamine derivatives and PMDA, polyamic acids were prepared, coated on a glass substrate and imidized.

Figure 18:
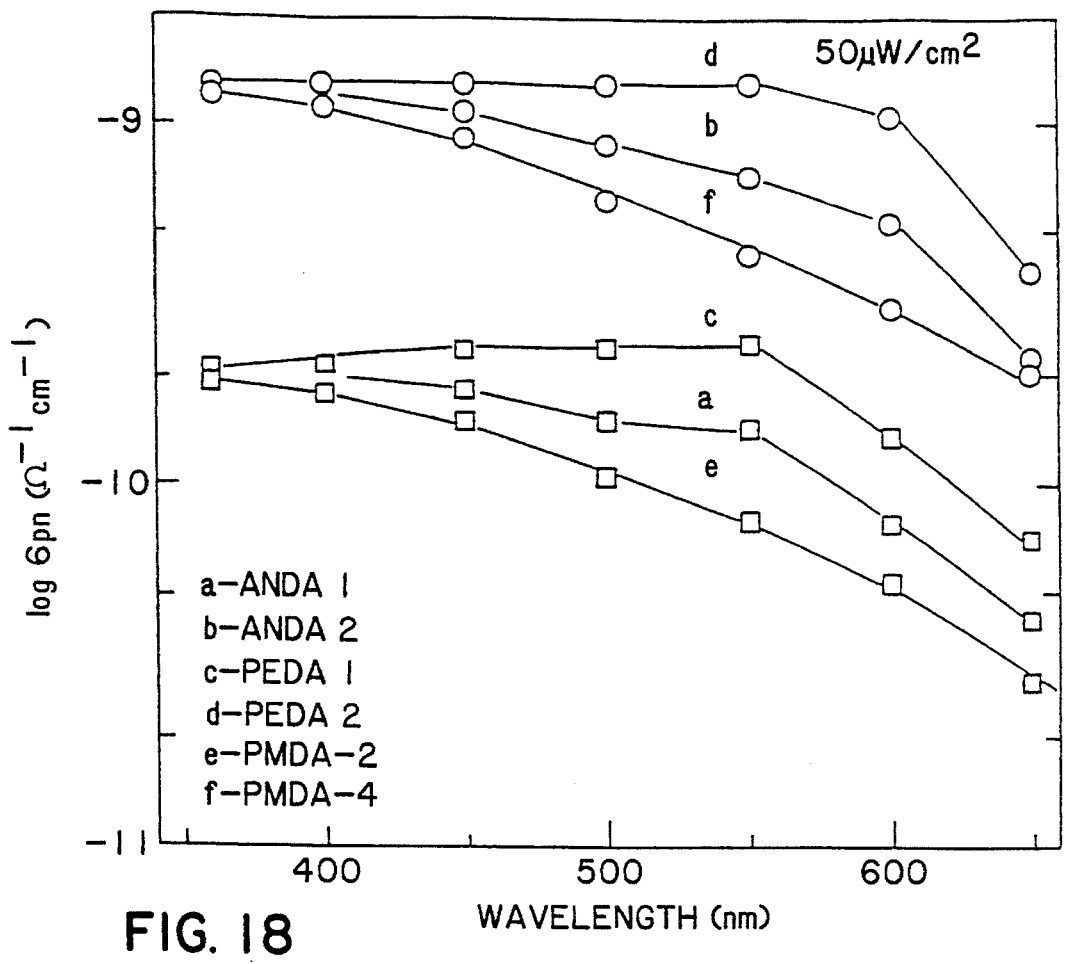

As in Example 1, melting points and photoconductivity of the polyimides were evaluated. The melting points are shown in Table 9, and the spectral sensitivity curves are shown in FIG. 18.

The spectral sensitivity is a photoconductivity measured by forming comb-like gold electrodes on a surface of a sample and irradiating monochromatic light at a constant luminous energy of 50 μW/$cm^2$. For comparison, the results for PMDA-2 and 4 are also shown.

TABLE 9

| Derivative | Melting point (°C.) |
| --- | --- |
| ANDA 1 | 330 |
| ANDA 2 | 280 |
| PEDA 1 | 350 |
| PEDA 2 | 420 |

EXAMPLE 5

A polyimide film was produced by using a watersoluble compound having a phthalocyanine backbone as a carboxylic anhydride component.

A phthalocyanine carboxylic anhydride derivative was synthesized by a method of Shirai et al, Macromol. Chem., 178, 1889 (1977) and 180, 2073 (1979). As a metal phthalocyanine, a copper phthalocyanine derivative was used, and as diamines, those having the polymerization degree of 3 to 7 were used. A polyimide film was prepared according to Shirai et al., ibid.

Optimum treating temperatures for imidization and crystallization were determined by measuring the melting points of the polyimide films as in above Examples. The most sensitive combination was the polymerization degree of 5. As the results of measurement of the spectral sensitivity at a film thickness of 15 μm by the electrophotographic characteristics, the obtained polyimides had high sensitivity of 0.5 μJ/cm$^2$ in a wide wavelength range of from 400 to 900 nm.

EXAMPLE 6

A photoconductor having a two layer structure was prepared from a combination of crystalline polymer BPDA-2 used in Example 1 and other material.

In the same manner as in Example 1, on a substrate surface, a film of BPDA-2 having a thickness of 15 μm was coated and then crystallized. On this film, a layer of one material selected from the group consisting of metal-free phthalocyanine, copper phthalocyanine, SeTe and As$_2$Se$_3$ was formed by vapor deposition to a thickness of 0.1 to 2.0 μm. As the results of the measurement of electrophotographic characteristics, each half-value exposure was 3.5, 2.4, 3.7 and 1.8 lux.sec.

EXAMPLE 7

In this Example, the organic polymer of the present invention was dispersed in other organic polymer. As the photoconductive polymers, PMDA-6 and BPDA-6 of Example 1 were used, since they had poor charge properties such that the dark electric conductivity of higher than 10$^{-9}$/ohm.cm., so that they were not suitable as photoconductors for electrophotography. Therefore, they were dispersed in a polyimide film which is a highly resistant film.

In the same manner as in Example 1, the above polymeric amidic acid was prepared and poured in ethanol to obtain a precipitate, which was thermally polycondensated to obtain polyimide. Then, the polymer was finely ground and mixed with the polyamic acid which is a precursor of PMDA-1 at a concentration of 50% by weight. Then, a solution was coated on a metal substrate and dried. Thereafter, PMDA-1 was imidized at a temperature around 200° C. which is the crystallization temperature of PMDA-6 and BPDA-6. At a film thickness of about 10 μm, the film had good charge property such as surface potential of about 700 V. The sensitivity $E_{1/2}$ against the white light was as good as about 41 lux.sec.

EXAMPLE 8

Addition of an electron acceptor was tried in this Example. As the electron acceptor, TCQN (7,7,8,8-tetracyanoquinodimethane) or Br$_2$ was used.

On a substrate surface, a film of BPDA-2 having a thickness of 15 μm was coated and crystallized in the same manner as in Example 1. Then, each electron acceptor was added to the film by a vapor phase doping in which the electron acceptor in gas state was applied to the film surface at a substrate temperature of 250° C. The electrographic sensitivity was 3.7 lux.sec. and 3.5 lux.sec.

EXAMPLE 9

Figure 19:
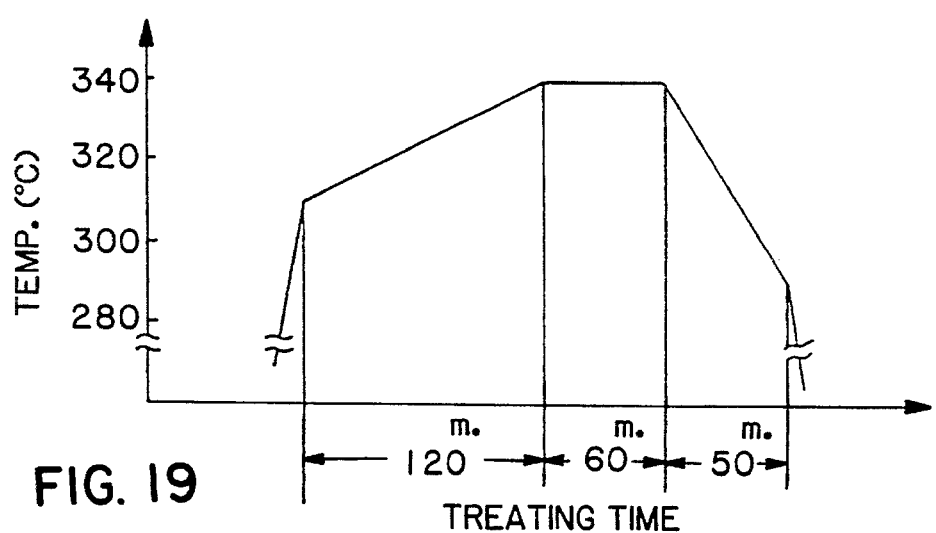
FIG. 19 shows the heating conditions for crystallizing the organic polymer in Example 9.

The organic polymer of the present invention was crystallized by the heating condition shown in FIG. 19.

That is, according to the optimum treating method of BPDA-2 prepared in Example 2, the polymer was heated from 310° C. to 340° C. at a heating rate of 0.25° C./min., kept at 340° C. for a certain time and cooled from 340° C. to 290° C. at a cooling rate of 1° C./min. In this example, a heating furnace having plural heating chambers having the temperature gradients shown in FIG. 19 was used and a cylindrical substrate coated with BPDA-2 was continuously treated. When the treated substrate was used in an electrographic copying machine, an image with good quality was obtained.

EXAMPLE 10

As a condensation type crystalline polymer, polyester was synthesized. As raw materials, a diol compound of oligomeric phenylene sulfide having an oligomerization degree of 2 and phthalic acid were used.

Fibers produced from the synthesized polyester had high crystallinity and toughness

EXAMPLE 11

The polyimide of the formula A7 was prepared.

In a solution of phenylenesulfide diamine SDA-2 in DMAc (3 cc), benzophenonetetracarboxylic dianhydride was added and dissolved while stirring the solution. After the addition of the dianhydride, the mixture was stirred for about 30 minutes, a highly viscous polyamic acid was obtained. Then, the polyamic acid solution was spin coated on a substrate such as a glass plate or an aluminum plate and predried on a hot plate at about 80° C. for about 30 minutes and then heated in a constant temperature furnace kept at about 300° C. for about 2 hours to obtain a polyimide.

From the chemical formulas of phenylenesulfide diamine SDA-2 and benzophenonetetracarboxylic dianhydride, their molecular weight are calculated to be 324 and 322. If SDA-2 and benzophenonetetracarboxylic dianhydride are copolymerized in a molar ratio of 1:1, a weight ratio is 1:0.99 from their molecular weights. Then, it is possible to calculate the molar ratio of the diamine compound to the tetracarboxylic acid from their weight ratio. Accordingly, the crystallinity and photosensitivity of polyimide films having various weight ratios were evaluated.

A polyamic acid was prepared from a total weight of BPDA and SDA-2 of 0.9 g in a different weight ratio, and a solution of the polyamic acid was coated on the substrate and heated at 300° C. to form a polyimide film.

Figure 20:
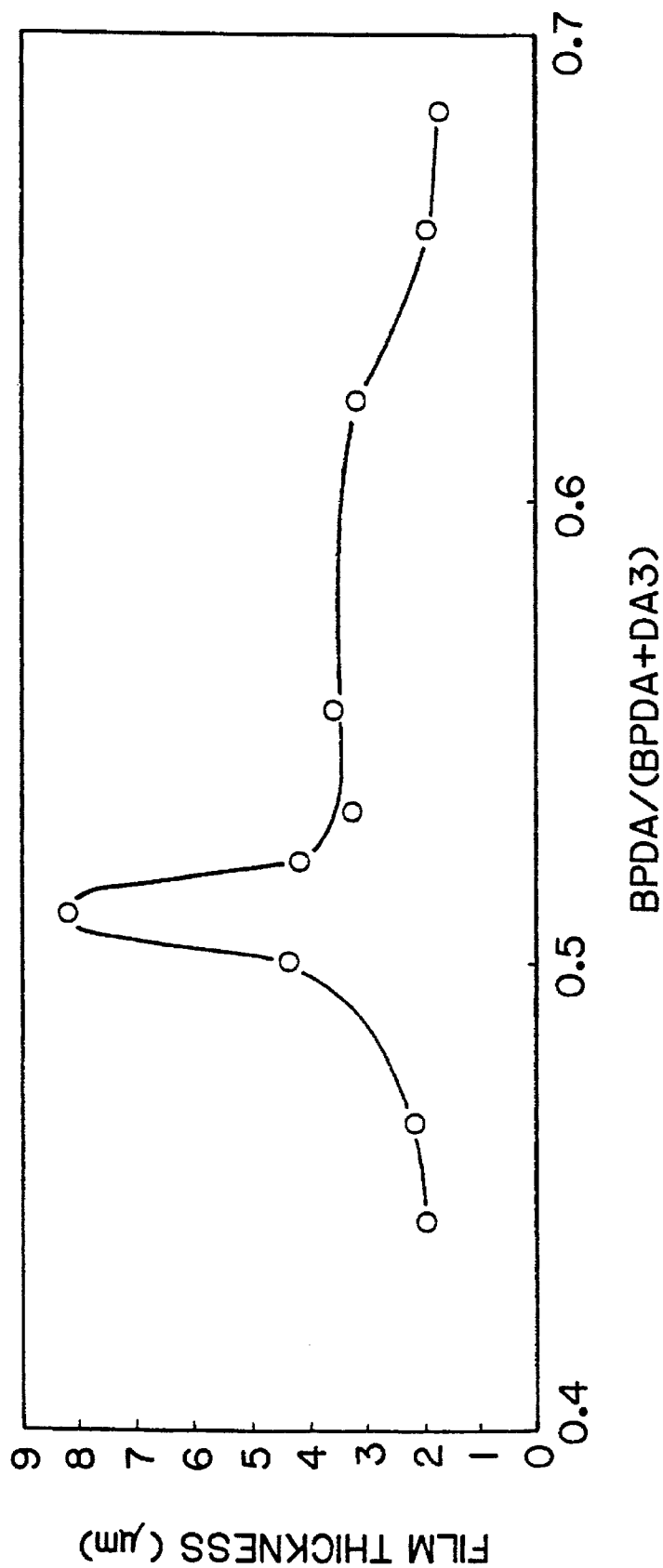
FIG. 20 shows the relationship between the film thickness and the BPDA/(BPDA+DA-3) ratio in Example 11.
Figure 22:
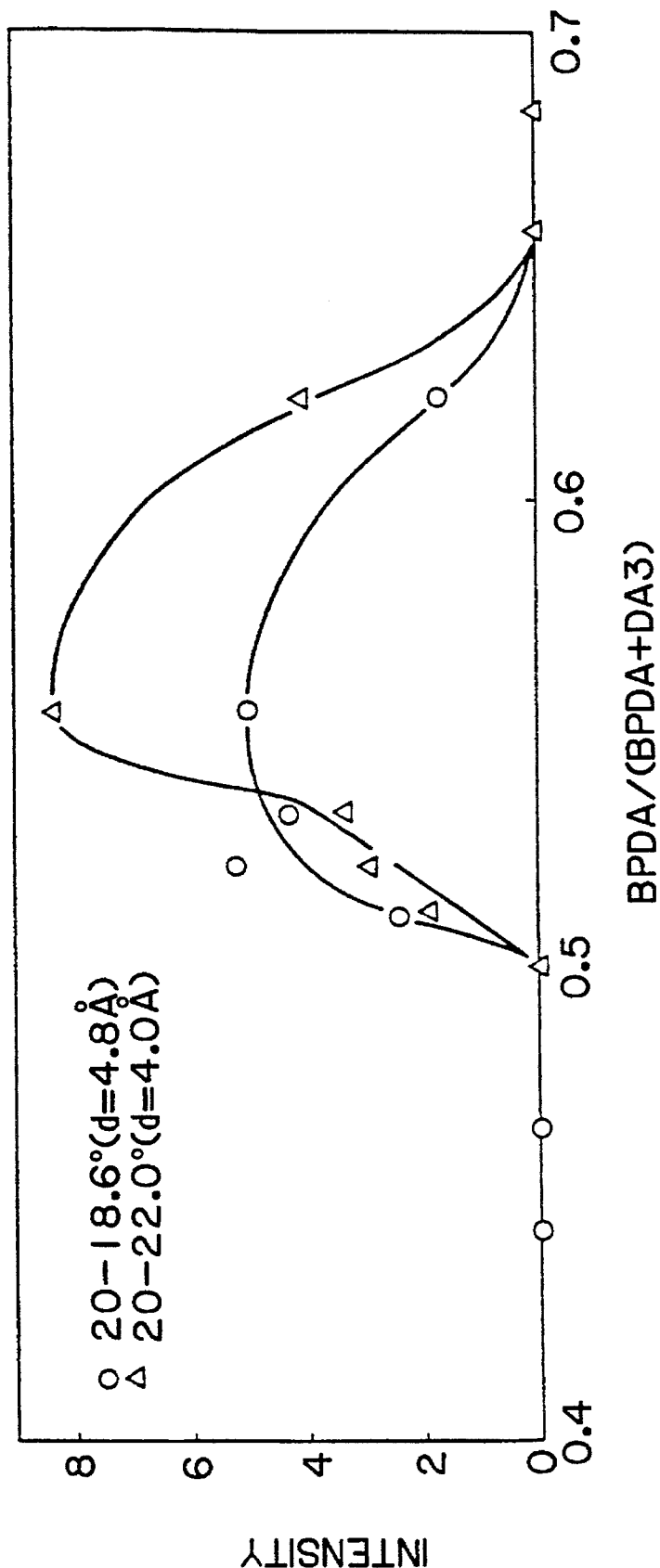
FIG. 22 shows the scattering intensity as a function of the BPDA/(BPDA+DA-3) ratio in Example 11.
Figure 23:
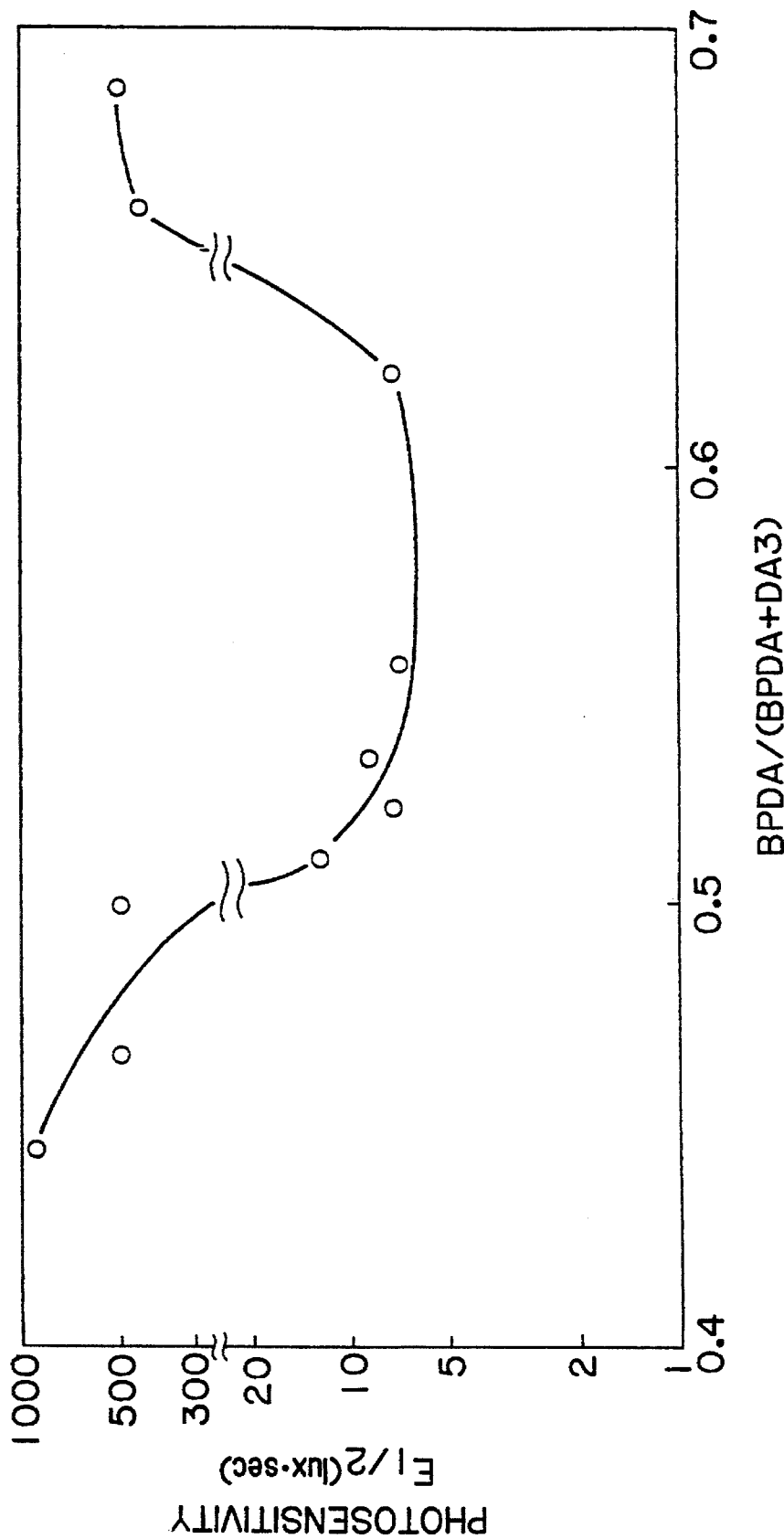
FIG. 23 shows a relationship between the photosensitivity and the BPDA/(BPDA+DA-3) ratio in Example 11.

The ratios BPDA/(BPDA+SDA-2) in FIGS. 20, 22 and 23 are weight ratios.

As seen from FIG. 20, the film suddenly became thick around the BPDA/(BPDA+DA-3) ratio of 0.5. This is because the molecular chain length of the polyimide is long. It is understood that, under the normal synthesis condition, namely at the weight ratio of 0.5, the polymerization proceeded most effectively.

Figure 21:
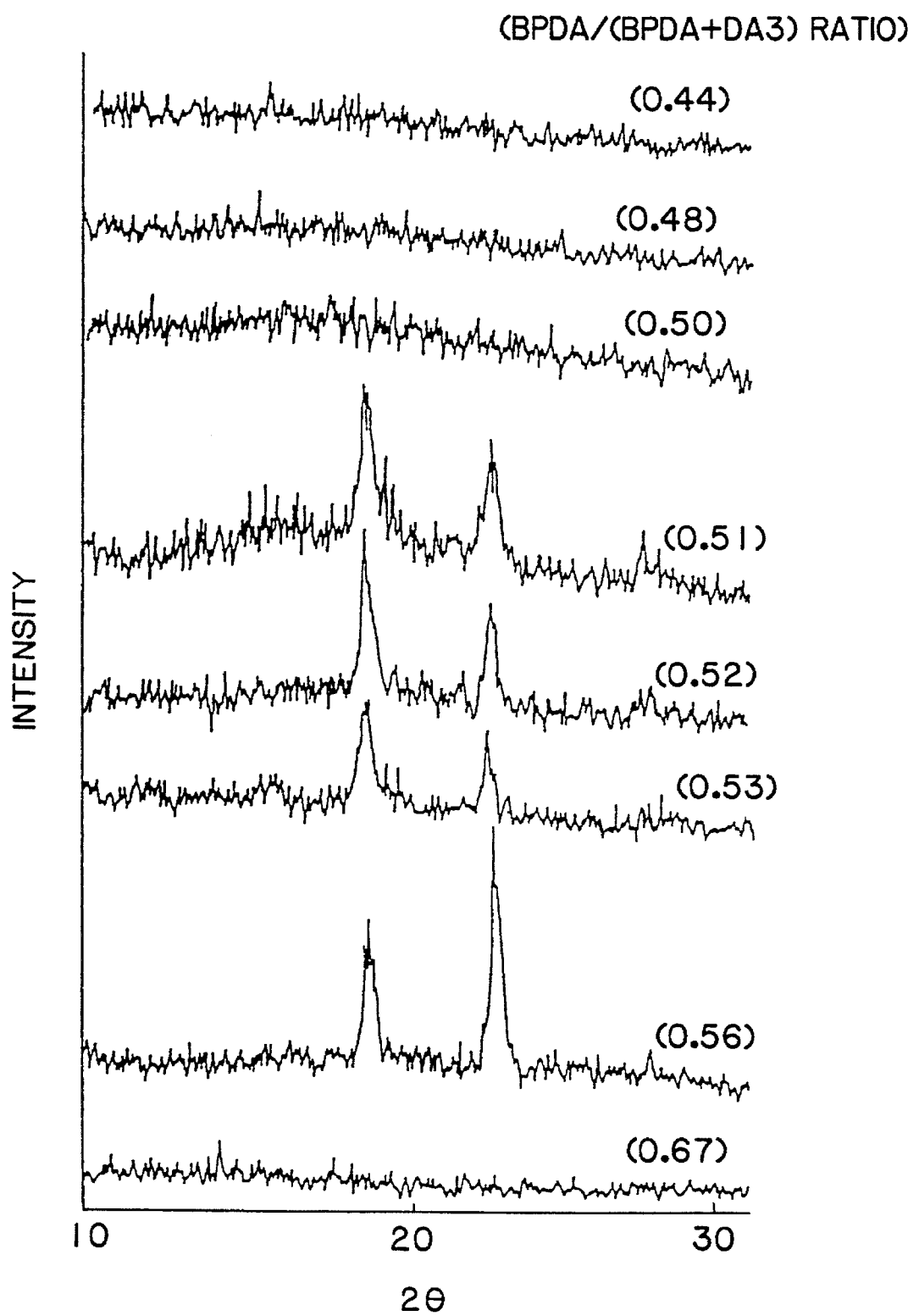
FIG. 21 shows the X-ray diffraction patterns of the polyimide in Example 11.

FIG. 21 shows the X-ray diffraction patterns of the polyimide. As seen from these patterns, with the samples having the BPDA/(BPDA+DA-3) ratios of 0.51 or larger, there were scattering peaks at 2θ of 18.6° and 22.4°, and the polyimide films were crystallized.

According to the Bragg equation:

$2d\sin\theta = n\lambda$ wherein λ is a wavelength (1.5418 Å), n is an order of reflection, d is a spacing, and e is an incident angle of X-ray, the spacings d corresponding to 2 θ of 18.6° and 22.4° are 4.8 and 4.0 Å, respectively. Since the samples having the BPDA/(BPDA+DA-3) ratios smaller than 0.5 had no scattering peak, they were amorphous.

FIG. 22 shows the scattering intensity as a function of the BPDA/(BPDA+DA-3) ratio. Circles and triangles represent the results for 2θ of 18.6° and 22.4°, respectively. As seen from FIG. 22, at the BPDA/(BPDA+DA-3) ratio of smaller than 0.5, the polyimide films were amorphous, while at the ratio larger than 0.5, the polyimide films were crystalline.

FIG. 23 shows a relationship between the photosensitivity ($E_{1/2}$ (lux.sec.)) in electrophotography and the BPDA/(BPDA+DA-3) ratio.

While the amorphous films having the BPDA/(BPDA+DA-3) ratio of smaller than 0.5 had low sensitivity of 300 lux.sec. or larger, the films having the BPDA/(BPDA+DA-3) ratio of larger than 0.5 had high sensitivity of 20 lux.sec or smaller.

From the above results, it is found that, when the diamine compound and the tetracarboxylic acid are copolymerized in a ratio of 1:(1+m) wherein m is a positive number, the polyimide film obtained by heating the polyamic acid has good crystallinity and high sensitivity.

In particular, when the BPDA/(BPDA+DA-3) ratio was 0,556, the highest sensitivity of 7 lux.sec. was achieved.

As seen from FIG. 20, when the BPDA/(BPDA+DA-3) ratio was larger than 0.66, the film thickness was 2 μm or less. This indicates that the polymer chain was short.

As seen from FIG. 22, when the BPDA/(BPDA+DA-3) ratio was larger than 0.66, no scattering peak appeared so that the film was amorphous.

As seen from FIG. 23, when the BPDA/(BPDA+DA-3) ratio was larger than 0.66, the film had very low sensitivity of several hundred lux.sec.

From these results, it is found that, when the BPDA/(BPDA+DA-3) ratio is smaller than 0.66, namely the ratio of the diamine compound to the tetracarboxylic acid is 1:(1+m) wherein m is a number larger than 0 and smaller than 1, the crystallized polyimide film having excellent sensitivity is produced.

EXAMPLE 12

Figure 24:
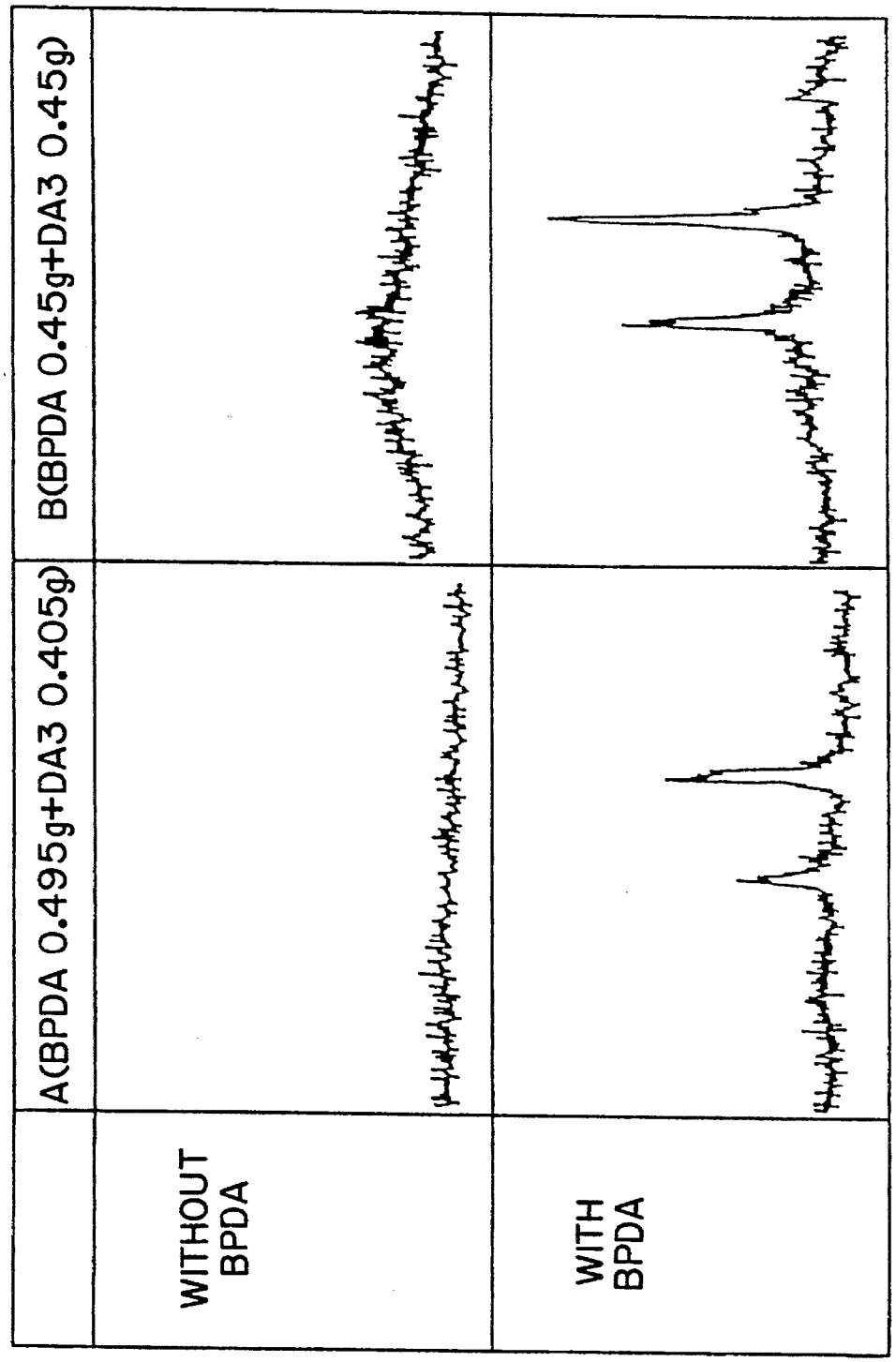
FIG. 24 shows the X-ray diffraction patterns of the polyimide films prepared in Example

FIG. 24 and Table 10 show the properties of the polyimide films prepared in this Example.

To find effects of the addition of a tetracarboxylic acid on the crystallinity and photosensitivity of a produced polyimide film, a polyamic acid was prepared and a polyimide film was produced as follows:

In the same manner as in Example 11, a polyamic acid of BPDA-Ph-3 was prepared except that the total weight of BPDA and DA-3 was 0.9 g and the ratio of BPDA/(BPDA+DA-3) was 0.55. The polyamic acid was coated on the aluminum substrate and heated at 300° C.

FIG. 24 shows the X-ray diffraction pasterns of the produced polyimides film with or without BPDA. As seen from FIG. 24, when BPDA was not added, both the polyimides of A and B were amorphous, while when BPDA was added, both had the scattering peaks in the X-ray diffraction patterns and were crystalline.

Table 10 shows the thickness of the polyimide film, the scattering intensity per unit film thickness and the photoconductivity ($E_{1/2}$).

TABLE 10

| Sample No. | BPDA (g) | DA-3 (g) | Addition of BPDA (g) | Film thickness (μm) |
|---|---|---|---|---|
| A | 0.495 | 0.405 | No | 1.7 |
|   |       |       | 0.1 | 5.2 |
| B | 0.45  | 0.45  | No | 6.6 |
|   |       |       | 0.2 | 8.2 |

| | Scattering intensity | | Photosensitivity |
|---|---|---|---|
| | 2θ = 18.6° | 2θ = 22.4° | (lux · sec.) |
| A | 0.0 | 0.0 | 450 |
|   | 3.0 | 5.54 | 2.9 |
| B | 0.0 | 0.0 | 216 |
|   | 3.45 | 5.06 | 2.9 |

As seen from Table 10, the polyamic acid solution A or B alone gave an amorphous film after dehydration reaction, which had low sensitivity of several lux.sec. On the contrary, the polyamic acid A or B containing additional BPDA gave a highly crystalline polyimide film having the scattering intensity of about 3.0 to 3.45 and high photosensitivity of 2.9 lux.sec.

The increase of the thickness after the addition of BPDA indicates that the additional BPDA was condensation polymerized with the terminal diamine through dehydration so that the chain length of the polymer was extended. From the formation of the crystallized polyimide film, it may be assumed that excessive BPDA would be present at the chain ends to form seed crystals.

When an additional amount of the tetracarboxylic acid is added to the solution of the polyamic acid which will produce the amorphous film after dehydration, the solution produces a crystalline polyimide film.

When the ratio of the diamine compound to the tetracarboxylic acid is 1:(1+m) wherein m is a number larger than 0 and smaller than 1, the crystalline polyimide has high sensitivity.

EXAMPLE 13

Figure 25:
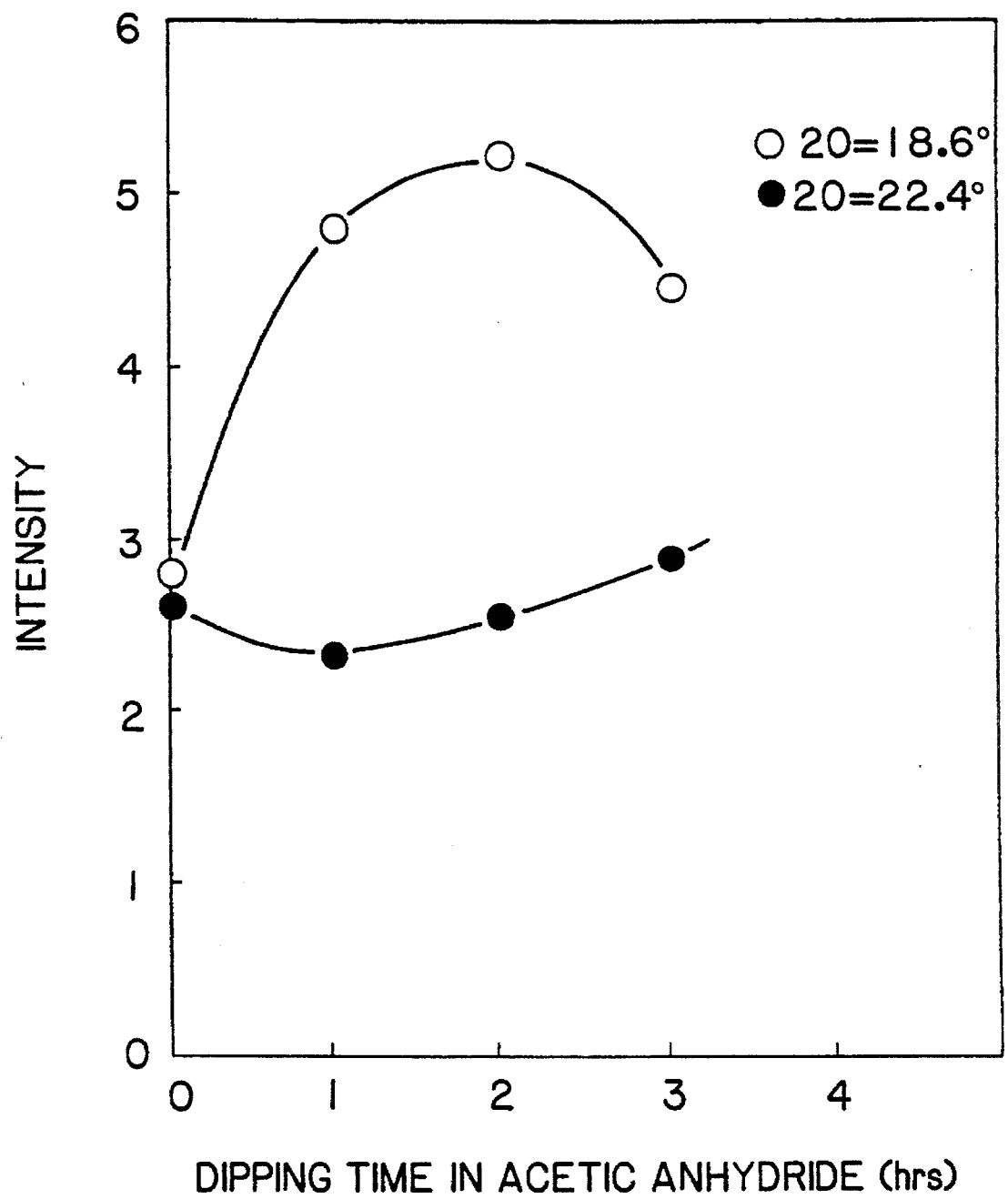
FIGS. 25, 26 and 27 show the effects of treatment of the polyimide film with acetic anhydride on the dehydration reaction in Example 13.
Figure 26:
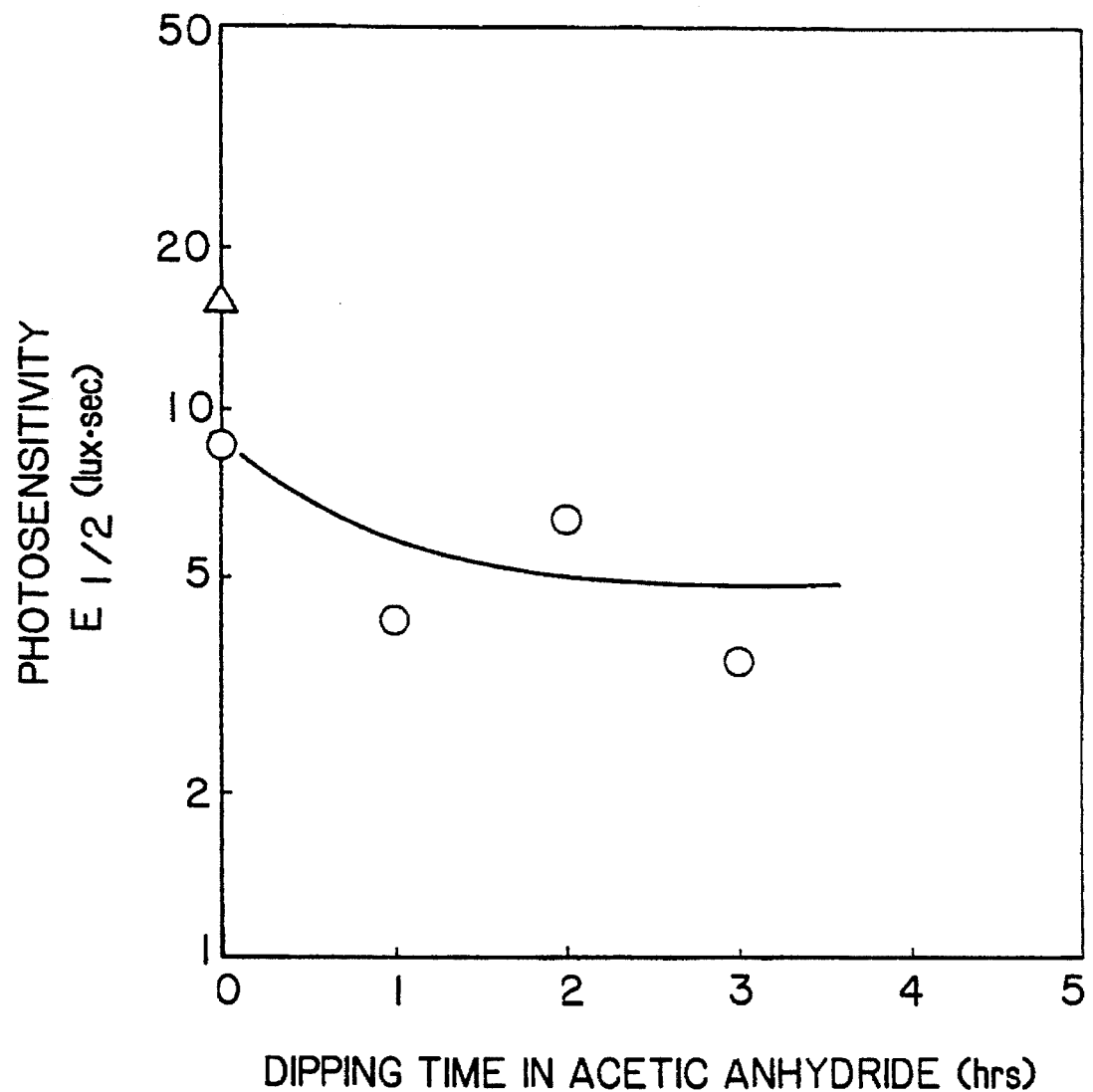
Figure 27:
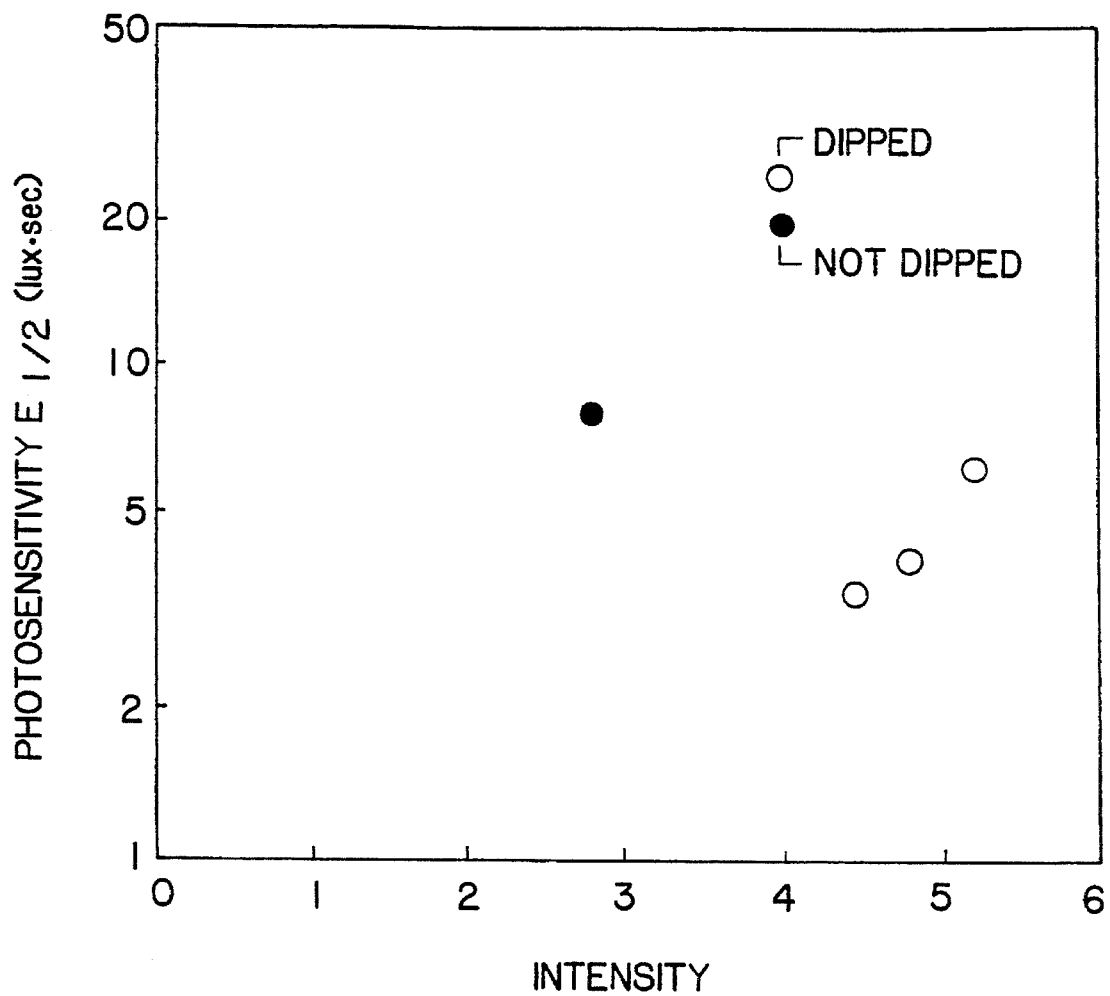

FIGS. 25, 26 and 27 show the effects of treatment of the polyimide film with acetic anhydride on the dehydration reaction.

To show the dehydration effect by dipping in acetic anhydride, crystallinity and photosensitivity of the polyimide film were measured.

In N,N-dimethylacetamide as a solvent, BPDA (0.42 g) and DA-3 (0.38 g) were reacted to obtain a polyamic acid. Then, the polyamic acid solution was coated on an aluminum substrate and dipped in acetic anhydride for a predetermined time, followed by heating at 300° C.

FIG. 25 shows a relationship between the scattering intensity and the dipping time in acetic anhydride. As understood from this graph, the scattering intensity of the polyimide film dipped in acetic anhydride was stronger than that of the non-dipped polyimide film. In particular, at the dipping time of 2 hours, the polyimide film was highly crystalline having the intensity of 5.2.

FIG. 26 shows a relationship between the photosensitivity ($E_{1/2}$) and the dipping time in acetic anhydride. The polyimide film which was dipped in acetic anhydride had higher sensitivity than the polyimide film which was only thermally treated. In particular, at the dipping time of 3 hours, the polyimide film had $E_{1/2}$ of 3.5 lux.sec. and very high sensitivity.

FIG. 27 shows a relationship between the photosensitivity and the scattering intensity. White circles indicate the results of the polyimide films which were dipped in acetic anhydride, and a black circle indicates the result of the polyimide film which was not dipped in acetic anhydride.

Without dipping in acetic anhydride, the polyimide film had low crystallinity and low sensitivity, while with dipping in acetic anhydride, the polyimide films was highly crystalline and had high sensitivity.

When the dehydration reaction with acetic anhydride and the crystallizing treatment are separately carried out, the highly crystalline polyimide film can be obtained.

In addition, when pyridine was added to a solution of acetic anhydride in an amount of 50% by weight or less based on the weight of acetic anhydride, the crystallinity of the polyimide film is further improved.

Figure 28:
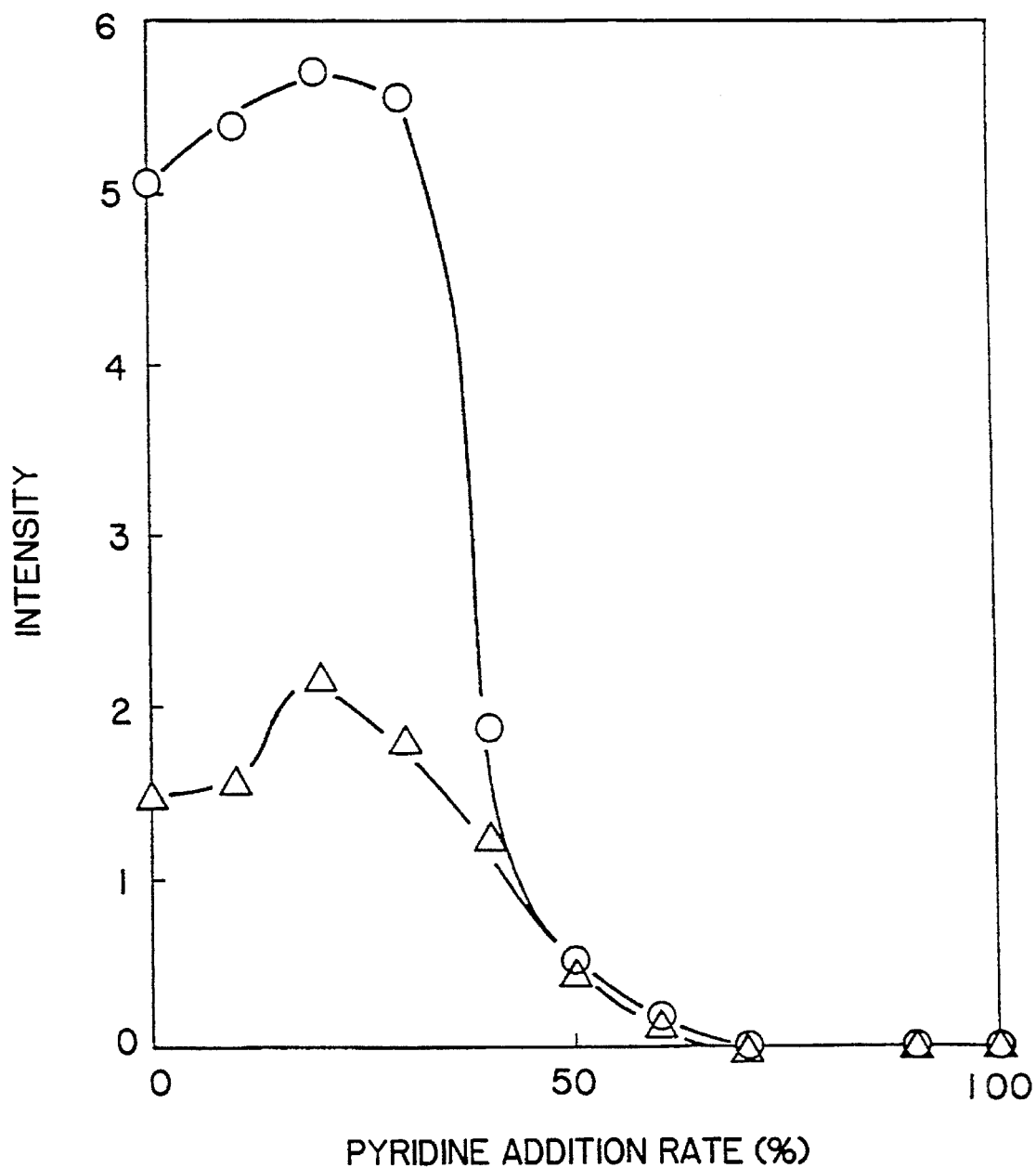
FIGS. 28 and 29 show relationships between the scattering intensity and an amount of added pyridine and between the photosensitivity ($E_{1/2}$) and the amount of added pyridine, respectively in Example 13.
Figure 29:
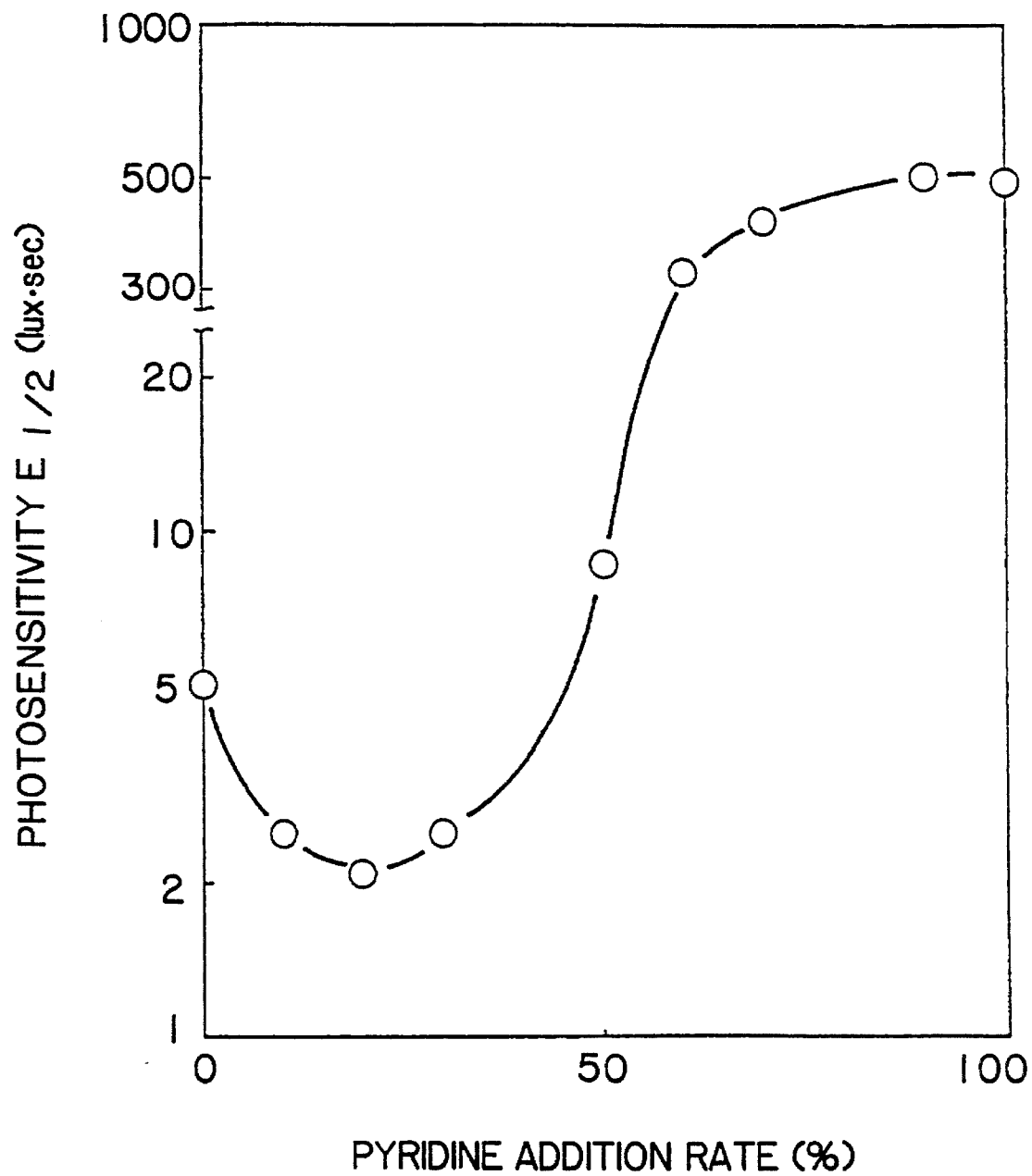

FIGS. 28 and 29 show relationships between the scattering intensity and an amount of added pyridine and between the photosensitivity (E½) and the amount of added pyridine, respectively.

A polyamic acid which had been prepared by reacting BPDA (0.42 g) and DA-3 (0.38 g) in DMAc (3 ml) was dipped in acetic anhydride containing a varying amount of pyridine and heated at 300° C.

As seen from FIG. 28, when the pyridine amount was larger than 50% by weight, the polyimide film was amorphous, while when the pyridine amount was smaller than 50% by weight, the film was crystalline.

As seen from FIG. 29, when the pyridine amount was larger than 50% by weight, $E_{1/2}$ was several hundred lux.sec. and the sensitivity was very low, while when the pyridine amount was smaller than 50% by weight, $E_{1/2}$ was 5 lux.sec. or less and the film had high sensitivity.

EXAMPLE 14

Production of an electrophotographic sensitizer

On a peripheral surface of a cylindrical substrate, the polyamic acid prepared in Example 11 from BPDA-Ph3 was coated to a thickness of 15 μm. The molar ratio was 0.52. After drying, the coated film was heated at 300° C. for 2 hours.

Then, the produced sensitizer was set up in a copying machine and its sensitivity and imaging characteristics were evaluated.

An initial surface potential was 700 V, a halfvalue exposure was 3.0 lux.sec., and a residual potential was 50 V, all of which were satisfactory. After continuous copying of 10,000 sheets, the sensitivity and the image were stable.

EXAMPLE 15

Production of a spatial light modulator (FIG. 4)

On a glass substrate 401 having a transparent ITO electrode 402, a photoconductive orientation film 403 having a thickness of 5 μm was formed from photoconductive polyimide BPDA-Ph-3 according to Example 13. On the other glass substrate 407, a transparent electrode 406 and an orientation film 405 made of the polyimide BPDA-Ph-3 and having a thickness of 1000 Å were formed. Further, the spatial light modulator 410 contained a liquid crystal layer 404.

Figure 30:
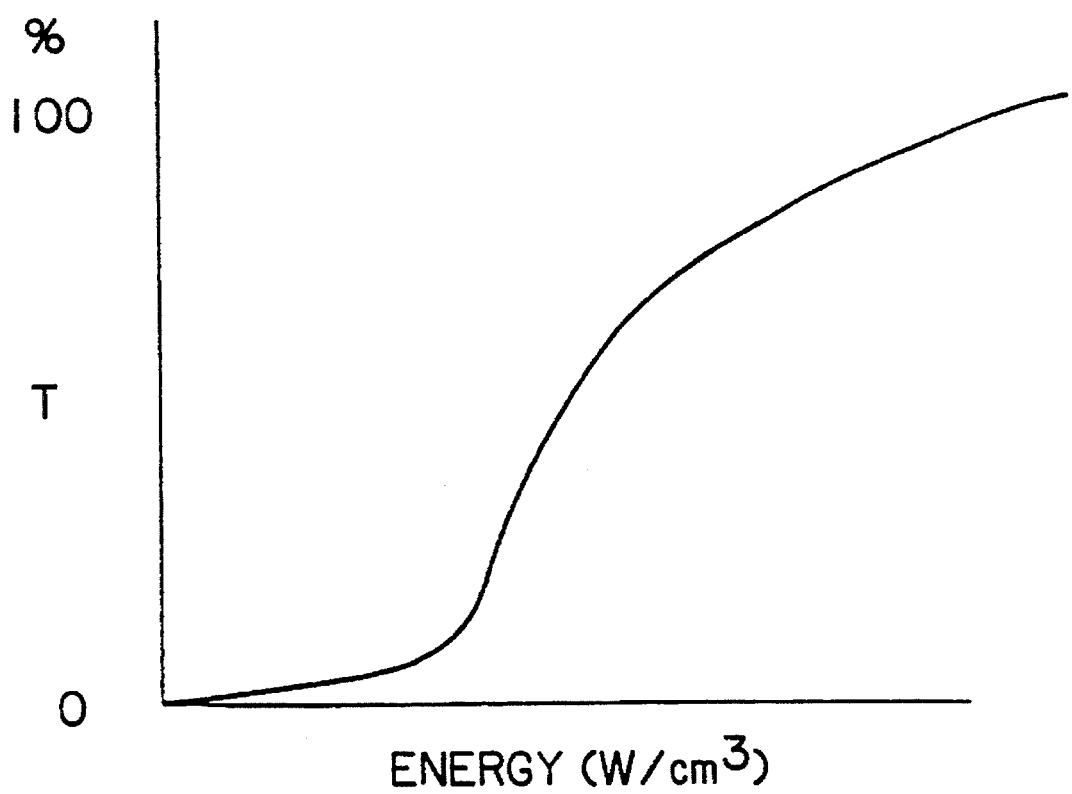
FIG. 30 shows change of a light energy of an outgoing light in Example 15, FIG. 31 schematically illustrates an apparatus used for carrying out the resistant heating method in Example 16.

In this spatial light modulator, an orientation state of the liquid crystal 405 changed when an incident light 411 having an energy larger than a certain threshold value was irradiated. Then, a light energy of an outgoing light 412 changed as shown in FIG. 30.

Accordingly, the spatial light modulator of the present invention functions as an optical threshold element which can be used in an optical computing system such as an optical neural network and the like.

EXAMPLE 16

Figure 31:
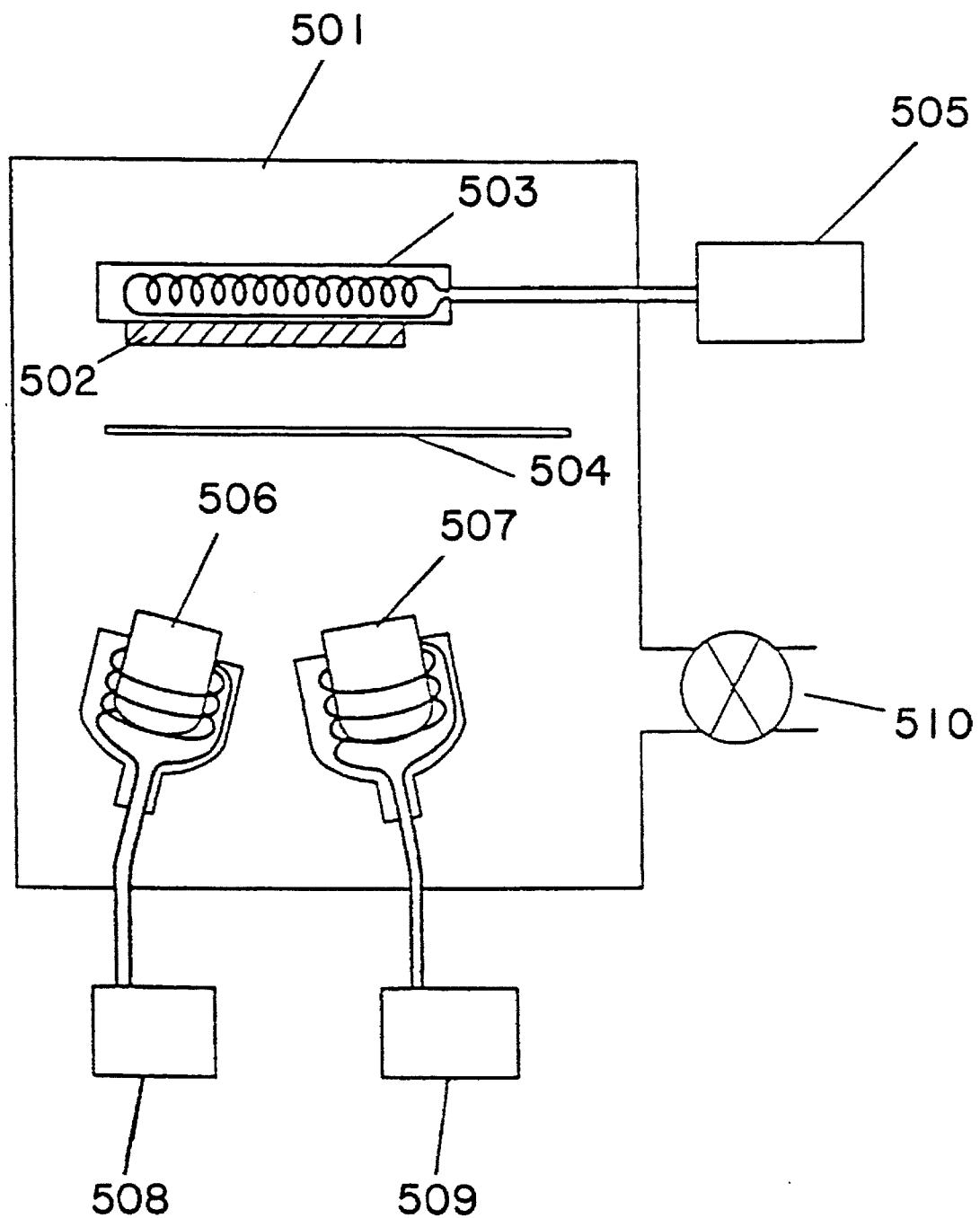

By using SDA-1, 2, 3 or 4 as a diamine and BPDA as a carboxylic anhydride, a deposition film was formed with an apparatus of FIG. 31 by the resistant heating method.

A monomer powder was charged in a separate quartz crucible 506 or 507 and an evaporation rate of the monomer was adjusted by the heating temperature. The diamine and She carboxylic acid were vaporized at the same evaporation rate, and a film growth rate was adjusted at a constant rate of 5 Å/sec. A temperature of a substrate 504 was kept at 50° C. The final film thickness was 3 μm. An IR spectrum of the film confirmed that the film was made of a polyamic acid just after the deposition. Then, the film was heated to proceed imidization with varying the heating temperature.

The film property was evaluated by the crystallinity calculated from the X-ray diffraction pattern as explained above.

The photoconductivity ($E_{1/2}$ (lux.sec.)) was also evaluated as above.

Figure 32:
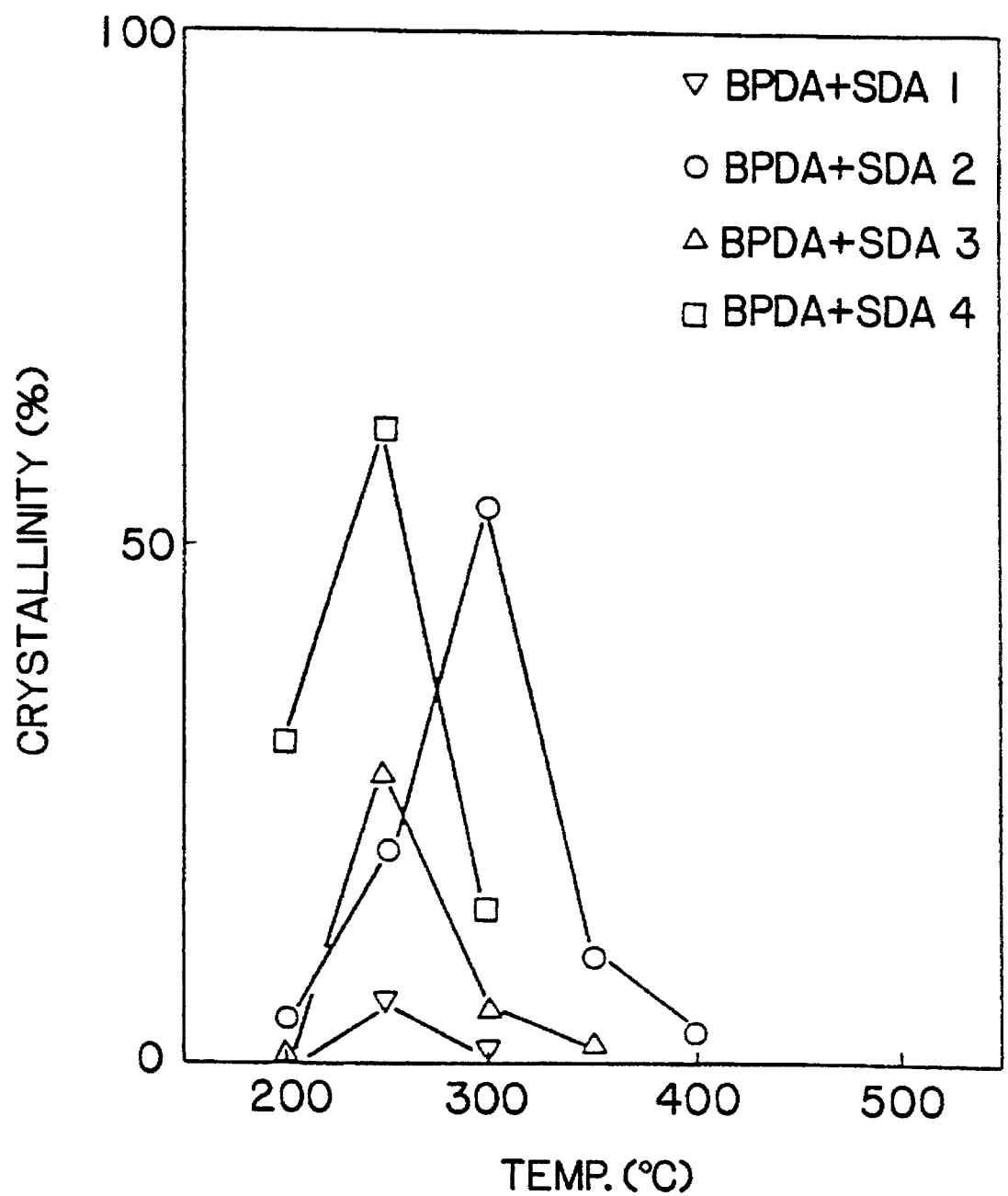
FIGS. 32 and 33 show the crystallinities and the photoconductivities of the four polyimides, respectively prepared in Example 16.
Figure 33:
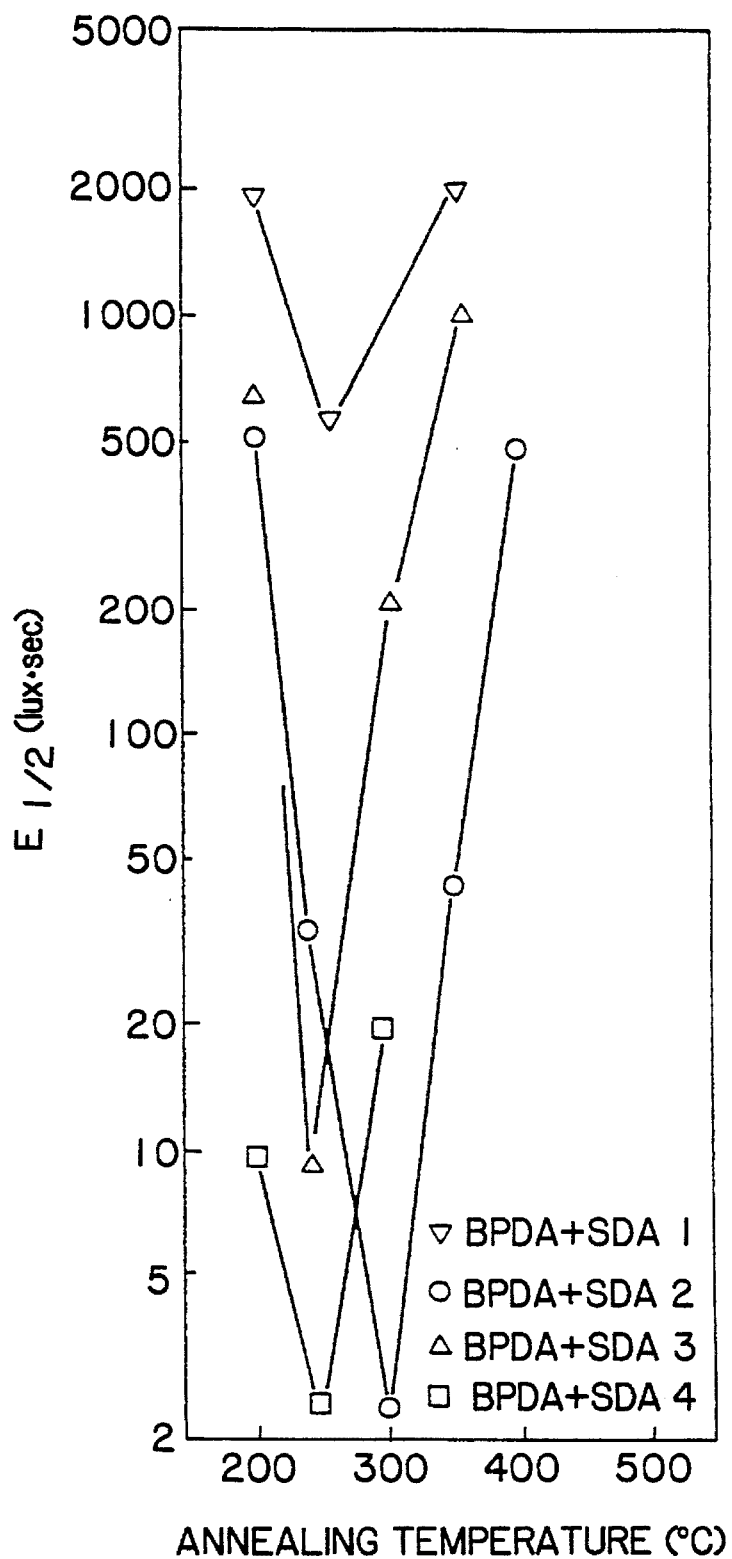

FIGS. 32 and 33 show the crystallinities and the photoconductivities of the four polyimides, respectively.

In case of SDA-2 or 4, the crystallinity of the polyimide exceeded 50%, and the photoconductivity was 2.5 lux.sec.

EXAMPLE 17

Dependency of the film properties on the substrate temperature was studied.

The substrate temperature was changed from 50 to 200° C. For film growth, SDA-2 and PMDA were used.

Figure 34:
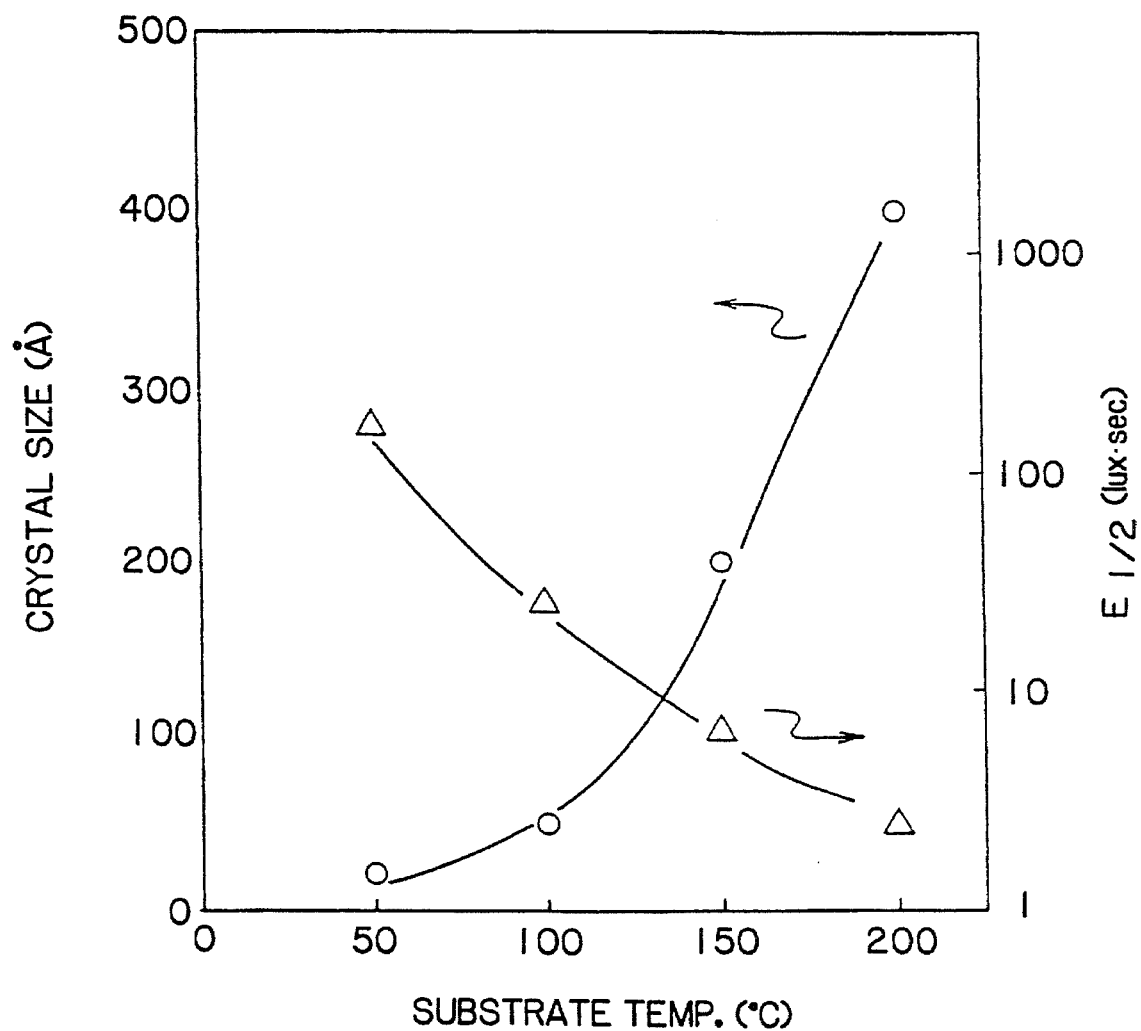
FIG. 34 shows a relationship between a crystal size and the photosensitivity in Example 17.

FIG. 34 shows a crystal size and the photosensitivity. The crystal size was calculated from the half-value width of the scattering peak at 2θ of about 18.6° (corresponding to the spacing of 4.8 Å) according to the Scherrer's equation.

By the increase of the substrate temperature, the crystal size and the photoconductivity were increased.

As the substrate temperature was raised, reevaporation of the monomers from the substrate increased so that the film growth rate decreased.

Figure 35:
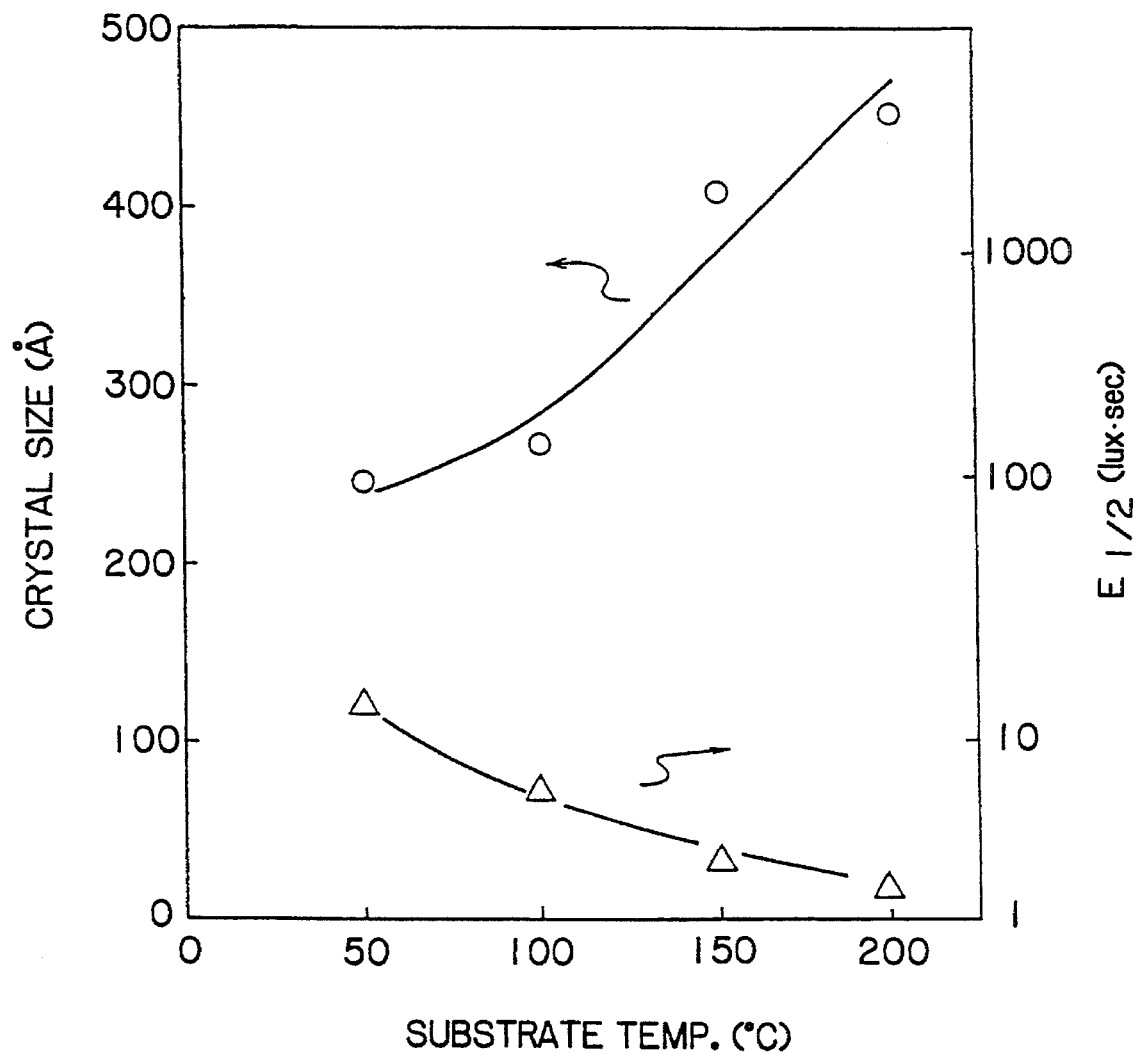
FIG. 35 shows the effects of annealing on the crystal size and $E_{1/2}$ in Example 17.

The polyimide film grown at each substrate temperature was annealed at 400° C. to increase the crystallinity. The results are shown in FIG. 35. The annealing effects were achieved and both the crystallinity and the photosensitivity were improved.

EXAMPLE 18

In the vacuum evaporation apparatus, a cylindrical aluminum substrate was set, and BPDA and SDA-2 were deposited on the substrate at the substrate temperature of 100° C. while rotating the substrate to form a film having a thickness of 15 μm. Then, the formed film was annealed at 300° C. in the apparatus.

The cylindrical substrate carrying the polyimide film was set in a copying machine and its photoconductivity was evaluated. The substrate was used as a positive charge sensitizer. At the surface potential of 800 V, the half-value exposure $E_{1/2}$ was as good as 2 lux.sec. Repeating characteristic was evaluated. After 10,000 sheet copying, the surface potential, the sensitivity and the image quality were all good.

EXAMPLE 19

With varying the evaporation rates of the diamine and the carboxylic anhydride during the film growth from PMDA and SDA-2, film quality was evaluated. The evaporation rate of the carboxylic acid was changed against the evaporation rate of the diamine by changing a temperature of the crucible containing the carboxylic acid.

A ratio of the evaporation rate of the carboxylic acid ($F_{cr}$ molecules/cm$^2$.sec.) to that of the diamine ($F_{da}$ molecules/cm$^2$.sec.) was expressed as 1+m. After synthesizing the polyamic acid by varying "m" it was heated and crystallized to produce a polyimide, and the crystallinity and the photoconductivity of the polyimide were evaluated. The substrate temperature was 200° C. and the annealing temperature was 400° C.

Figure 36:
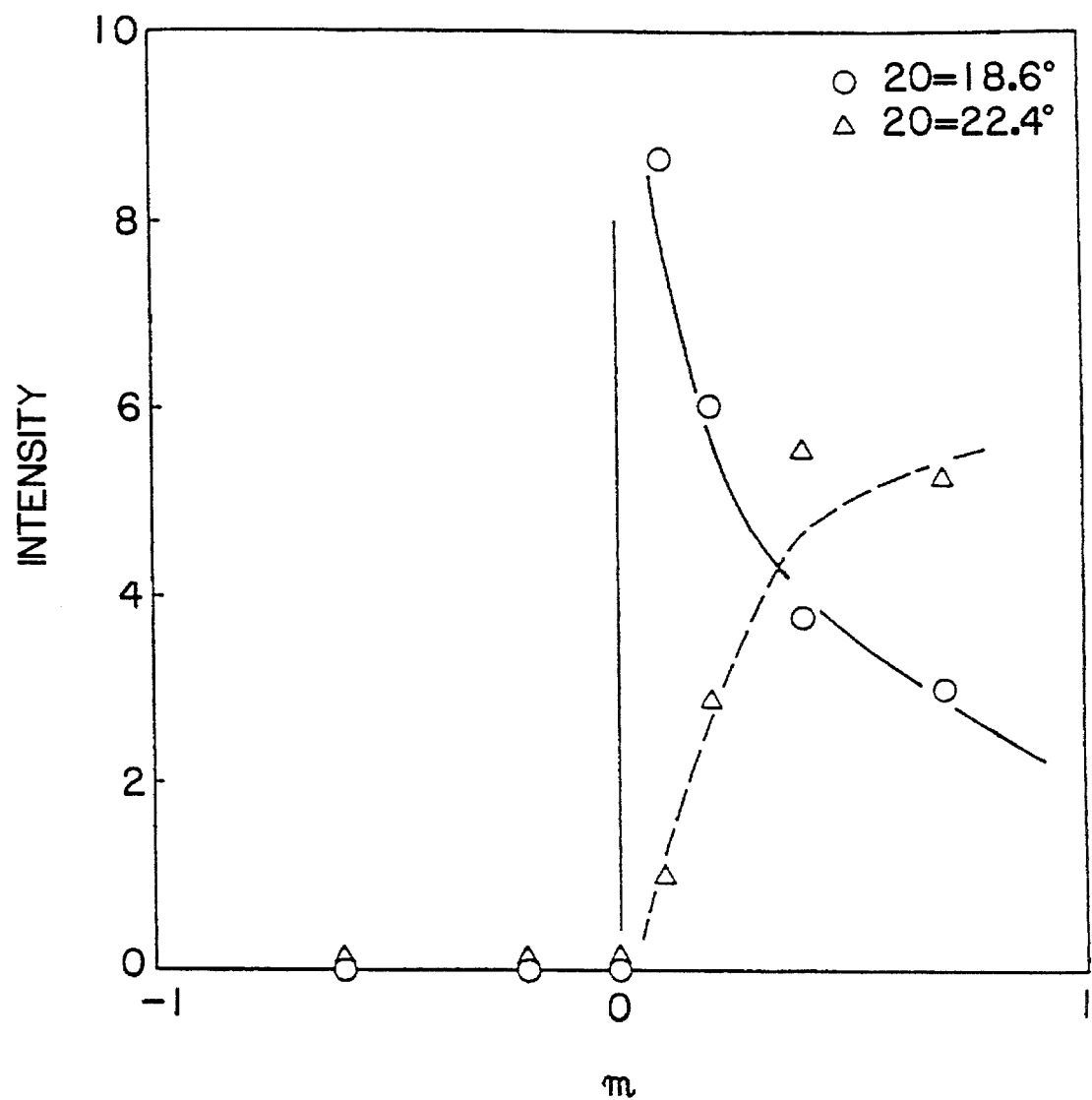
FIGS. 36 and 37 show change of the peak scattering intensity measured from the X-ray diffraction pattern, and change of the photosensitivity ($E_{1/2}$), respectively in Example 19.
Figure 37:
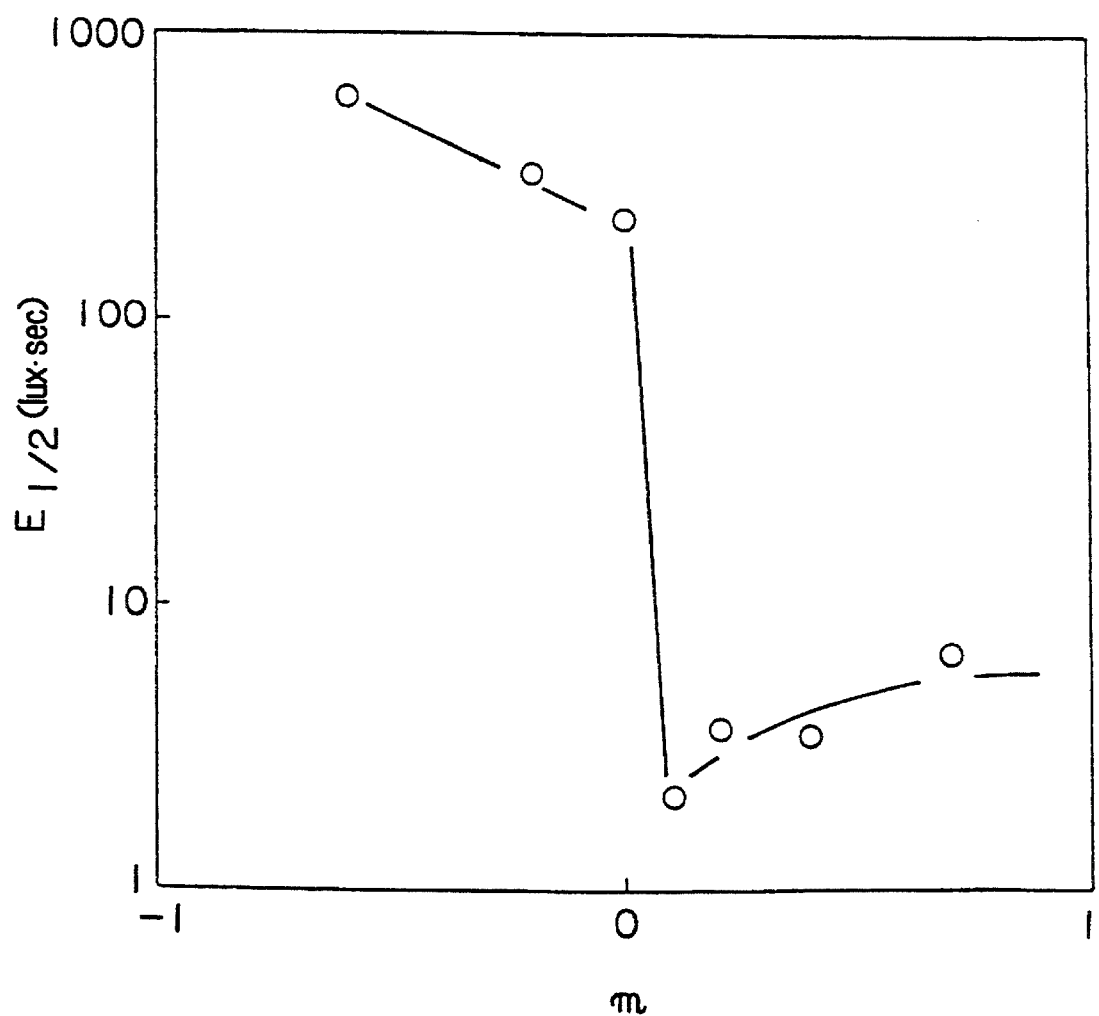

FIG. 36 shows change of the peak scattering intensity measured from the X-ray diffraction pattern, and FIG. 37 shows change of the photosensitivity ($E_{1/2}$).

From FIGS. 36 and 37, the polyimide film was crystalline when "m" was larger than 0 (zero).

When "m" was 0 or smaller, the polyimide film was amorphous irrespective of the heating temperature. Since the sensitivity and the crystallinity have a certain correlation, both increased as "m" increased. Since the chain length of the polyimide decreases as "m" increases, the polymerization conditions under which the polyimide becomes crystalline when m is about 0 produce the polyimide film having good heat stability and processability.

EXAMPLE 20

The orientation of the deposited polyimide film was controlled by treating the substrate surface.

To orientate the polymer molecules in parallel with the substrate surface, a coating of a polyimide film or a polyimide film rubbed in one direction was provided. The used polyimide was CAPTON (trademark of DuPont) and the film thickness was 1000 Å. The rubbing direction was the same as that of the liquid crystal orientation layer.

To orientate the polymer molecules in perpendicular to the substrate surface, an aminosilane type coupling agent, namely γ-aminopropyltriethoxysilane was coated on the substrate surface by applying a solution of the aminosilane coupling agent and drying it. The coating layer of the aminosilane coupling agent was deemed to be a monomolecular layer.

A copolymer of BPDA and SDA-2 was grown on the coated surface of the substrate at a substrate temperature of 100° C., followed by annealing at 300° C.

The orientation of the polyimide film was evaluated by X-ray diffraction. The polyimide film orientated in the parallel direction had the strong diffraction peak at 2θ of 18.6° (hereinafter referred to as "$I_{18.6}$"), and the polyimide film orientated in the perpendicular direction had the strong diffraction peak at 2θ of 22.4° (hereinafter referred to as "$I_{22.4}$"). Then, the orientation degree (OR) is expressed by the ratio of $I_{18.6}/I_{22.4}$.

The orientation degrees and the photoconductivities of the polyimide deposition films are shown in Table 11.

TABLE 11

| Film No. | A | B | C |
|---|---|---|---|
| OR | 2.3 | 7.0 | 0.23 |
| $E_{1/2}$ | 3.5 | 1.7 | 2.2 |

Note: A: Polyimide coating.
B: Rubbed polyimide coating.
C: Aminosilane coupling agent.

Among them, the sample B had the maximum sensitivity, since carriers are transferred in the direction perpendicular to the polymer chains.

EXAMPLE 21

A polyimide film having good crystallinity was produced by the MBE (molecular beam epitaxy) method.

The substrate surface was coated with γ-aminopropyltriethoxysilane as used in Example 20 and its temperature was kept at 250° C. Then, the carboxylic acid (BPDA) alone was evaporated. At this substrate temperature, BPDA reacted with the silane coupling agent to form imide rings and adhered to the substrate. Unreacted carboxylic acid was reevaporated.

Thereafter, the diamine (SDA-3) was evaporated at the same substrate temperature and reacted with BPDA which covered the substrate surface. Only the reacted SDA-3 molecules were adhered to the substrate.

By repeating the above two steps, the polyimide film which grew in the direction perpendicular to the substrate surface was produced.

From the X-ray diffraction pattern, the grown film had only the peak at 2θ of 22.4° which indicated that the film was grown in the direction perpendicular to the substrate surface. From the half-value width of the peak, the crystal size was calculated to be about 1000 Å.

To evaluate the photoconductivity, comb-like electrodes were formed in the polyimide film. ημτ was about $10^{-7}$ cm$^2$/V, which is as good as an amorphous silicon film.

EXAMPLE 22

An orientation film to be used in the liquid crystal spatial light modulator of FIG. 4 was formed by the method of Example 20 or 21.

Figure 38:
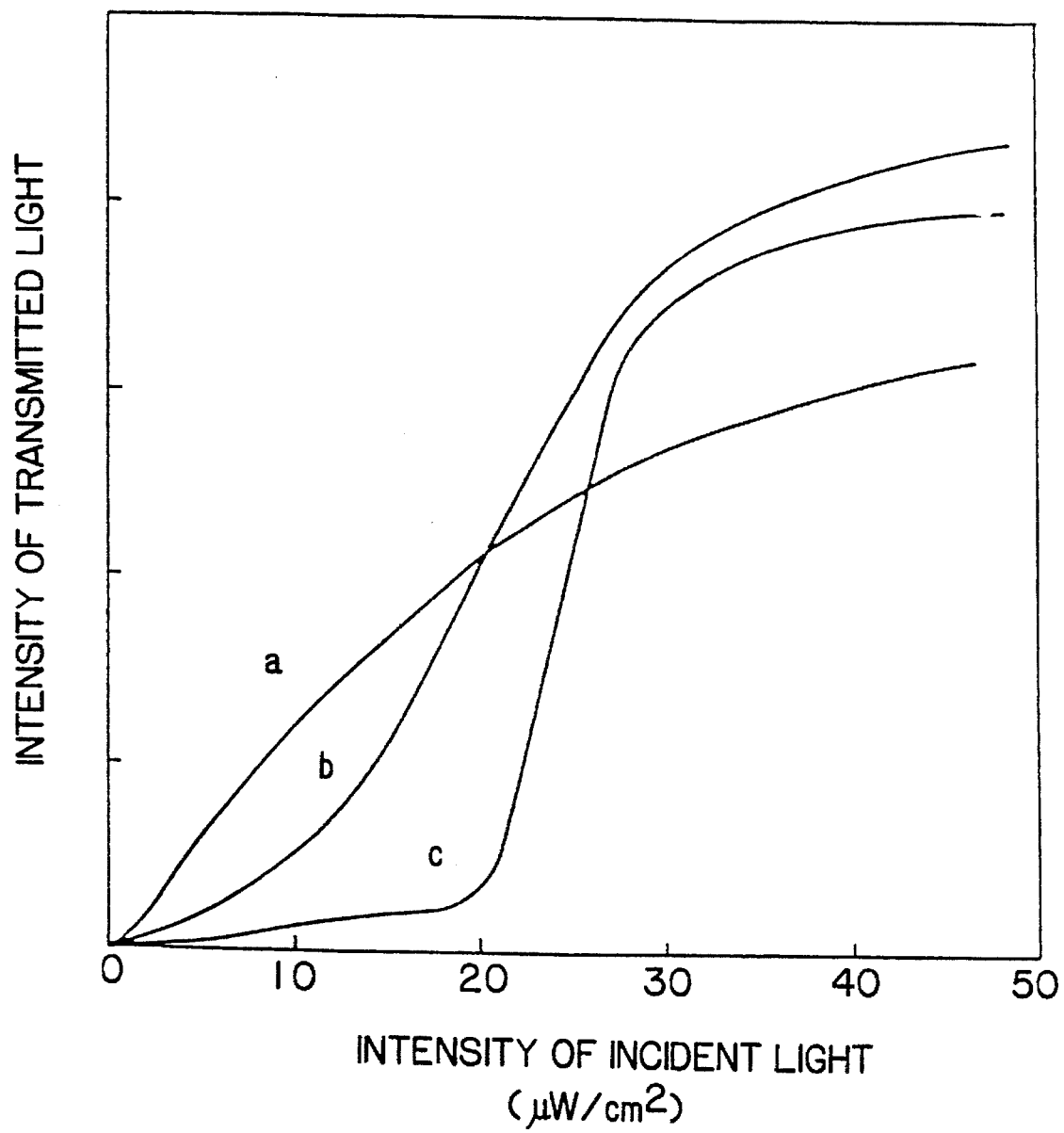
FIG. 38 shows the optical switching characteristic of each modulator in Example 22, FIG. 39 schematically illustrates an optical neural network.

The photoconductive orientation film was formed by one of the following three methods:

a: Rubbing polyimide film+deposition method b: Silane coupling film+deposition method c: Silane coupling film+MBE method The optical switching characteristic of each modulator is shown in FIG. 38. The intensity of transmitted light non-linearly responded to the intensity of the incident light.

Figure 39:
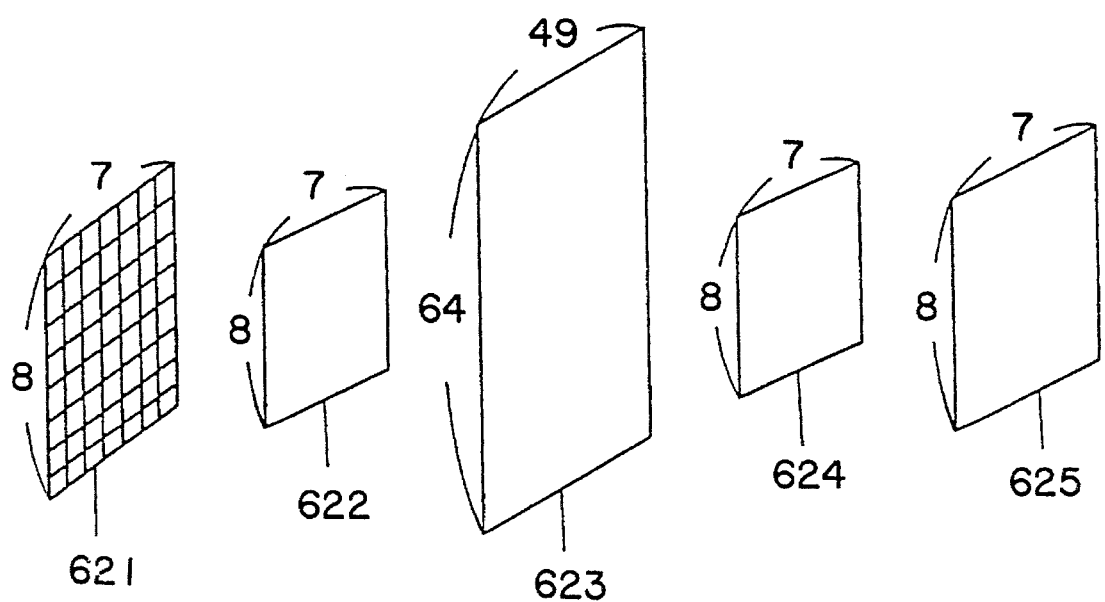

By using the spatial light modulator having such characteristic, an optical neural network system was assembled. FIG. 39 schematically shows the optical neural network system. This system utilizes the back propagation (BP) method and comprises a microlens array 622, 624, a learning mask pattern 623 and an optical threshold element 125 consisting of the spatial light modulator of this Example.

The learning mask pattern 623 comprises 49×64 matrixes, and expresses 8 gradation displays obtained by the BP method by the intensity of the transmitted light. The optical threshold element 625 comprises 7×8 matrixes, and on each pixel, the transmitted light from 7×8 mask patterns are condensed by the microlens array 624. According to the non-linear characteristics as shown in FIG. 38, a liquid crystal shutter functions. When, with this system, 26 alphabetical characters were imaged, the system responded at a recognition rate of 100%.

EXAMPLE 23

In the spatial light modulator of FIG. 4, as the transparent insulating substrate 401, a glass plate was used. On the glass substrate 401, an ITO film having a thickness of 0.1 to 0.5 μm was formed by sputtering as the transparent conductive electrode 402, and then the photoconductive layer 403 was formed as follows:

As the photoconductive material of the layer 403, a photoconductive polyimide (BPDA-Ph-n) synthesized from benzophenonetetracarboxylic dianhydride (BPDA) and oligomeric p-phenylene sulfide diamine (SDA-n) was used.

A polyamic acid which is a precursor of the polyimide was prepared by reacting BPDA and SDA-n in DMAc. Then, the precursor polyamic acid was spin coated on the substrate to a thickness of 1 to 10 μm. After coating, the substrate was heated at 300° C. for 2 hours, during which the polyamic acid was imidized and crystallized.

On the other substrate 407, polyvinyl alcohol was coated and dried to from a film having a thickness of about 1000 Å. Both the coated substrates were subjected to the rubbing treatment.

The substrates were laminated with a gap of 5 to 7 μm, and in the gap, a liquid crystal LIOXN 9150 (manufactured by Tisso Petrochemical) was encapsulated.

To the liquid crystal panel, white light was irradiated and the switching characteristic was evaluated.

Between the ITO electrodes, an alternating current and/or a direct current were applied as an applied voltage.

Figure 40:
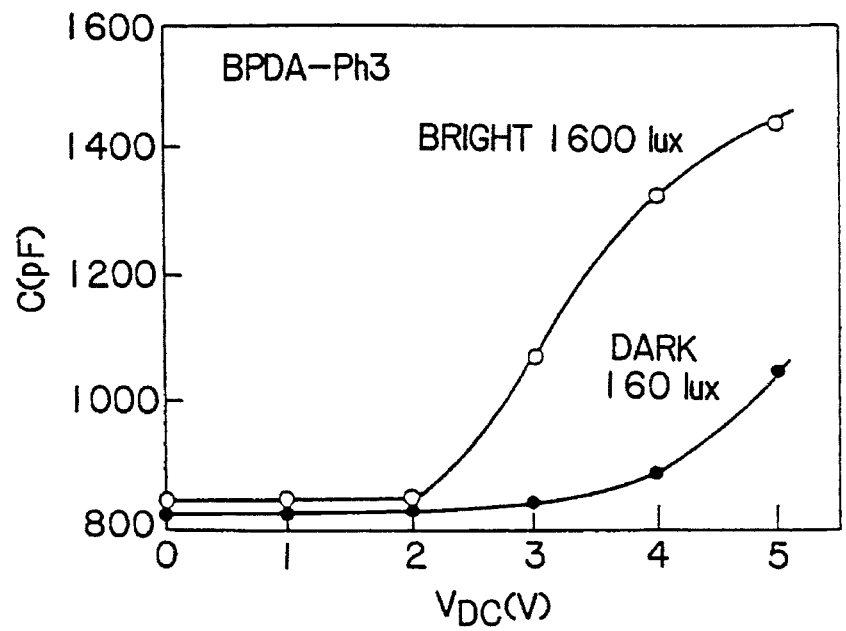
FIG. 40 shows an orientation state of the liquid crystal in terms of capacitance C in Example 23.

FIG. 40 shows an orientation state Of the liquid crystal in terms of capacitance C when the direct current component $V_{DC}$ only was applied as the applied voltage, and the amount of irradiated light was changed from 160 lux at a dark time to 1600 lux (ten times) at a bright time. When the light was irradiated, the electric resistance of the sensitive layer 403 deceased and the electric field applied to the liquid crystal 404 was increased. Therefore, the liquid crystal molecules were orientated in the direction perpendicular to the substrate. This change of the molecule orientation induced the increase of the capacitance. At $V_{DC}$ of 4 V, the maximum contrast was obtained.

Figure 41:
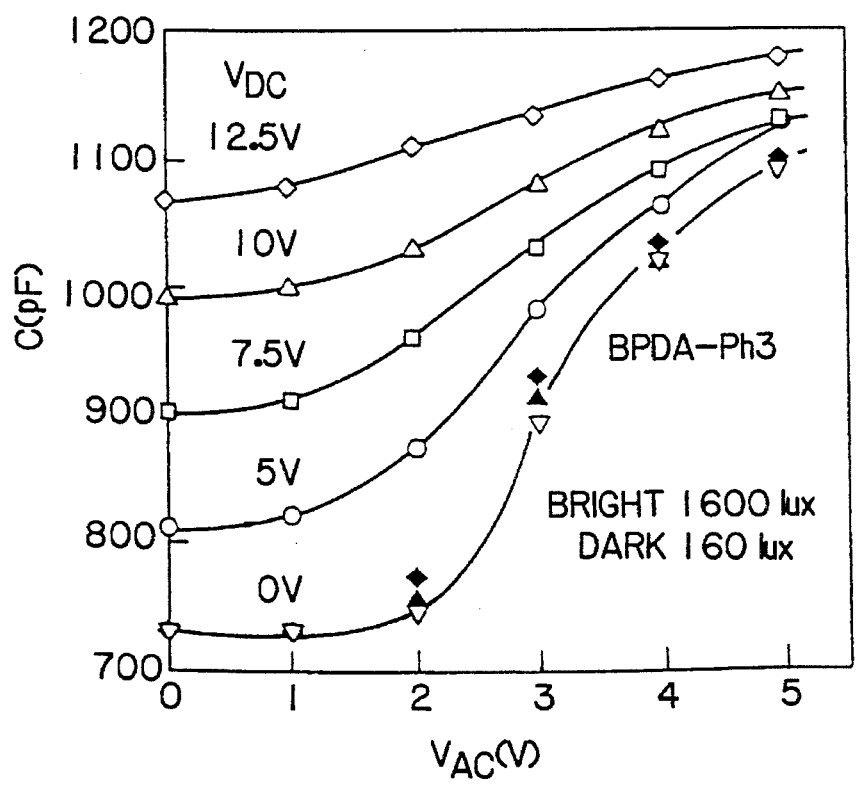
FIG. 41 shows the results when the alternating current $V_{AC}$ was further applied in Example 23.

FIG. 41 shows the results when the alternating current $V_{AC}$ was further applied.

Figure 42:
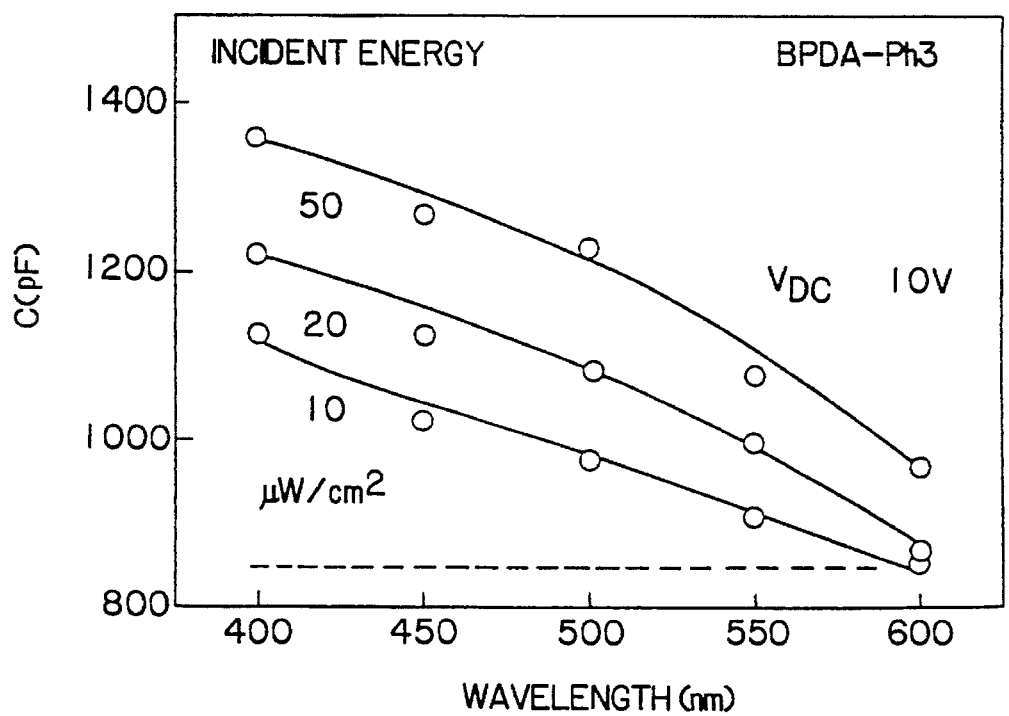
FIG. 42 shows spectral sensitivity when the monochromic light was irradiated in Example 23.

FIG. 42 shows spectral sensitivity when the monochromic light was irradiated. The photoconductive material BPDA-Ph-3 had the photoelectric current characteristics corresponding to the light absorption characteristics. In the visible wavelength range, the sensitive region expanded up to about 600 nm.

Figure 43:
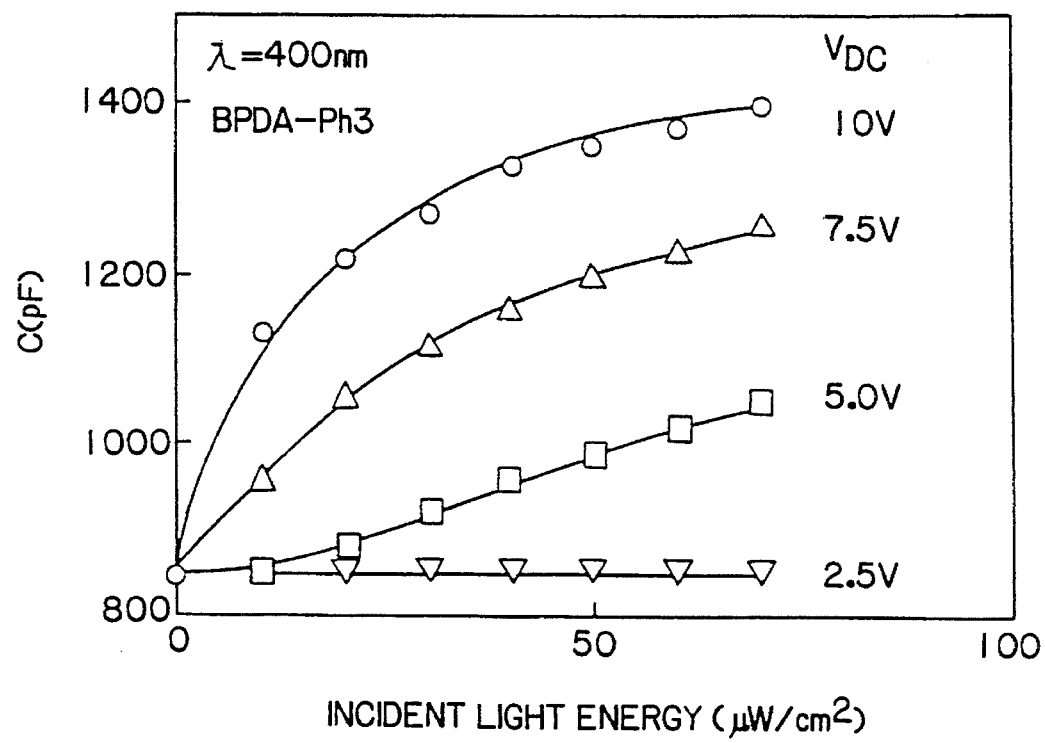
FIG. 43 shows dependency of the capacitance on the incident light energy of a light having a wavelength of 400 nm in Example 23.

FIG. 43 shows dependency of the capacitance on the incident light energy of a light having a wavelength of 400 nm. At the constant applied voltage, the orientation state non-linearly responded to the increase of incident light energy.

EXAMPLE 24

As in Example 23, a spatial light modulator was produced by using BPDA-Ph-3 as the photoconductive polyimide film. The structure was the same as in FIG. 4 except that an additional orientation film was laminated on the photoconductive layer 403 (two layer structure).

The polyamic acid was spin coated on the ITO film 402, dried and then heated in air at 300° C. for 4 hours during which the polyimide was crystallized. On this layer, the same polyamic acid was coated to a thickness of 1000 Å, dried and heated at 200° C. for one hour to form an additional polyimide film. On the other substrate, the same polyimide film as the latter one of the above was directly formed on the ITO electrode 406. Both coated substrates were rubbed and the liquid crystal was encapsulated between the substrates.

Figure 44:
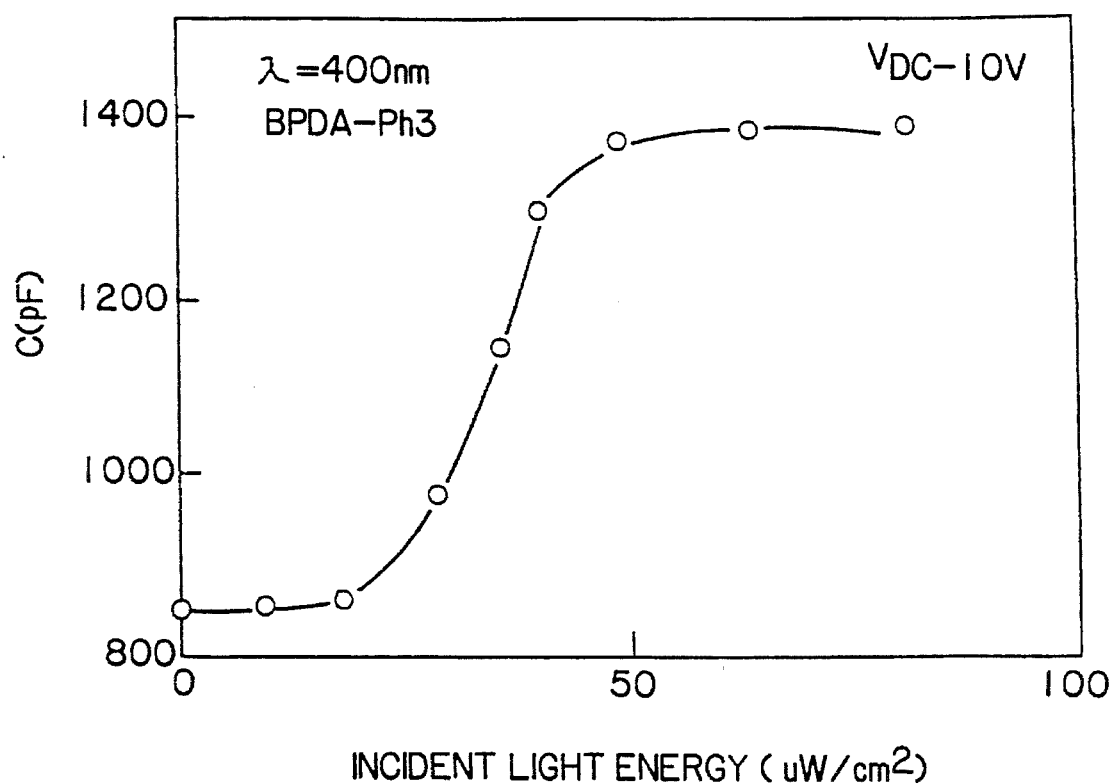
FIG. 44 shows the relationship between the capacitance and the incident light energy in Example 24.

The light response characteristics of the spatial light modulator was evaluated in the same manner as in Example 23. The results are shown in FIG. 44.

EXAMPLE 25

The photoconductivity and the liquid crystal orientation are greatly influenced by the crystallinity and orientation of the photoconductive polyimide film.

These film properties can be controlled by selecting the reaction conditions for the synthesis of the precursor polyamic acid, the imidization condition of the polyamic acid and/or the crystallization condition of the polyimide film.

In the synthesis of BPDA-Ph-3, a molar ratio of BPDA to SDA-3 was changed as one example of the reaction conditions, and the heating temperature was changed around 300° C. as one of the imidization and crystallization conditions.

Figure 45:
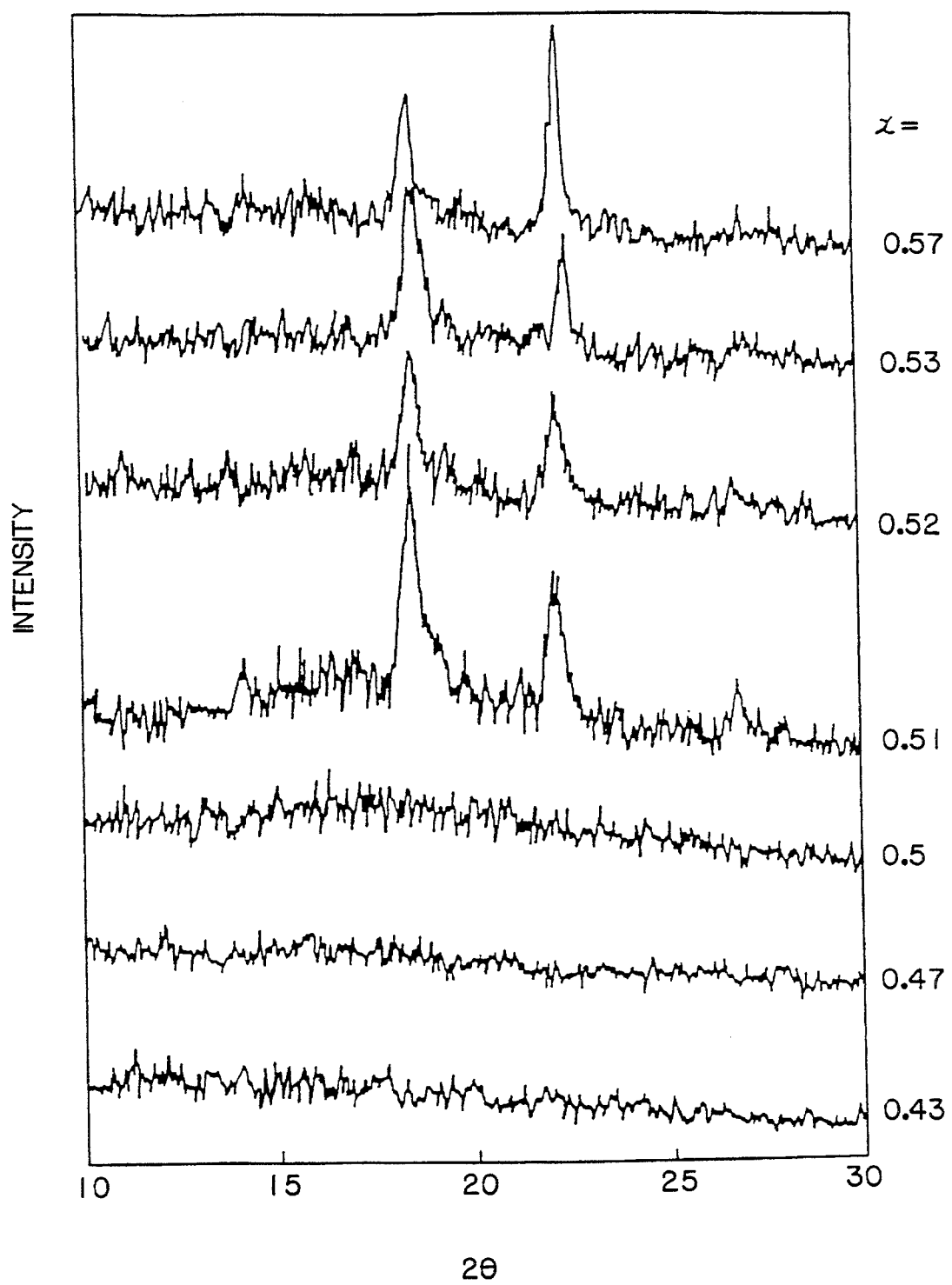
FIG. 45 shows change of the X-ray diffraction patterns of the polyimides after heating (300° C.×2 hours) when X was changed around 0.5, in Example 25.

In general, the molar ratio of BPDA to SDA-3 is 1:1. When a ratio X of BPDA/(BPDA+SDA-3) is larger than 0.5, the carboxylic acid is excessive for the polymer synthesis. When X is changed around 0.5, the X-ray diffraction patterns, namely crystallization states of the polyimides after heating (300° C.×2 hours) changed as shown in FIG. 45.

Figure 46:
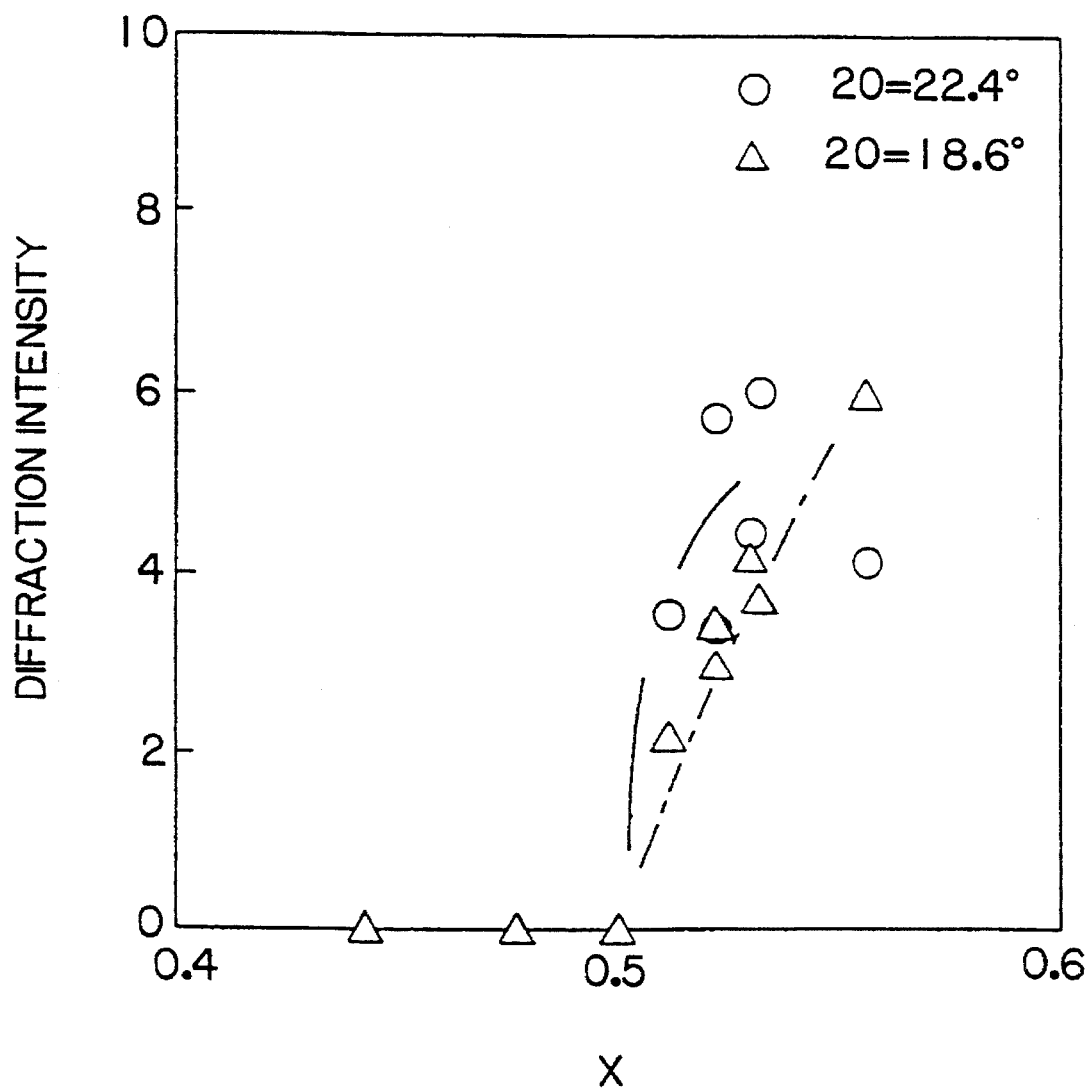
FIG. 46 shows the relationship between the diffraction intensity in the X-ray diffraction pattern and the ratio X in Example 25.

While the polyimide film was amorphous when X is 0.5 or smaller, it was crystalline when X was larger than 0.5. In addition, even when X was larger than 0.5, the ratio of diffraction intensity at d=4.0 Å to that at d=4.8 Å increased as X increased. Such results are shown in FIG. 46. The spacing d of 4.8 Å corresponds to a distance between the adjacent polymer molecules of the polyimide. In the polyimide crystal film formed at X of around 0.5, the molecules tend to be orientated in parallel with the substrate, while in the polyimide crystal film formed at X larger than 0.5, the crystal particles are randomly orientated in the film.

Figure 47:
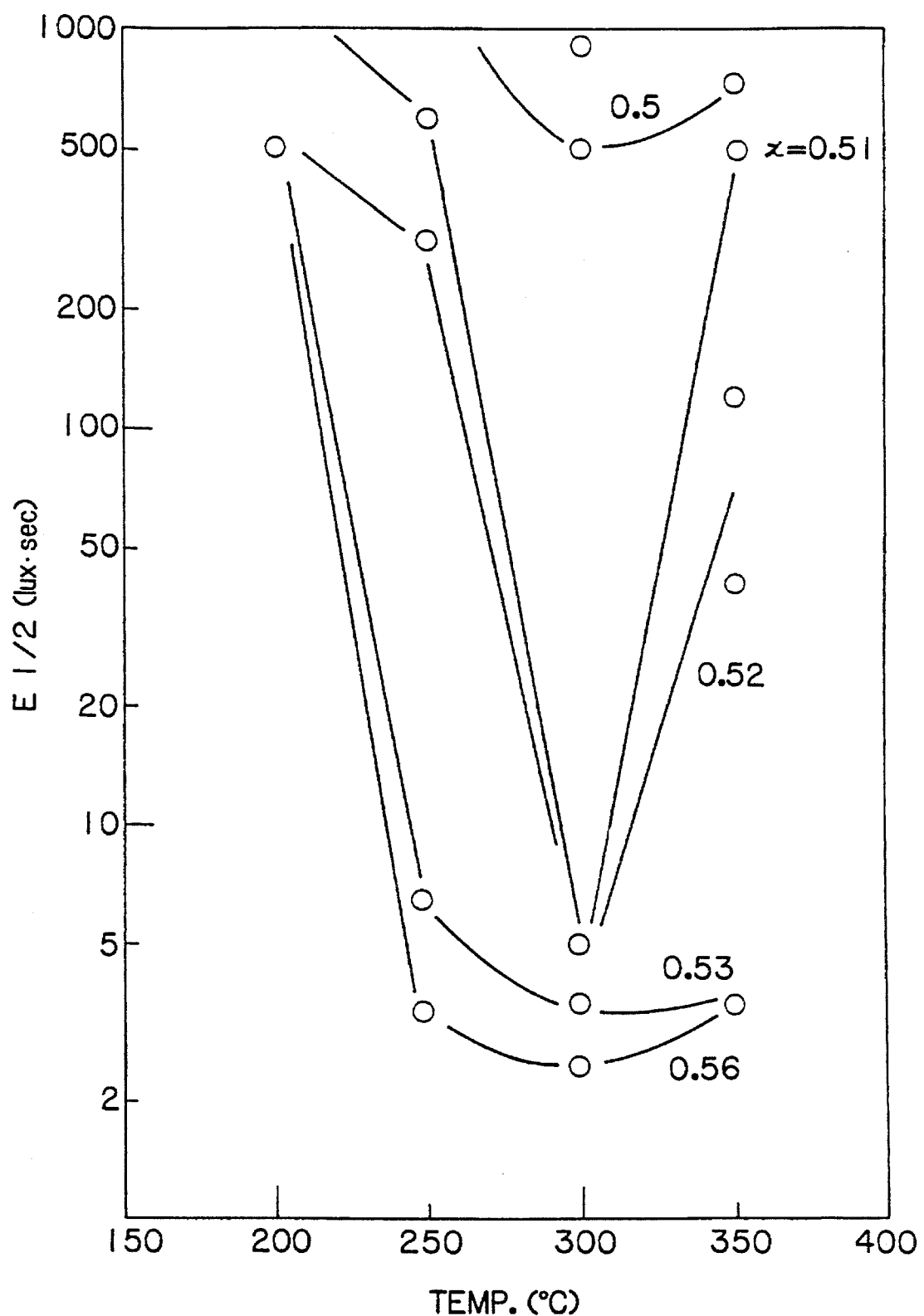
FIG. 47 shows dependency of the photosensitivity on the heating temperature for crystallizing the coated film of the polyamic acid in Example 25.

Dependency of the photosensitivity on the heating temperature for crystallizing the coated film of the polyamic acid is shown in FIG. 47. With the increase of X, the heating temperature range in which the photoconductivity is considerably increased is broadened. At X=0.51, such temperature range is 300°±20° C., while at X=0.56, it is broadened to 300°+50° C.

A relationship between the orientation of the polyimide film and the orientation of the crystal sandwiched with the polyimide films is studied. The polyimide films each having a thickness of 1000 Å but formed under different conditions were rubbed and a guest-host type liquid crystal was encapsulated in the films.

Figure 48:
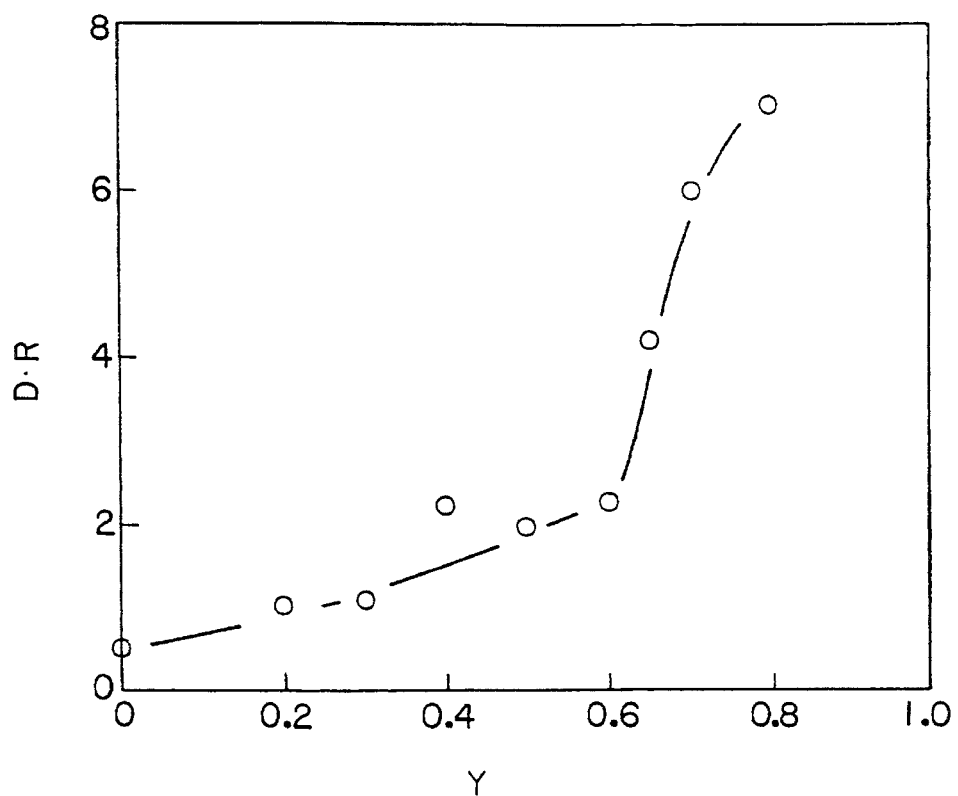
FIG. 48 shows a relationship between the dichromism ratio (D.R.) and the orientation degree $Y(I_{4.8}/(I_{4.8}+I_{4.0})$ in Example 25, FIG. 49 shows the optical switching characteristics of the spatial light modulator of Example 25 when light having a wavelength of 400 nm was irradiated, FIG. 50 shows the change of $1/E_{1/2}$ against the wavelength in Example 26, FIG. 51 schematically shows a reflection type spatial light modulator assembled in Example 28, FIG. 52 shows relationships between the intensity of outgoing light and the frequency in Example 29, FIGS. 53 and 54 show relationships between the half-value exposure ($E_{1/2}$) and the light wavelength in the polymers at the constant amount of metal-free phthalocyanine of 5% by weight in Example 30, FIGS. 55 and 56 show changes of sensitivity according to the amount of the additive and the mixing time, respectively in Example 30.

An orientation degree of the formed panel was evaluated from a dichromism ratio obtained from an absorption ratio between absorption of light polarized in the orientation direction of the panel and that of light polarized in a direction perpendicular to the orientation direction of the panel. FIG. 48 shows a relationship between the dichromism ratio (D.R.) and the orientation degree Y $(I_{4.8}/(I_{4.8}+I_{4.0})$, wherein $I_{4.8}$ is a scattering intensity at d=4.8 Å and $I_{4.0}$ is a scattering intensity at d=4.0 Å) of the polyimide film.

In the range in which the crystalline film was obtained, the liquid crystal orientation was better as the polyimide film had the larger scattering intensity ratio of $I_{4.8}$.

Figure 49:
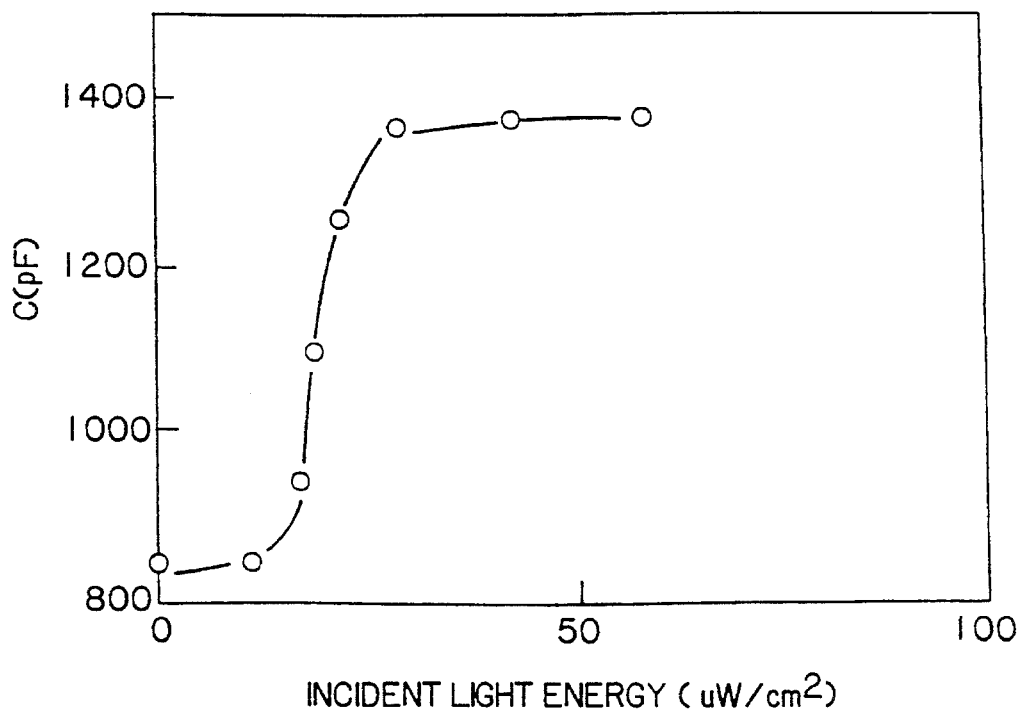

From the photoconductivity and orientation characteristics, it can be concluded that the optimum condition for the polyimide film to be used in the spatial light modulator is that the crystalline film giving the maximum orientation degree Y. By optimizing the heating condition around X of 0.5, the polyimide film having Y of 0.8 was obtained. Under these film forming conditions, a monolayer polyimide film having a thickness of 5 μm was formed on the glass/ITO electrode composite. The other polyimide film had a thickness of 1000 Å. Between these two substrates, a liquid crystal was encapsulated. As the applied voltage, an alternating current of 4 V was used. FIG. 49 shows the optical switching characteristics of the spatial light modulator when light having a wavelength of 400 nm was irradiated.

EXAMPLE 26

The properties of the photoconductive polyimide film were evaluated by using, as the carboxylic anhydride, BPDA, PMDA or BIDAl was used, as the diamine, SDA-3, 5 or 7 was used.

Each polyimide film was used so as to function as the orientation film and also the photoconductive film, and the photoconductive characteristics of the films were compared.

Figure 50:
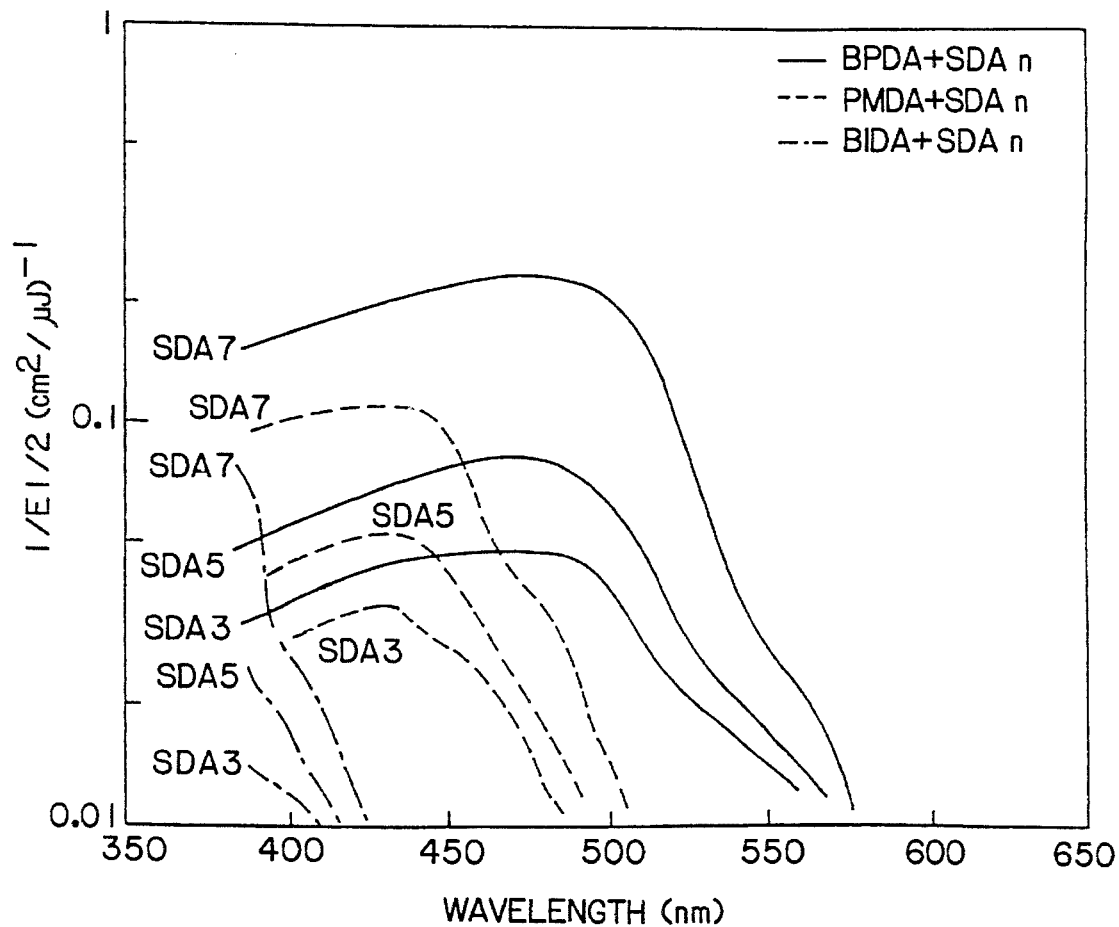

The voltage applied to the panel was 4 V of alternating current, and the photoconductivity was expressed as an inverse of the light energy required for making the transmittance in an intermediate state between the ON state and the OFF state. The results are shown in FIG. 50.

EXAMPLE 27

A light neural network of FIG. 39 was assembled by using the spatial light modulator of Example 24 in the same manner as in Example 22, and its function was examined. When, with this system, 26 alphabetical characters were imaged, the system responded at a recognition rate of 100%.

EXAMPLE 28

Figure 51:
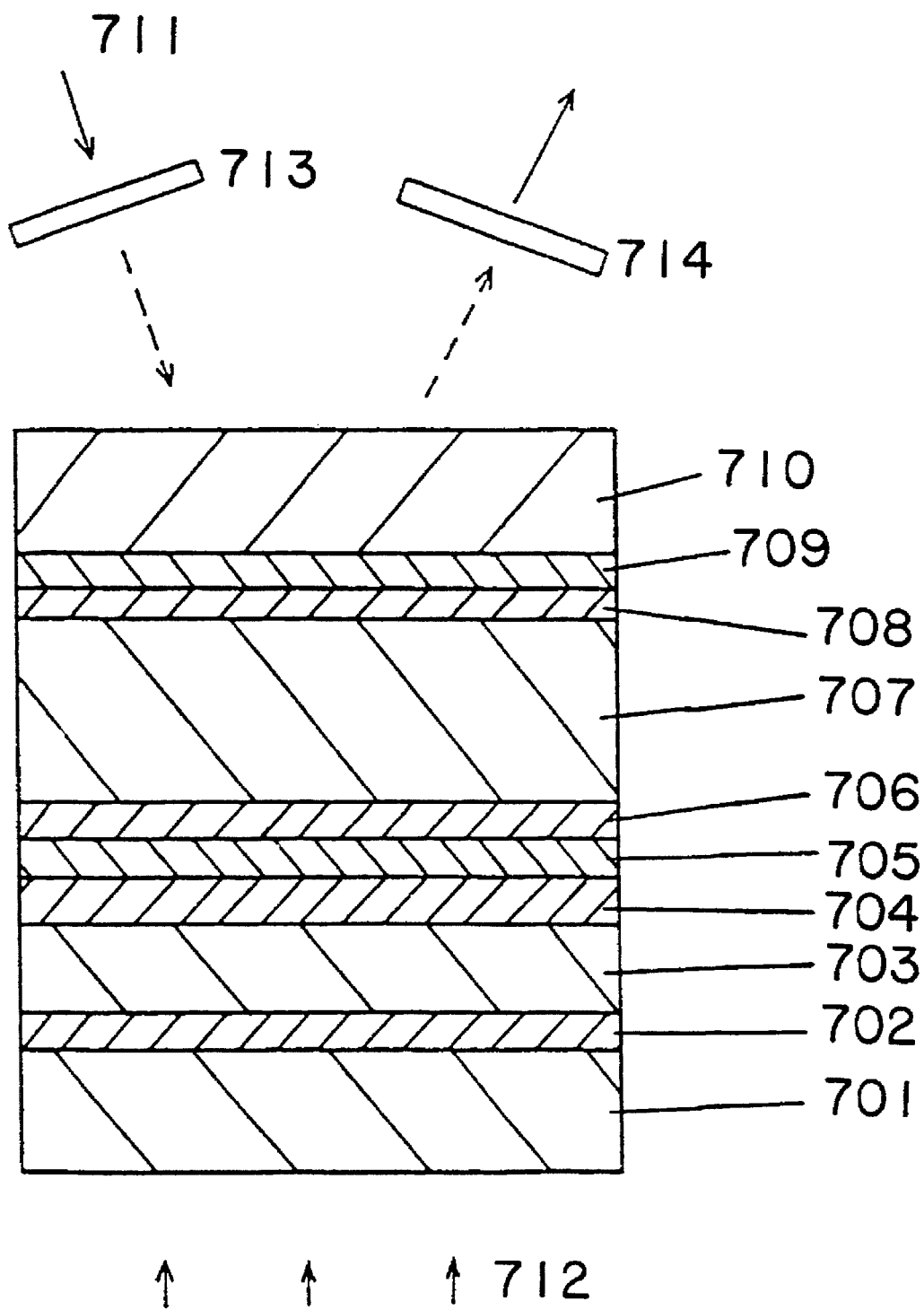

In this Example, a reflection type spatial light modulator was assembled as shown in FIG. 51.

On a transparent insulating substrate 701, an ITO electrode 702 was formed. On the electrode 702, a film of BPDA-Ph-3 having a thickness of 5 μm was formed and then an aluminum thin film was formed as a light reflection layer 705. In order to use a white light source as a writing light 712, the light which passed through the photoconductive layer 703 was absorbed by a light absorbing layer 704. A liquid crystal layer 707 was sandwiched between orientation films 706 and 708.

When a projection type display was assembled with this reflection type spatial light modulator, an image with high contrast was obtained.

EXAMPLE 29

To achieve high speed switching action, a spatial light modulator was assembled by using a ferroelectric liquid crystal.

Figure 52:
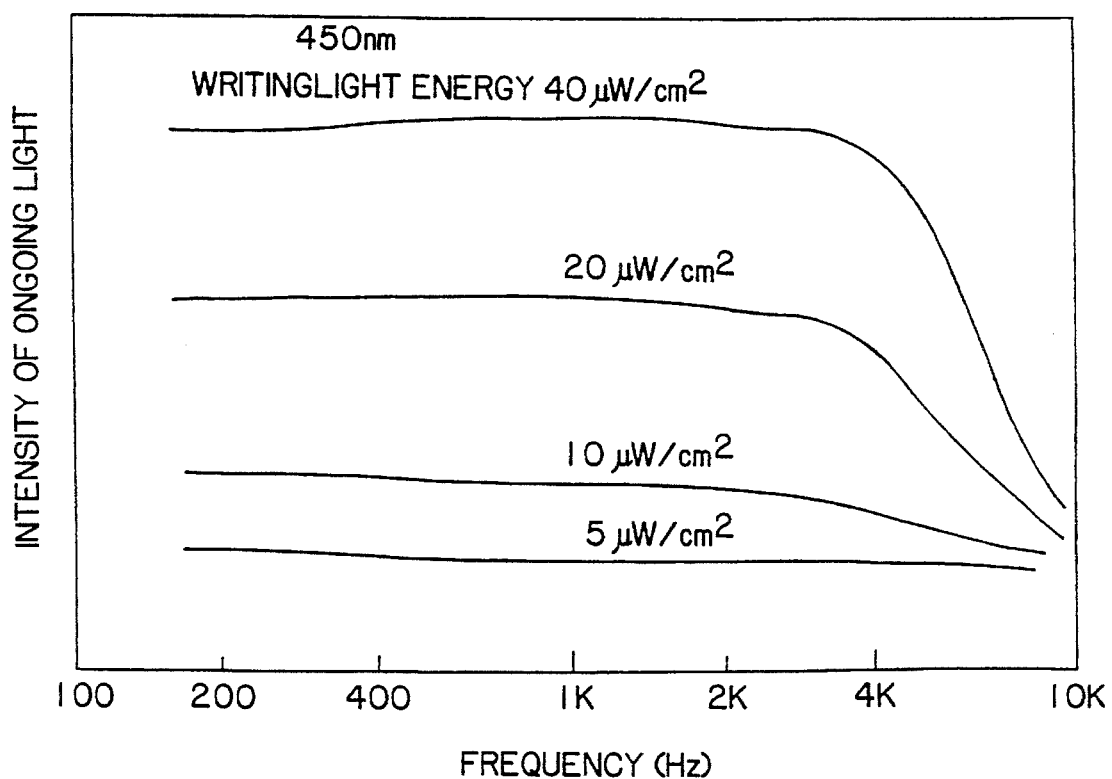

The structure of the modulator was the same as in FIG. 4. As the liquid crystal 404, a ferroelectric liquid crystal FELIX-001 (manufactured by Hoechst), and the cell gap was 2 μm. With the applied voltage of rectangular wave having a voltage of 20 V and frequency of 1 kHz, white light was irradiated, and change of intensity of transmitted light was observed. The results are shown in FIG. 52.

EXAMPLE 30

The polyimide was prepared from SDA-2, 3 or 4 as the diamine and PMDA or BPDA as the carboxylic anhydride.

As an organic material to be dispersed in the polyimide, metal-free phthalocyanine ($H_2Pc$) or copper phthalocyanine (CuPc) was used in in an amount of 0.01 to 10% by weight.

A mixture of SDA-n and the phthalocyanine compound in a predetermined weight ratio was added to dimethylacetamide. Then, to the liquid mixture, PMDA or BPDA was added and stirred for about 1 hour. The resulting polyamic acid solution was dip coated on an aluminum substrate at a thickness of 5 to 20 μm. After removing the solvent at about 100° C. for 30 minutes, the imidization and crystallization were carried out at a temperature around the melting point of the polymer for 2 hours.

The photoconductivity was evaluated as above. The charge voltage was 6 KV, and the initial surface potential was set at +600 V. The white light from the halogen lump was passed through a filter to give monochromic light in the wavelength range of 400 to 900 nm and irradiated at a light amount of 600 lux, and the half-value exposure was measured.

Figure 53:
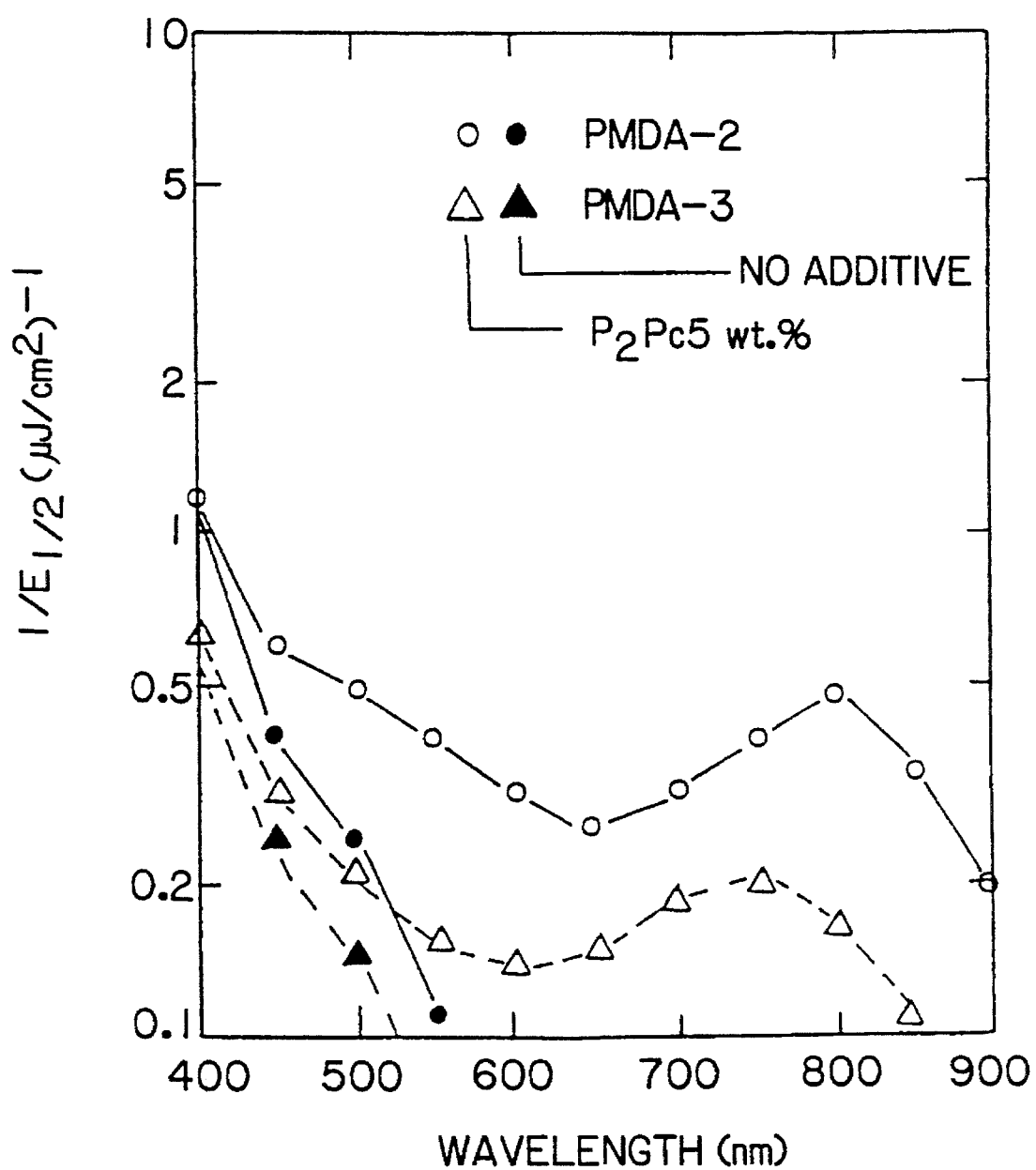
Figure 54:
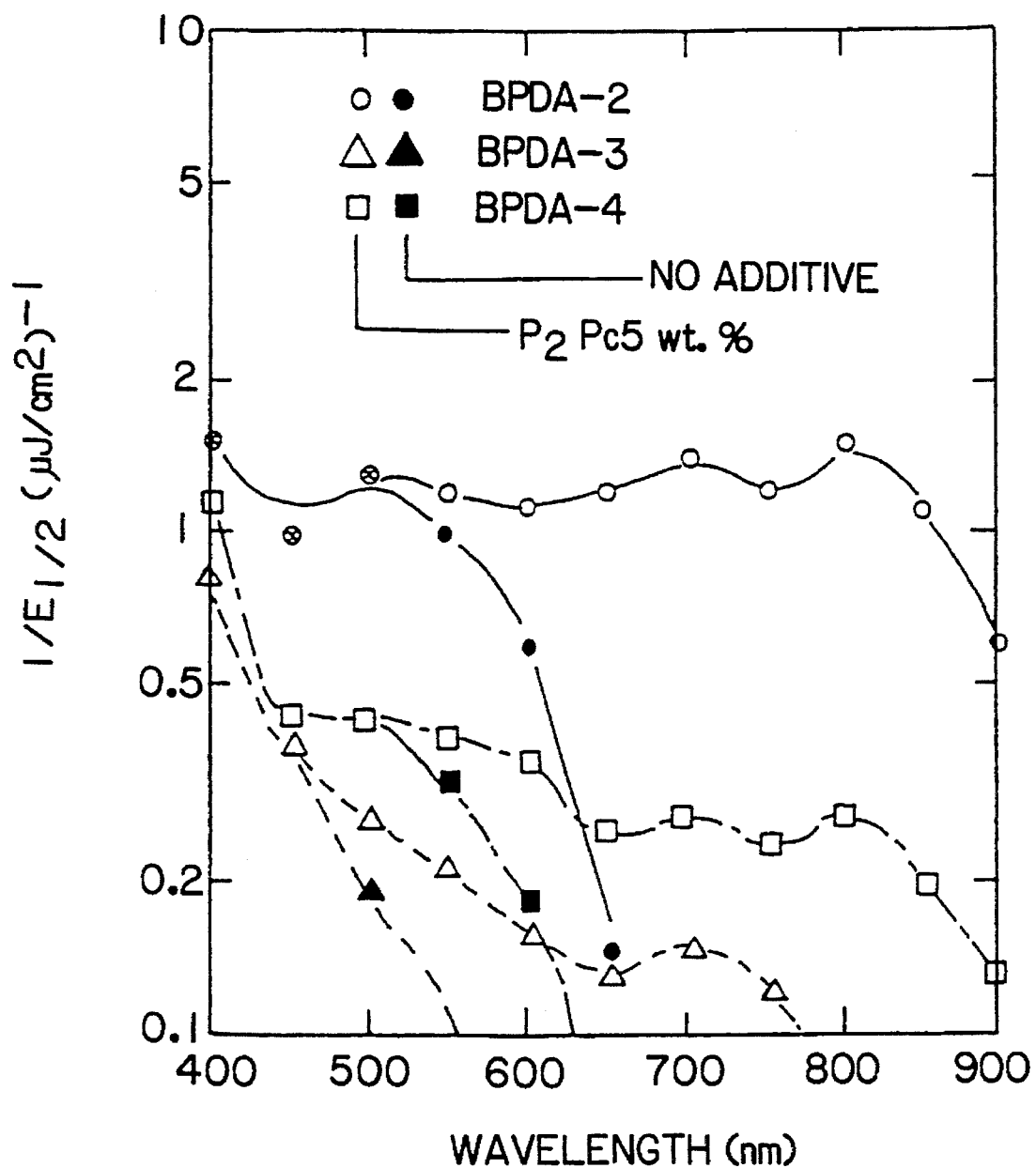

FIGS. 53 and 54 show relationships between the half-value exposure ($E_{1/2}$) and the light wavelength in the polymers at the constant amount of metal-free phthalocyanine of 5% by weight. FIG. 53 shows the results for PMDA/SDA-2 and 3 (PMDA-2 and 3 in FIG. 53), and FIG. 54 shows the results for BPDA/SDA-2, 3 and 4 (BPDA-2, 3 and 4 in FIG. 54). In each case, the sensitive range was expanded to 900 nm from 600 nm or less for the matrix polymer alone. Among them, BPDA/SDA-2 had good sensitivity of less than 1 μ/cm$^2$ of $E_{1/2}$ in the wavelength range of 400 to 850 nm.

On a cylindrical aluminum substrate, a film of BPDA/SDA-2 containing metal-free phthalocyanine having a thickness of 15 μm was formed and set in a copying machine or a laser printer so as to evaluate the imaging property.

In the copying machine, the BPDA/SDA-2 film had the sensitivity of about 1 lux.sec., and maintained good image after printing of 100,000 sheets of A4 size paper. In the laser printer, it maintained good image after 200,000 sheets printing.

Figure 55:
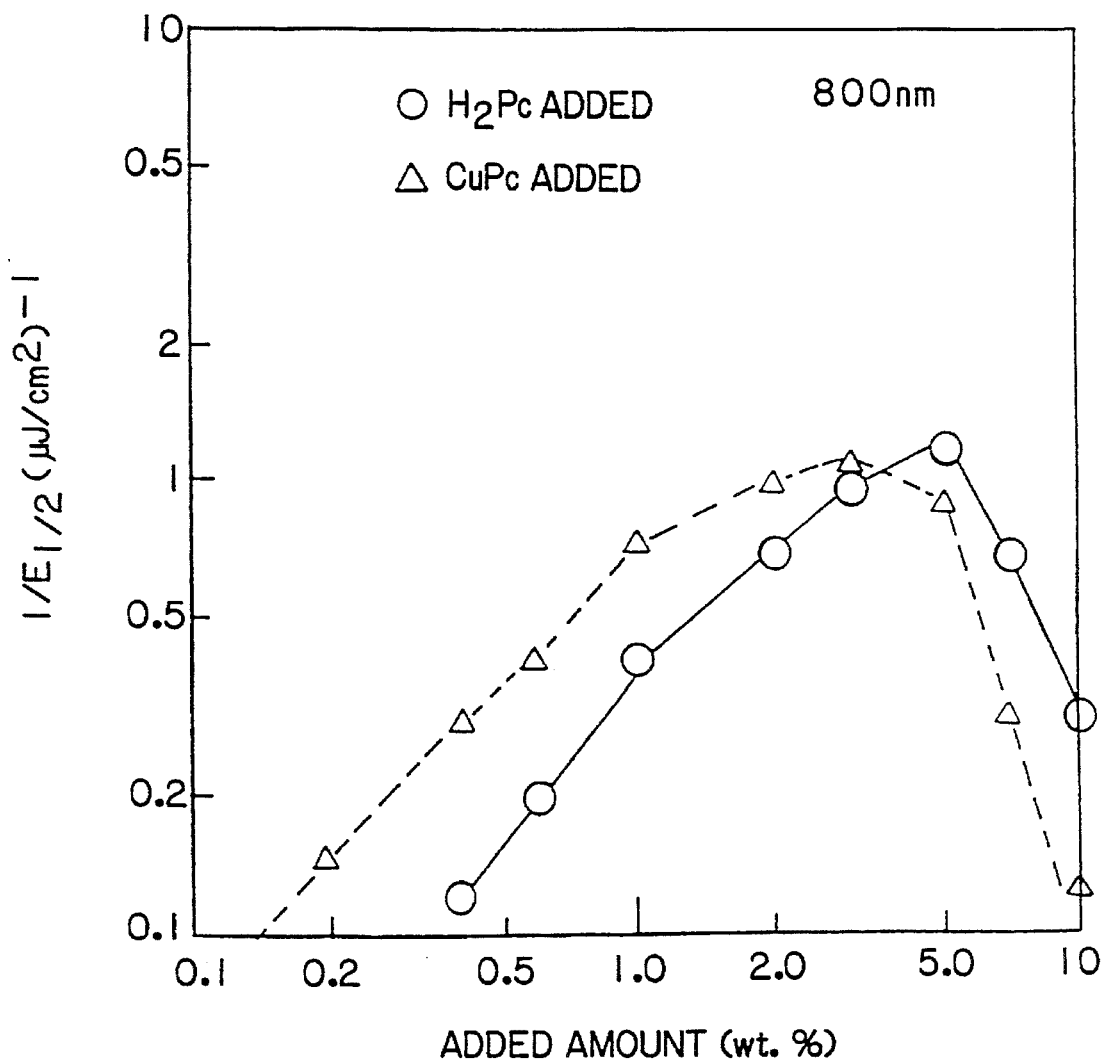

The change of sensitivity according to the amount of the additive was evaluated with BPDA/SDA-2. The results are shown in FIG. 55.

In both cases of the addition of the metal-free phthalocyanine and copper phthalocyanine, the $E_{1/2}$ value was minimum around 5% by weight. When the amount of the additive is larger than 5% by weight, the sensitivity is decreased since the crystallization of the polymer is inhibited and the dispersed phthalocyanine acts as a trap of the carrier transportation.

EXAMPLE 31

A film of metal-free phthalocyanine-containing BPDA/SDA-2 was prepared as follows:

A precursor polyamic acid of BPDA/SDA-2 was synthesized without addition of the organic material. Then, 5 by weight of metal-free phthalocyanine was added to the polyamic acid and mixed. From this mixture, a polyimide film was formed.

Figure 56:
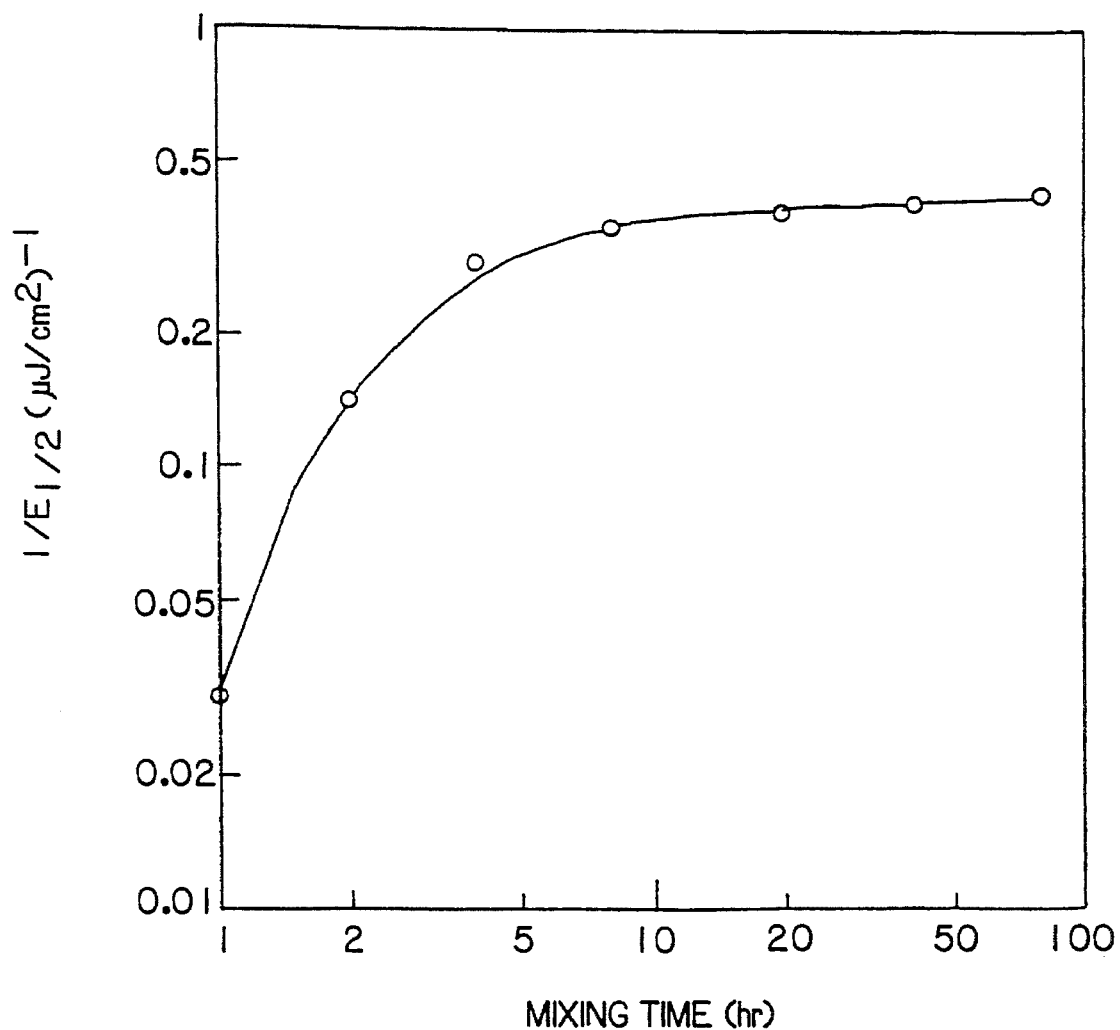

FIG. 56 shows the change of sensitivity of the polyimide film according to the mixing time. The irradiation light had a wavelength of 800 nm. After 20 hours mixing, the sensitivity was only one third of Example 30.

EXAMPLE 32

On a substrate, the metal-free phthalocyaninecontaining BPDA/SDA-2 of Example 30 having a thickness of 1 μm was formed and then a film of BPDA/SDA-2 containing no organic material having a thickness of 15 μm was formed to produce a laminated sensitizer having negative charge characteristic. At the surface potential of −600 V, the sensitivity $E_{1/2}$ was less than 2 μJ/cm² in the wavelength range of 650 to 850 nm.

The organic polymer containing the organic material of this Example could be used as a photoconductive material having good sensitivity in a wide wavelength range from the visible light to infrared.

What is claimed is:

1. A liquid crystal spatial light modulator comprising a liquid crystal layer, a pair of photoconductive layers which sandwich said liquid crystal layer and a pair of conductive electrodes which sandwich said photoconductive layers, wherein said photoconductive layers are made of a polymer comprising repeating units of the formula:

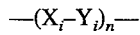

wherein n is a number of at least 1 (one), i is a positive integer not larger than n, $X_i$ is an aromatic or substituted aromatic group, and $Y_i$ is O, S, Se, Te or a divalent group: —CH=CH—.

2. The liquid crystal spatial light modulator according to claim 1, wherein at least one of said photoconductive layers is made of the polymer comprising repeating units of the formula:

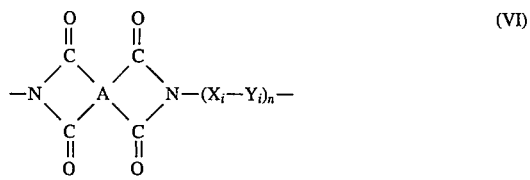

wherein $X_i$, $Y_i$, A, n and i are the same as defined above.

3. The liquid crystal spatial light modulator according to claim 1, wherein said liquid crystal is a ferroelectric liquid crystal.

4. The liquid crystal spatial light modulator according to claim 1, which further comprises, between said photoconductive layer and said liquid crystal layer, a light absorbing layer which has an absorbance larger than that of said photoconductive layer against light having a specific wavelength, and a reflecting layer which reflects light which passes through said liquid crystal layer.

5. The liquid crystal spatial light modulator according to claim 1 wherein at least one of said photoconductive layers comprises at least two layers, an upper one of which comprises an amorphous polymer, and a lower one of which closer to said substrate comprises a crystalline polymer.

* * * * *